(12) United States Patent
Yanai

(10) Patent No.: US 9,113,097 B2
(45) Date of Patent: Aug. 18, 2015

(54) IMAGE CAPTURING APPARATUS THAT CONTROLS PERFORMING OF SHORT-TERM AND LONG-TERM EXPOSURES AND CORRESPONDING READ OPERATIONS, AND CONTROL METHOD THEREOF

(71) Applicant: CANON KABUSHIKI KAISHA, Tokyo (JP)

(72) Inventor: Toshikazu Yanai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/169,796

(22) Filed: Jan. 31, 2014

(65) Prior Publication Data

US 2014/0218575 A1    Aug. 7, 2014

(30) Foreign Application Priority Data

Feb. 6, 2013 (JP) ................................. 2013-021801
Oct. 18, 2013 (JP) ................................. 2013-217863
Nov. 8, 2013 (JP) ................................. 2013-232579

(51) Int. Cl.
*H04N 5/235* (2006.01)
*H04N 5/353* (2011.01)
*H04N 5/374* (2011.01)
*H04N 5/355* (2011.01)

(52) U.S. Cl.
CPC ......... *H04N 5/3532* (2013.01); *H04N 5/35509* (2013.01); *H04N 5/35527* (2013.01); *H04N 5/35581* (2013.01); *H04N 5/374* (2013.01)

(58) Field of Classification Search
CPC . H04N 5/235; H04N 5/35536; H04N 5/3535; H04N 5/3532; H04N 5/2355; H04N 5/35581; H04N 5/3765; H04N 5/378; H04N 2201/04767

USPC .............................. 348/222.1, 362, 294–308
See application file for complete search history.

(56) References Cited

U.S. PATENT DOCUMENTS

| | | | |
|---|---|---|---|
| 6,677,992 B1 * | 1/2004 | Matsumoto et al. | 348/229.1 |
| 2002/0060744 A1 * | 5/2002 | Fukushima | 348/364 |
| 2004/0252224 A1 * | 12/2004 | Shiraishi et al. | 348/362 |
| 2009/0219425 A1 * | 9/2009 | Kobayashi et al. | 348/306 |
| 2009/0262215 A1 * | 10/2009 | Sano et al. | 348/229.1 |
| 2011/0096216 A1 * | 4/2011 | Kawai et al. | 348/296 |
| 2011/0242368 A1 * | 10/2011 | Haneda et al. | 348/239 |

FOREIGN PATENT DOCUMENTS

| | | | |
|---|---|---|---|
| JP | 2011-244309 A | 12/2011 | |
| JP | 2012-105225 A | 5/2012 | |

* cited by examiner

*Primary Examiner* — Tuan Ho
*Assistant Examiner* — Selam Gebriel
(74) *Attorney, Agent, or Firm* — Cowan, Liebowitz & Latman, P.C.

(57) ABSTRACT

An image capturing apparatus is provided. A synchronizing signal generation unit generates a short-term vertical synchronizing signal VDS and a long-term vertical synchronizing signal VDL, one cycle of which is equal to N cycles of VDS. An exposure control unit performs short-term exposure and long-term exposure for the predetermined number of lines of an image sensor according to VDS and VDL. The exposure control unit starts a read operation of pixel signals for a long-term exposure line in synchronism with VDL, and starts a read operation of pixel signals for a short-term exposure line in synchronism with VDS, which does not overlap a read period Fr_L Readout of pixel signals of a long-term exposure line.

10 Claims, 15 Drawing Sheets

F I G. 2
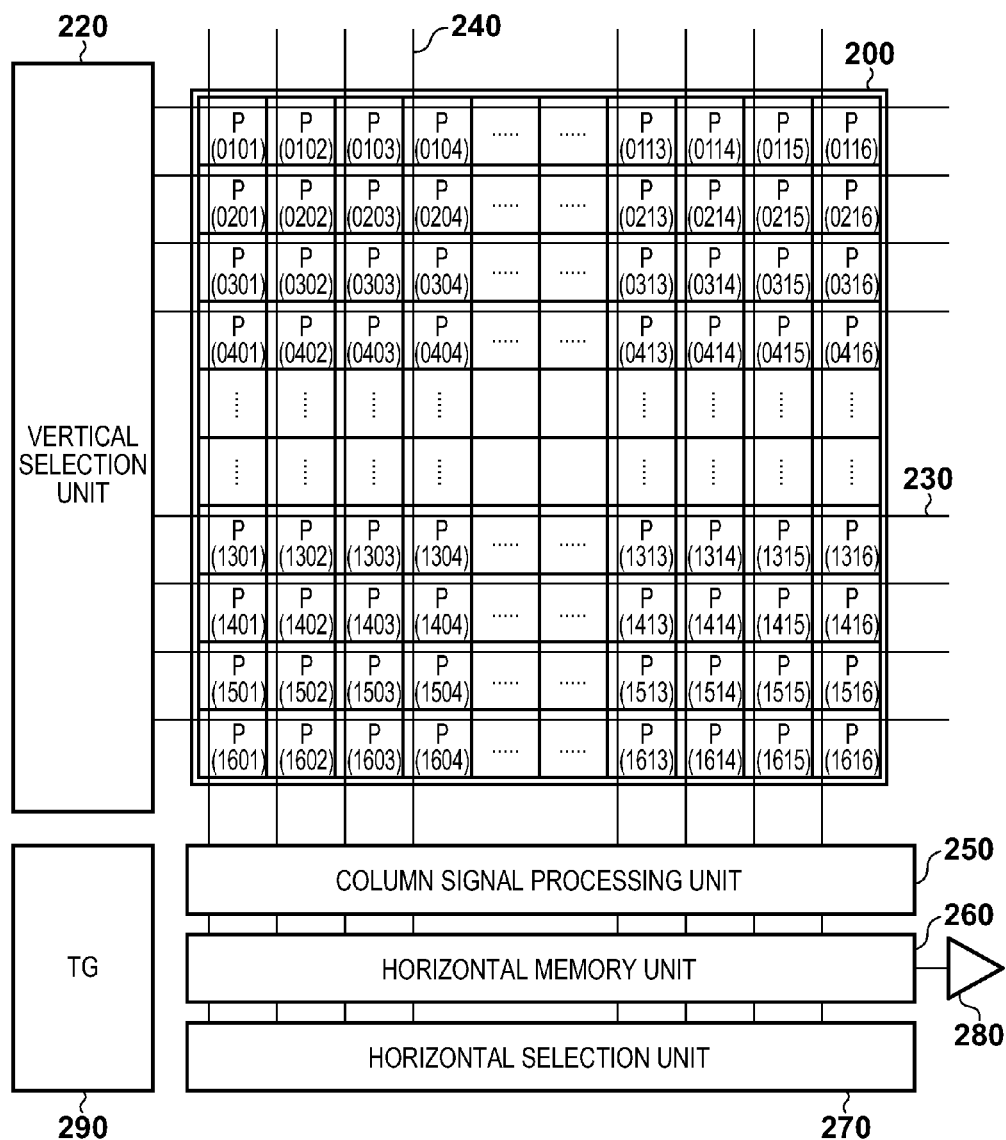

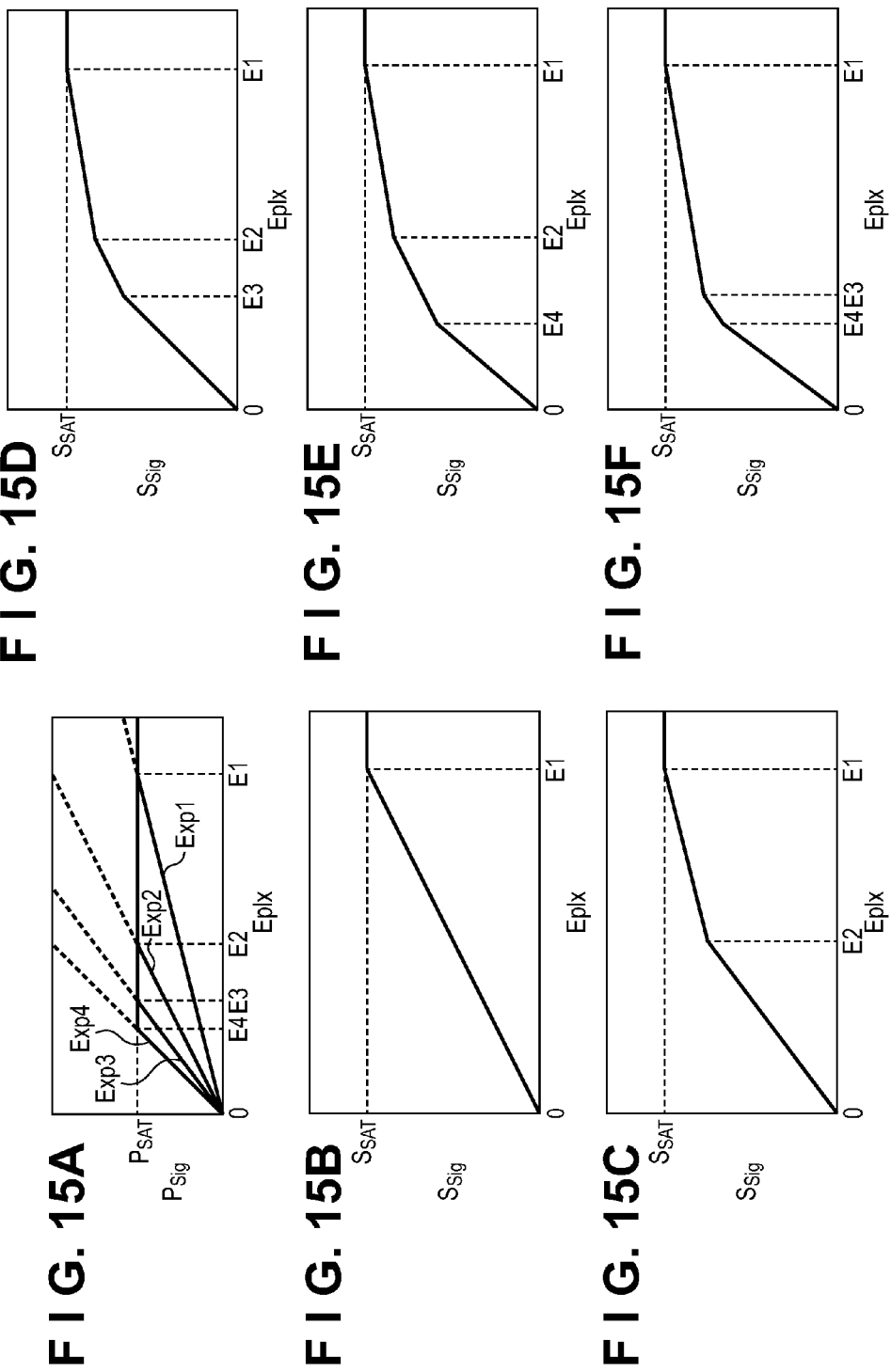

IMAGE CAPTURING APPARATUS THAT CONTROLS PERFORMING OF SHORT-TERM AND LONG-TERM EXPOSURES AND CORRESPONDING READ OPERATIONS, AND CONTROL METHOD THEREOF

BACKGROUND OF THE INVENTION

1. Field of the Invention

The present invention relates to an image capturing apparatus and control method thereof.

2. Description of the Related Art

As an image sensor used in an image capturing apparatus, a CCD (Charge Coupled Device) type image sensor (to be referred to as "CCD sensor" hereinafter) is generally adopted. However, in recent years, as image sensors are required to have a larger number of pixels, a CMOS (Complementary Metal Oxide Semiconductor) type image sensor (to be referred to as "CMOS sensor" hereinafter) has received a lot of attention.

In an image sensor such as a CMOS sensor, photoelectric conversion elements of pixels perform photoelectric conversion for accumulating charges according to incident light amounts, and outputting electrical signal corresponding to the accumulated charges. Also, an image sensor such as a CMOS sensor has an electronic shutter function. The electronic shutter function starts exposure by resetting photoelectric conversion elements of pixels, and ends exposure by reading out charges accumulated on the photoelectric conversion elements. In this manner, since the start and end of exposure are controlled by only the function of the image sensor, an exposure time from a low-speed shutter to a high-speed shutter can be accurately controlled.

Furthermore, as one of features of a CMOS sensor, a rolling shutter operation (also called a focal plane shutter operation) is known. With the rolling shutter operation, charges on pixels are reset by sequentially scanning a plurality of two-dimensionally arranged pixels for each line unlike in a CCD sensor. Then, after an elapse of a predetermined exposure time, the pixels are sequentially scanned for each pixel to read out accumulated charges and to output signals.

In this manner, the rolling shutter operation has a time difference required to read out charges and to output signals for each line. Thus, exposure times are deviated for respective lines in a single image capturing operation.

An image capturing apparatus using an image sensor such as a CMOS sensor suffers a problem that a dynamic range is normally insufficient upon capturing an image of an object including both a bright part and dark part. For example, when an exposure time is controlled to be short in correspondence with a bright part, since a sufficient exposure time for a dark part cannot be assured, a shadow-detail loss and an image quality drop caused by deterioration of an S/N are generated. Conversely, when an exposure time is controlled to be long in correspondence with a dark part, accumulated charge amounts of some photoelectric conversion elements reach a saturation level, thus generating a highlight-detail loss in which an object region having a given brightness or higher is set at a saturated luminance level.

As a method of accurately reproducing tones of bright and dark parts, dynamic range expansion processing is known. The dynamic range expansion processing attains a high S/N by controlling an exposure time to be long for pixels with smaller incident light amounts on an image sensor and avoids saturation for pixels with larger incident light amounts.

As one method of the dynamic range expansion processing, a multi-exposure method for successively capturing a plurality of images with different exposure times by a single image sensor and composing these images is known. With the multi-exposure method, a long-term exposure image and short-term exposure image are successively and individually shot. Then, composition processing is executed using the long-term exposure image for a dark image region and the short-term exposure image for a bright image region which may cause a highlight-detail loss in the long-term exposure image. In this manner, one image, a dynamic range of which is expanded, is generated.

However, in the multi-exposure method, long-term exposure and short-term exposure have to be alternately performed, and signals obtained from the respective exposures have to be alternately read out. When the multi-exposure method is applied to a moving image shooting operation, one frame period upon long-term exposure and that upon short-term exposure have to be equal to each other so as to set a uniform frame rate. Then, a maximum exposure time of the long-term exposure has to be set to be one frame period, and an S/N enhancement effect of the long-term exposure cannot be expected since a maximum exposure time in a normal operation of the image sensor can also be set to be one frame period. Furthermore, when an exposure time ratio is 2:1, since a maximum exposure time of the short-term exposure is set to be half of one frame period, a wasteful time which does not contribute to exposure is generated.

Also, in the multi-exposure method, a time difference for one frame period is generated between the long-term exposure and short-term exposure. For this reason, when a moving object is included, a long-term exposure image and short-term exposure image cannot be the same. As a result, in an image which has undergone the dynamic range expansion processing, the moving object may be blurred and false colors may be generated.

In order to solve these problems of the multi-exposure method, other dynamic range expansion processing methods are disclosed by Japanese Patent Laid-Open Nos. 2012-105225 and 2011-244309. In Japanese Patent Laid-Open Nos. 2012-105225 and 2011-244309, different exposure times are set for pixels which are divided into two groups at 2-line intervals. Then, for example, high-sensitivity pixel information is acquired from a long-term exposure pixel, and low-sensitivity pixel information is acquired from a short-term exposure pixel, thus generating an image, a dynamic range of which is expanded, based on these pieces of pixel information of different sensitivities. According to this method, an image, a dynamic range of which is expanded, can be generated based on one shot image.

Japanese Patent Laid-Open No. 2011-244309 has also proposed a method of eliminating a blur of a moving object as a problem of the multi-exposure method by matching the centers of exposure times of the long-term exposure and short-term exposure (FIG. 13 of Japanese Patent Laid-Open No. 2011-244309).

However, in a method described in FIG. 6 of Japanese Patent Laid-Open No. 2012-105225 or FIG. 9 of Japanese Patent Laid-Open No. 2011-244309, all lines of signals of pixels having different exposure times at 2-line intervals are read out at the same time. For this reason, correction processing and signal processing for long-term exposure pixels and those for short-term exposure pixels have to be switched and performed at 2-line intervals. Such processing imposes a heavy load on a signal processing circuit.

The method described in FIG. 13 of Japanese Patent Laid-Open No. 2011-244309 requires that the center of the short-term exposure always matches that of the long-term exposure. Then, every time reset and read timings of the long-term exposure are changed due to a change in exposure time, reset and read timings have to be changed to match the center of the short-term exposure. Therefore, such method requires complicated timing control.

SUMMARY OF THE INVENTION

The present invention realizes improvement of a rolling shutter operation required for dynamic range expansion processing, and a method which can attain both averaging of processing loads imposed on read operations of pixel signals and simplification of timing control.

According to an aspect of the present invention, there is provided an image capturing apparatus comprising: an image sensor in which a plurality of pixels each having a photoelectric conversion element are arranged in a matrix; a synchronizing signal generation unit configured to generate a short-term vertical synchronizing signal as a vertical synchronizing signal for short-term exposure, and a long-term vertical synchronizing signal for long-term exposure, one cycle of the long-term vertical synchronizing signal being equal to N cycles of the short-term vertical synchronizing signal; and an exposure control unit configured to perform the short-term exposure and the long-term exposure for the predetermined number of lines of the image sensor according to the short-term vertical synchronizing signal and the long-term vertical synchronizing signal generated by the synchronizing signal generation unit, wherein the exposure control unit starts a read operation of pixel signals for a long-term exposure line in synchronism with the long-term vertical synchronizing signal, and the exposure control unit starts a read operation of pixel signals for a short-term exposure line in synchronism with a short-term vertical synchronizing signal, which does not overlap a read period of pixel signals of the long-term exposure line.

Further features of the present invention will become apparent from the following description of exemplary embodiments (with reference to the attached drawings).

BRIEF DESCRIPTION OF THE DRAWINGS

FIG. 2 is a schematic block diagram showing the arrangement of an image sensor according to the embodiment;

FIGS. 15A to 15F are graphs for explaining dynamic range expansion processing according to the embodiment.

DESCRIPTION OF THE EMBODIMENTS

Various exemplary embodiments, features, and aspects of the invention will be described in detail below with reference to the drawings. Note that the arrangements to be described in the following embodiments are presented only for the exemplary purpose, and the present invention is not limited to the illustrated arrangements.

Embodiments of the present invention will be described in detail hereinafter with reference to the accompanying drawings. Note that embodiments to be described hereinafter are examples of arrangements of the present invention, and are to be modified or changed as needed according to arrangements and various conditions of apparatuses to which the present invention is applied, and the present invention is not limited to the following embodiments.

First Embodiment

The first embodiment will explain an operation of an image sensor which is controlled to output signals of pixels of different exposure times at 2-line intervals so as to be used in dynamic range expansion processing (to be referred to as "HDR processing" hereinafter).

Figure 1:
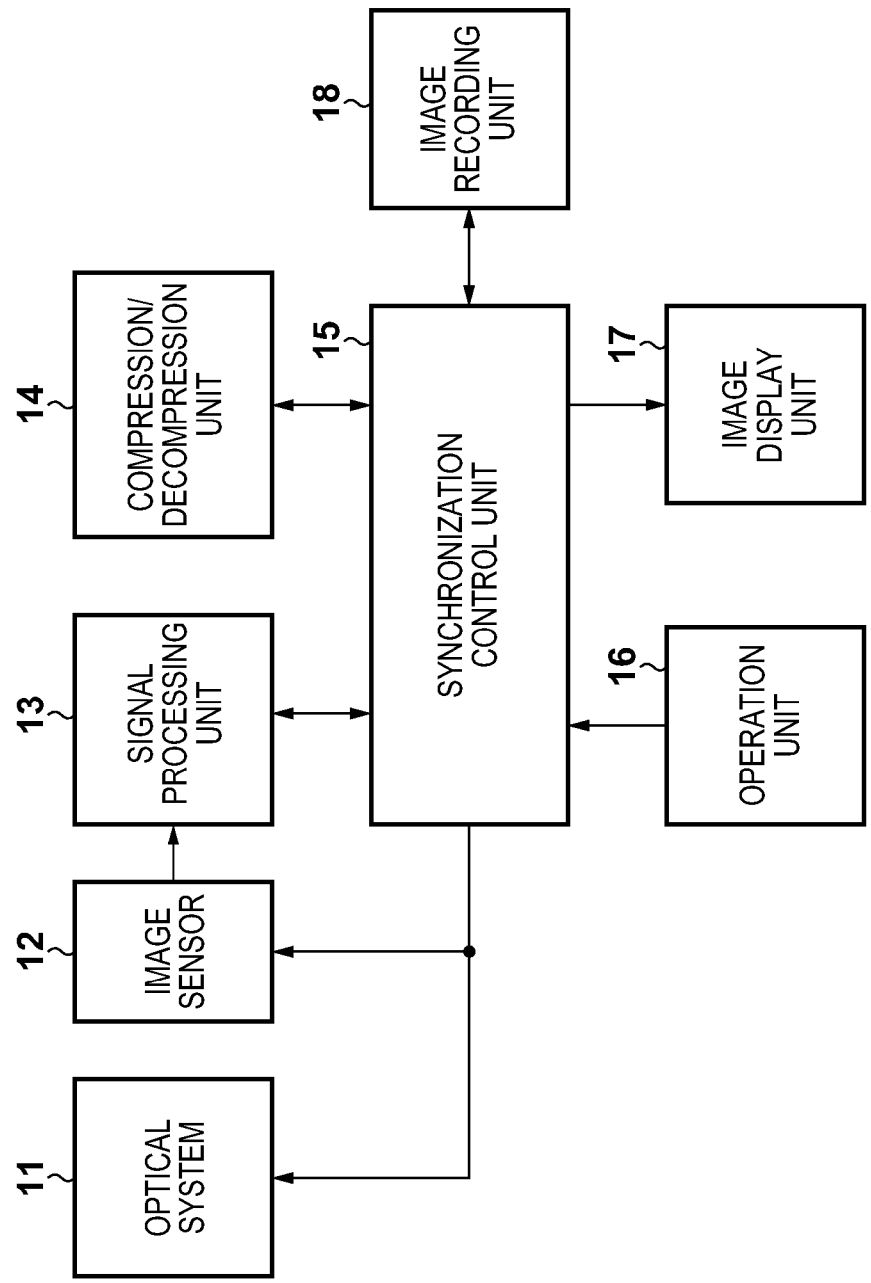
FIG. 1 is a block diagram showing the arrangement of an image capturing apparatus according to an embodiment.

FIG. 1 is a block diagram showing the arrangement of an image capturing apparatus according to this embodiment. The image capturing apparatus of this embodiment is applicable to a digital still camera, digital video camera, and the like. The image capturing apparatus shown in FIG. 1 includes an optical system 11, image sensor 12, signal processing unit 13, compression/decompression unit 14, synchronization control unit 15, operation unit 16, image display unit 17, and image recording unit 18. The optical system 11 includes a lens required to focus light coming from an object onto the image sensor 12, a driving mechanism required to move the lens to attain a zoom operation and in-focus operation, a mechanical shutter mechanism, a stop mechanism, and the like. Movable portions of them are driven based on control signals from the synchronization control unit 15.

The image sensor 12 is a CMOS sensor of an XY address method, in which a plurality of pixels each having a photoelectric conversion element are arranged in a matrix. The image sensor 12 includes a CDS (Correlated Double Sampling) circuit, AGC (Auto Gain Control) circuit, A/D converter, and the like, and is controlled by control signals from the synchronization control unit 15. Note that the CMOS sensor performs image capturing operations such as an exposure operation, signal read operation, and reset operation in response to control signals from the synchronization control unit 15. Then, the CMOS sensor outputs a digital image signal via noise reduction by the CDS circuit, gain control by the AGC circuit, and analog-to-digital conversion by the A/D converter.

Under the control of the synchronization unit 15, the signal processing unit 13 applies signal processing such as white balance adjustment, color correction, gamma correction, AF (Auto Focus), and AE (Auto Exposure) to the digital image signal input from the image sensor 12. In this embodiment, this signal processing unit 13 performs HDR processing.

Figure 4:
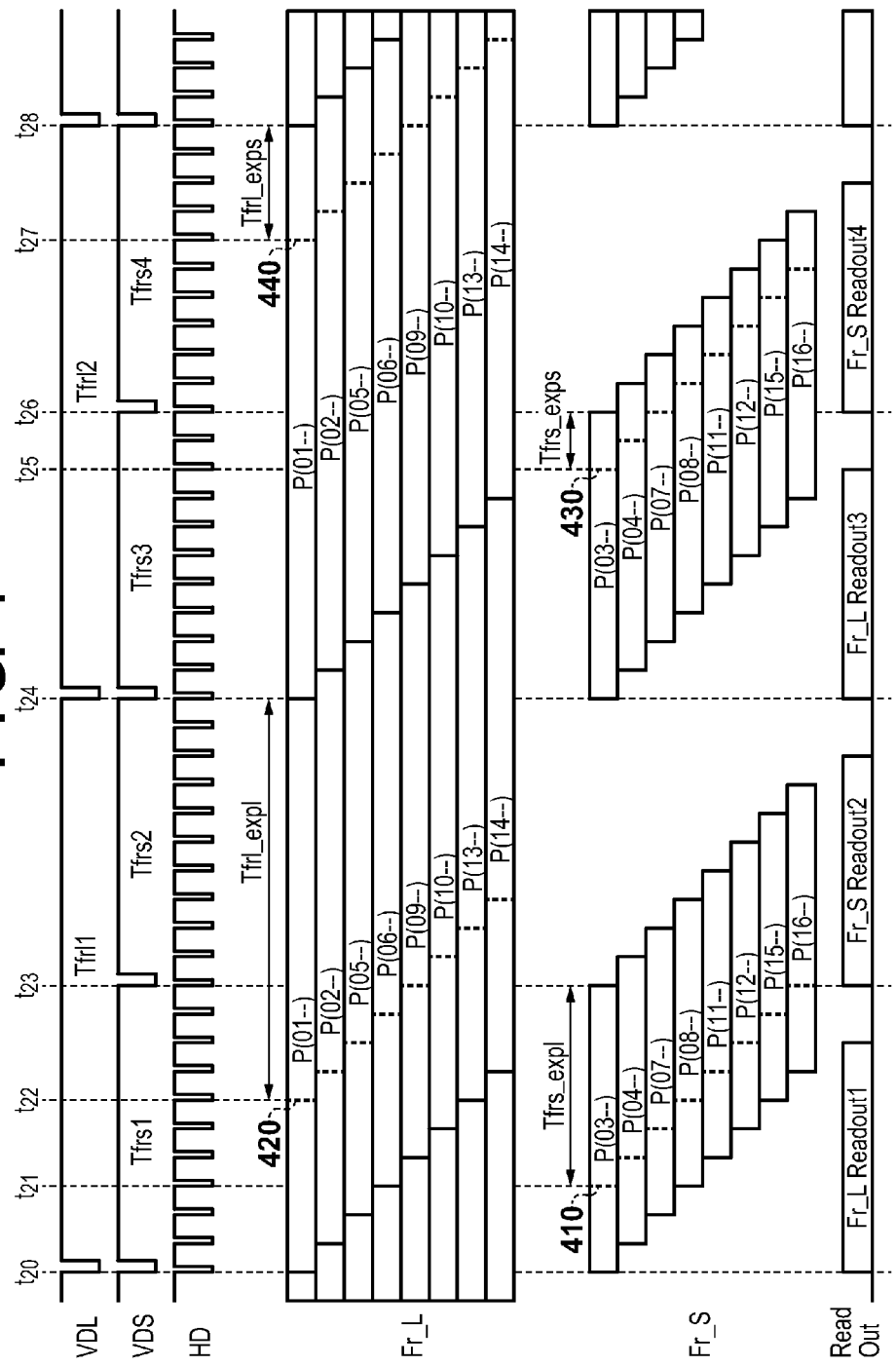
FIG. 4 is a timing chart showing control timings of the image sensor according to the first embodiment.
Figure 7:
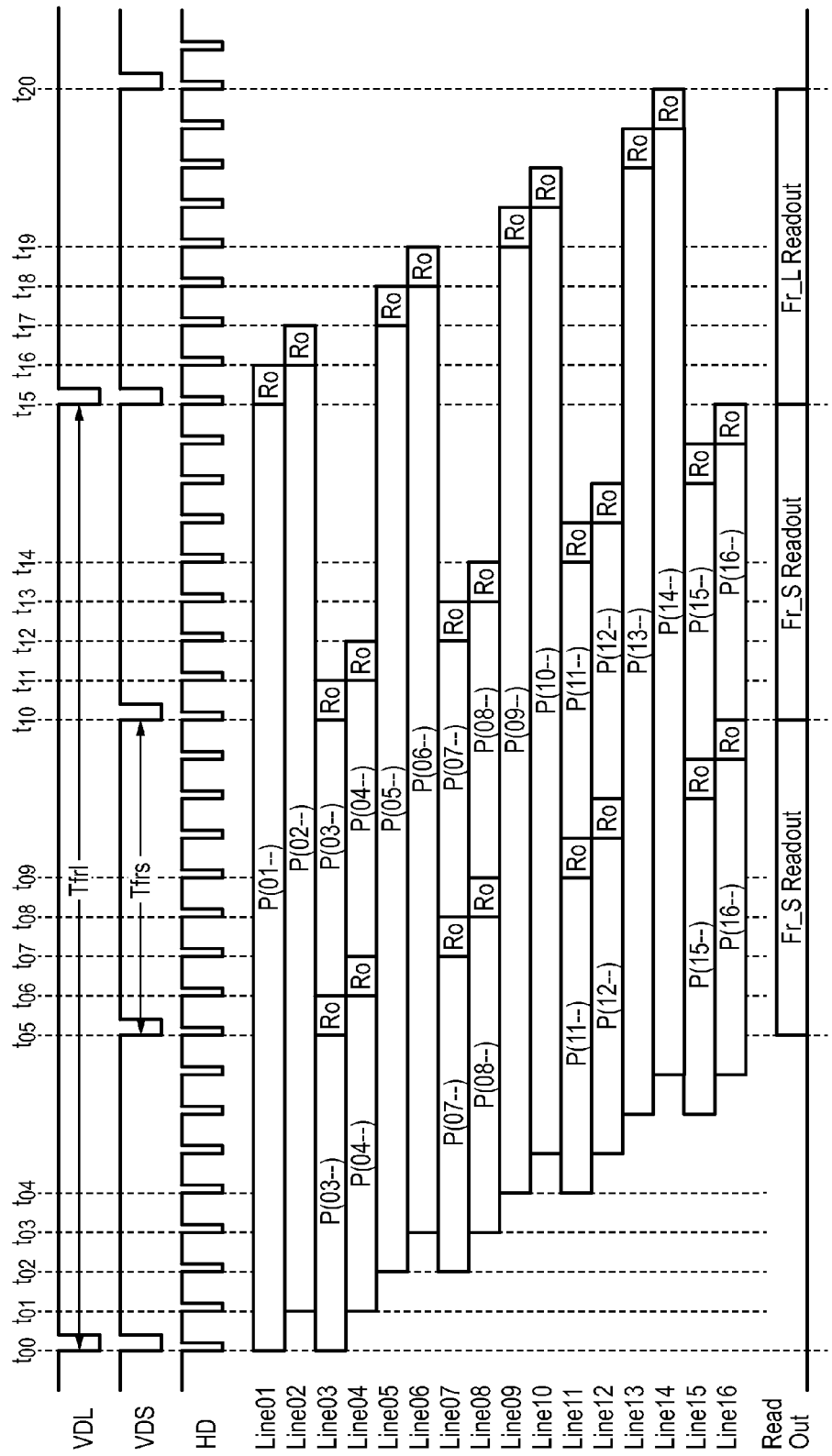
FIG. 7 is a timing chart showing control timings of an image sensor according to the third embodiment.

As the HDR processing method, for example, a method of composing signals of long-term exposure pixels and those of short-term exposure pixels using gain values required to compensate for a sensitivity ratio and weighting coefficients according to brightness levels, as shown in FIG. 4 of Japanese Patent Laid-Open No. 2012-105225, is known. Alternatively, a method of selecting either of signals of long-term exposure pixels or those of short-term exposure pixels according to brightness levels, as shown in FIG. 7 of Japanese Patent Laid-Open No. 2011-244309, may be adopted.

The compression/decompression unit 14 performs compression encoding processing using a predetermined still image data format such as JPEG (Joint Photographic Coding Experts Group) for the image signal from the signal processing unit 13 under the control of the synchronization control unit 15. Also, the compression/decompression unit 14 performs decompression decoding processing of encoded data of a still image supplied from the synchronization control unit 15. Furthermore, the compression/decompression unit 14 can execute compression encoding/decompression decoding processing of a moving image by MPEG (Moving Picture Experts Group) or the like.

The synchronization control unit 15 is, for example, a microcontroller, which includes a CPU, ROM, RAM, and the like, and systematically controls the respective units of this image capturing apparatus by executing programs stored in the ROM and the like.

The operation unit 16 includes, for example, various operation keys such as a shutter release button, a lever, a dial, and the like, and outputs control signals according to input operations by the user to the synchronization control unit 15.

The image display unit 17 includes a display device such as an LCD (Liquid Crystal Display), an interface circuit for such display device, and the like. The image display unit 17 generates an image signal to be displayed on the display unit from the image signal supplied from the synchronization control unit 15, and supplies this signal to the display device to display an image.

The image recording unit 18 is implemented as, for example, a portable semiconductor memory, optical disk, HDD (Hard Disk Drive), magnetic tape, or the like. The image recording unit 18 receives an image data file encoded by the compression/decompression unit 14 from the synchronization control unit 15, and stores the received image data file. Also, the image recording unit 18 reads out designated data based on a control signal from the synchronization control unit 15, and outputs the readout data to the synchronization control unit 15.

The arrangement of the image capturing apparatus of this embodiment has been roughly explained. A basic operation of the image capturing apparatus of this embodiment will be described below.

Prior to capturing of a still image, an image signal output from the image sensor 12 is sequentially supplied to the signal processing unit 13. The signal processing unit 13 applies image quality correction processing to a digital image signal from the image sensor 12, and supplies the processed image signal to the image display unit 17 as a camera-through image via the synchronization control unit 15. Thus, the camera-through image is displayed, and the user can adjust a field angle by observing the displayed image. In this state, when the user presses the shutter release button of the operation unit 16, the signal processing unit 13 fetches a captured image signal for one frame from the image sensor 12 by the control of the synchronization control unit 15. The signal processing unit 13 applies image quality correction processing to the fetched image signal for one frame, and supplies the processed image signal to the compression/decompression unit 14. The compression/decompression unit 14 compression-encodes the input image signal to generate encoded data, and supplies generated encoded data to the image recording unit 18 via the synchronization control unit 15. Thus, a data file of a captured still image is recorded in the image recording unit 18.

On the other hand, when a data file of a still image recorded in the image recording unit 18 is to be reproduced, the synchronization control unit 15 loads a selected data file from the image recording unit 18 in response to an operation input from the operation unit 16, supplies the loaded data file to the compression/decompression unit 14, and controls the compression/decompression unit 14 to execute decompression decoding processing of that data file. A decoded image signal is supplied to the image display unit 17 via the synchronization control unit 15, thus reproducing and displaying a still image.

When a moving image is to be recorded, the compression/decompression unit 14 applies compression encoding processing to image signals sequentially processed by the signal processing unit 13 to generate encoded data of a moving image, and the generated encoded data of the moving image is transferred to and recorded in the image recording unit 18. Also, a data file of a moving image is read out from the image recording unit 18, and is supplied to the compression/decompression unit 14. Then, the compression/decompression unit 14 performs decompression decoding processing of the supplied data file, and supplies a decoded moving image to the image display unit 17, thus displaying the moving image.

FIG. 2 is a block diagram showing the arrangement of the image sensor 12 according to this embodiment. The image sensor 12 (CMOS sensor) shown in FIG. 2 includes a pixel region 200 including a plurality of pixels. The image sensor 12 also includes a vertical selection unit 220, and pixel control lines 230 and vertical signal lines 240 connected to respective pixels. The image sensor 12 further includes column signal processing units 250, horizontal memory units 260, a horizontal selection unit 270, an output unit 280, and a TG (Timing Generator) 290.

The pixel region 200 includes CMOS sensor pixels each having a photoelectric conversion element and transistors (not shown), and pixels are arranged in a matrix in the horizontal direction and vertical direction. In FIG. 2, respective pixels are indicated by P(0101) to P(1616) to have upper two digits as a row number and lower two digits as a column number. FIG. 2 shows an example of 16×16 arrays, but the present invention is not limited to the specific numbers of rows and columns.

The vertical selection unit 220 selects pixel arrays of the pixel region 200 row by row, and controls a reset operation and read operation of the selected pixel row. Each pixel control line 230 is commonly connected to each pixel row and transfers a control signal of a row unit by the vertical selection unit 220. Each vertical signal line 240 is commonly connected to each pixel column, and signals of pixels of a row selected by the pixel control line 230 are read out onto the corresponding vertical signal lines 240. Each column signal processing unit 250 includes a CDS circuit, AGC circuit, and A/D converter (all three not shown) arranged for each vertical signal line 240. The CDS circuit samples and holds a signal of a pixel of a row unit, which is sent via the corresponding vertical signal linen 240, so as to remove fixed pattern noise caused by variations of thresholds of transistors in pixel circuits and to maintain a satisfactory S/N. The AGC circuit performs gain control. The A/D converter performs analog-to-digital conversion.

The horizontal memory units 260 are arranged for respective vertical signal lines 240, and store pixel signals of a row unit, which are converted into digital signals by the corresponding column signal processing units 250. The horizontal selection unit 270 selects the corresponding horizontal memory unit 260 for each column, and outputs the stored digital pixel signal to the signal processing unit 13 via the output unit 280. The TG 290 outputs various clock signals, control signals, and the like required for operations of the respective units of the image sensor 12 based on control signals from the synchronization control unit 15.

Exposure and read timing control operations of the image sensor 12 of this embodiment will be described in detail below. As described above, in the method described in FIG. 6 of Japanese Patent Laid-Open No. 2012-105225 and FIG. 9 of Japanese Patent Laid-Open No. 2011-244309, all lines of signals of pixels having different exposure times at 2-line intervals are read out at the same time. For this reason, correction processing and signal processing for long-term exposure pixels and those for short-term exposure pixels have to be switched and performed at 2-line intervals. Such processing imposes a heavy load on a signal processing circuit.

In addition, the HDR processing is to be performed together with positional deviation correction processing between long-term exposure pixels and short-term exposure pixels at 2-line intervals simultaneously with the correction processing and signal processing for the pixels. Thus, a further heavier load is imposed on the system of the overall image capturing apparatus.

Furthermore, since this method reads out all lines of signals of pixels having different exposure times at 2-line intervals using the rolling shutter operation, it requires a long read time from the first line to the last line. For this reason, a phenomenon called rolling distortion is readily generated, that is, a moving object is distorted by deviation amounts of exposure times for respective lines.

Figure 13:
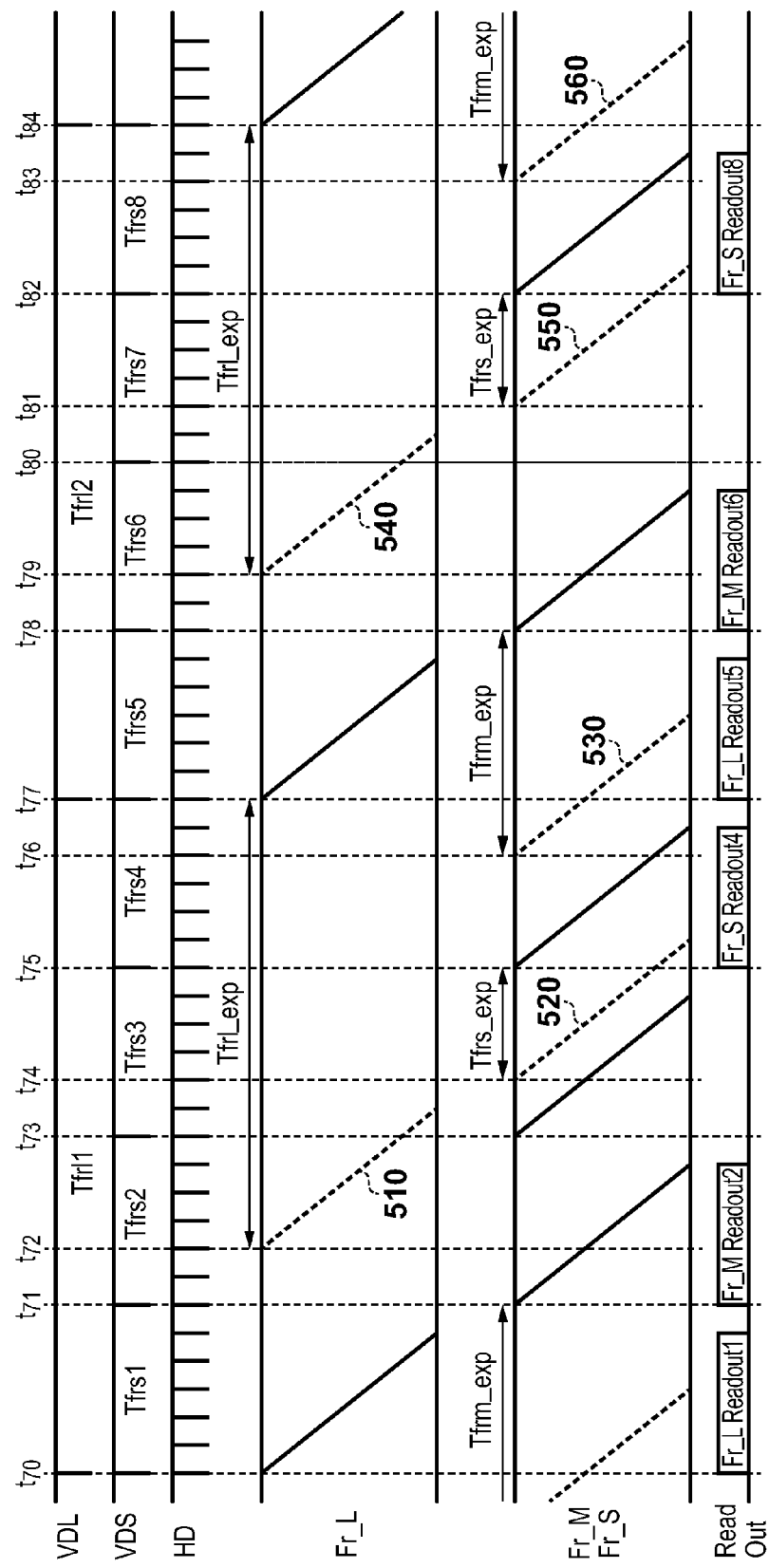
FIG. 13 is a timing chart showing control timings of an image sensor according to the fifth embodiment.

Also, the method described in FIG. 13 of Japanese Patent Laid-Open No. 2011-244309 requires that the center of short-term exposure always matches that of long-term exposure. Then, every time reset and read timings of the long-term exposure are changed due to a change in exposure time, reset and read timings have to be changed to match the center of the short-term exposure. Therefore, such method requires complicated timing control.

Furthermore, with this method, when an exposure time is shortened, a time required to read out short-term exposure lines may often exceed a half of a difference between the long-term exposure and short-term exposure. In this case, since a short-term exposure line read end timing interferes with a long-term exposure line read start timing, read operations for respective lines cannot be performed.

Hence, this embodiment realizes averaging of processing loads imposed on read operations of pixel signals while simplifying timing control by processing to be described below.

Figure 3:
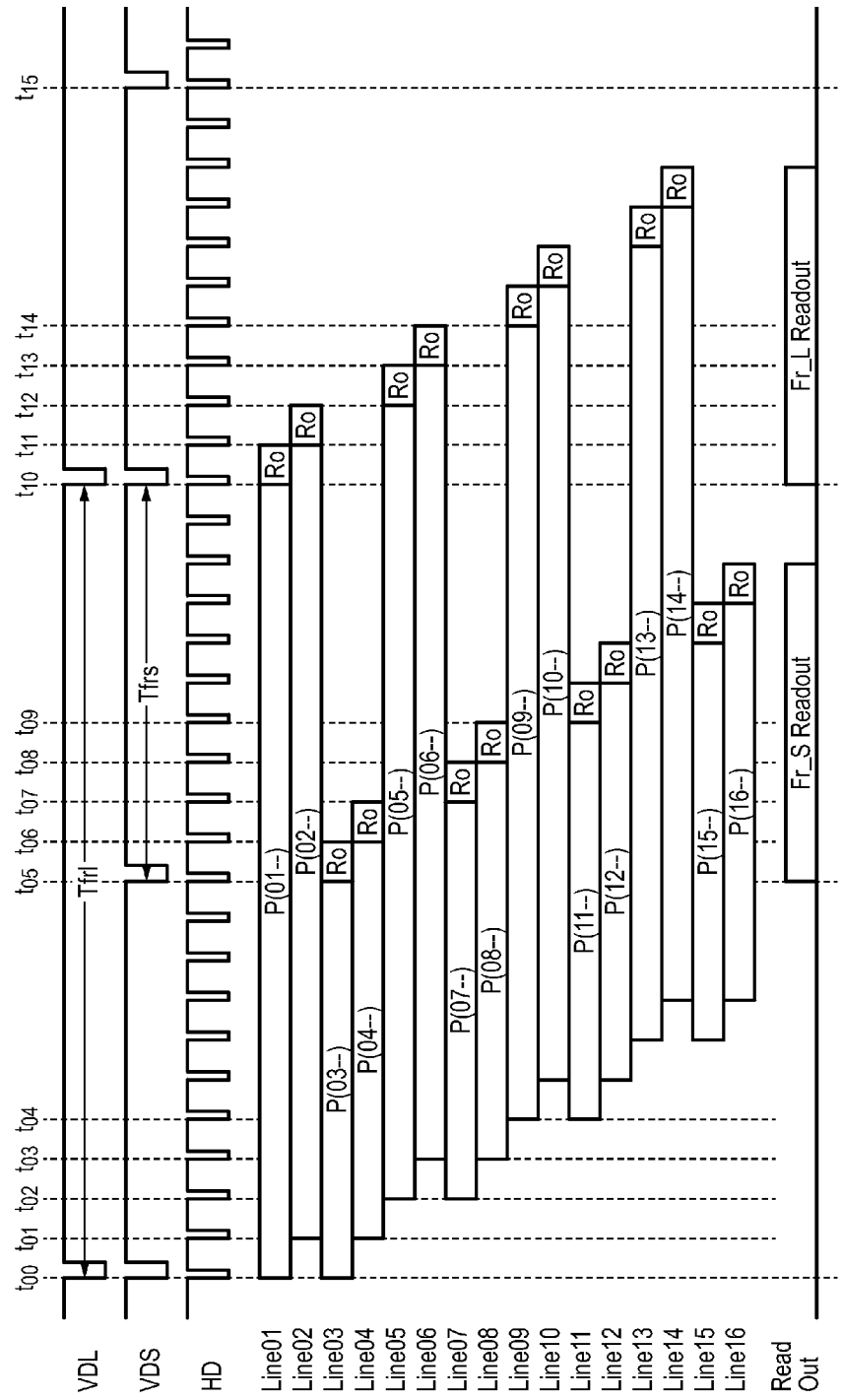
FIG. 3 is a timing chart showing control timings of an image sensor according to the first embodiment.

FIG. 3 is a timing chart showing control timings of the image sensor 12 according to this embodiment. In this embodiment, for the HDR processing, pixel rows of the pixel region 200 are set to alternately include lines for long-term exposure (to be referred to as "long-term exposure lines" hereinafter) and those for short-term exposure (to be referred to as "short-term exposure lines" hereinafter) in correspondence with the predetermined number of lines (for example, two lines).

Referring to FIG. 3, VDL represents a vertical synchronizing signal (long-term vertical synchronizing signal) for a long-term exposure frame, and a long-term vertical synchronizing period corresponding to one cycle of this signal is indicated by Tfrl. VDS represents a vertical synchronizing signal (short-term vertical synchronizing signal) for a short-term exposure frame, and a short-term vertical synchronizing period corresponding to one cycle of this signal is indicated by Tfrs. The vertical synchronizing period Tfrl corresponding to one cycle of the long-term vertical synchronizing signal is equal to N cycles (=N·Tfrs; N is a natural number not less than 2) of the short-term vertical synchronizing signal. In the example of FIG. 3, N=2, that is, the period Tfrl is equal to two cycles of the short-term vertical synchronizing signal. In this embodiment, these short-term vertical synchronizing signal and long-term vertical synchronizing signal are generated by the TG 290 as a synchronizing signal generation unit.

HD represents a horizontal synchronizing signal, which defines a period in which reset operations and read operations of pixels are performed for a row unit.

Line01 to Line16 represent states of operations of pixel rows P(01--) to P(16--) of the pixel region 200. In order to express pixel rows by row numbers, column numbers are expressed by "--". In this embodiment, in order to set different exposure times at 2-line intervals, assume that long-term exposure lines are lines 01, 02, 05, 06, 09, 10, 13, and 14, and short-term exposure lines are lines 03, 04, 07, 08, 11, 12, 15, and 16.

As a period required to read out signals of pixels of each line to the column signal processing units 250, and to output signals of pixels for one line from the output unit 280, a corresponding 1HD period is indicated by RO. In this case, since a period required to read out signals of pixels of each line to the column signal processing units 250 is sufficiently shorter than a period required to output signals of pixels for one line from the output unit 280, the next exposure frame starts from the RO period. In order to facilitate the HDR processing from signals having different exposure times at 2-line intervals, each pixel includes color filters of 2×2 arrays like a Bayer matrix.

ReadOut indicates output timings of a long-term exposure frame signal Fr_L Readout and short-term exposure frame signal Fr_S Readout, which are read out from pixels, from the output unit 280.

At timing t00, read operations of lines 01 and 03 are performed in synchronism with a first long-term vertical synchronizing signal VDL to reset pixels, thus starting exposure operations of lines 01 and 03.

At timing t01, read operations of lines 02 and 04 are performed to reset pixels, thus starting exposure operations of lines 02 and 04.

At timing t02, read operations of lines 05 and 07 are performed to reset pixels, thus starting exposure operations of lines 05 and 07.

At timing t03, read operations of lines 06 and 08 are performed to reset pixels, thus starting exposure operations of lines 06 and 08.

By the same method, lines 09 to 16 are reset to start exposure operations of lines 09 to 16.

In this way, pixels are reset every time 1HD elapses, thus starting a line-sequential rolling shutter operation.

Next, at timing t05 after an elapse of Tfrs since timing t00, signals of pixels of line 03 are output in synchronism with VDS during the period RO. At this time, exposure operations of line 01 is continued.

At timing t06, signals of pixels of line 04 are output during the period RO. At this time, the exposure operation of line 02 is continued.

At timing t07, signals of pixels of line 07 are output during the period RO. At this time, the exposure operation of line 05 is continued.

At timing t08, signals of pixels of line 08 are output during the period RO. At this time, the exposure operation of line 06 is continued.

By the same method, signals of pixels of lines 11, 12, 15, and 16 are output during the period RO. At this time, the exposure operations of lines 09, 10, 13, and 14 are continued.

In this manner, every time 1HD elapses, signals of pixels of lines 03, 04, 07, 08, 11, 12, 15, and 16 as short-term exposure lines are read out, thus ending the line-sequential rolling shutter operation of the short-term exposure frame. An output of the short-term exposure frame at this time is indicated by Fr_S Readout. Note that in this short-term exposure frame, since pixels are reset by performing pixel read operations, a longest exposure time is Tfrs as the vertical synchronizing period of the short-term exposure frame (short-term vertical synchronizing period).

Next, at timing t10 after an elapse of Tfrl since timing t00, signals of pixels of line 01 are output in synchronism with a second long-term vertical synchronizing signal VDL during the period RO.

At timing t11, signals of pixels of line 02 are output during the period RO.

At timing t12, signals of pixels of line 05 are output during the period RO.

At timing t13, signals of pixels of line 06 are output during the period RO.

By the same method, signals of pixels of lines 09, 10, 13, and 14 are output during the period RO.

In this manner, every time 1HD elapses, signals of pixels of lines 01, 02, 05, 06, 09, 10, 13, and 14 as long-term exposure lines are read out, thus ending the line-sequential rolling shutter operation of the long-term exposure frame. An output of the long-term exposure frame at this time is indicated by Fr_L Readout. Note that in this long-term exposure frame, since pixels are reset by performing pixel read operations, a longest exposure time is the long-term vertical synchronizing period Tfrl.

Furthermore, the long-term vertical synchronizing period Tfrl is a period twice of the short term vertical synchronizing period Tfrs including the output signal Fr_S Readout of the short-term exposure frame. Also, since the short-term exposure frame and long-term exposure frame are separately read out at 2-line intervals, a read-out time of each frame is nearly halved compared to an operation for reading out all lines at the same time.

FIG. 4 is a timing chart showing control timings of the long-term exposure frame and short-term exposure frame according to this embodiment. FIG. 4 shows the operations for respective lines in FIG. 3 as those for respective frames, and shows control timings that allow continuous shooting operations upon application to moving image shooting. Thus, in order to allow continuous shooting operations, control operations after timing t24 are returned to timing t20 and are repeated. Note that the same reference numerals in FIG. 4 denote the same operations and components as in FIG. 3.

A period between timings t20 to t24 corresponds to a first long-term vertical synchronizing period Tfrl1. Also, a period between timings t24 to t28 corresponds to a second long-term vertical synchronizing period Tfrl2. A period between timings t20 to t23 corresponds to a first short-term vertical synchronizing period Tfrs1. A period between timings t23 to t24 corresponds to a second short-term vertical synchronizing period Tfrs2. A period between timings t24 to t26 corresponds to a third short-term vertical synchronizing period Tfrs3. Then, a period between timings t26 to t28 correspond to a fourth short-term vertical synchronizing period Tfrs4.

F_L represents states of operations of lines 01, 02, 05, 06, 09, 10, 13, and 14 which form the long-term exposure frame. Fr_S represents states of operations of lines 03, 04, 07, 08, 11, 12, 15, and 16 which form the short-term exposure frame.

In the long-term exposure frame F_L, rolling shutter operations are successively performed for respective long-term vertical synchronizing periods Tfrl in synchronism with long-term vertical synchronizing signals VDL.

In the short-term exposure frame Fr_S, exposure operations of rolling shutter operations are started in synchronism with long-term vertical synchronizing signals VDL, and read operations of the rolling shutter operations are started in synchronism with next short-term vertical synchronizing signals VDS.

Such operations can also be explained as follows. That is, for short-term exposure lines, read operations of pixel signals are started in synchronism with the short-term vertical synchronizing signals VDS which do not overlap any read period of pixel signals of long-term exposure lines. Therefore, the exposure operation of a short-term exposure line, a read period of which overlaps that of pixel signals of a long-term exposure line, is skipped.

More specifically, during the first short-term vertical synchronizing period Tfrs1 included in the first long-term vertical synchronizing period Tfrl1, an output signal F_L Readout1 of the long-term exposure frame, the exposure operation of which was started at the timing one cycle before, is output. Next, during the second short-term vertical synchronizing period Tfrs2 included in the first long-term vertical synchronizing period Tfrl1, an output signal Fr_S Readout2 of the short-term exposure frame is output. Likewise, during the third short-term vertical synchronizing period Tfrs3 included in the second long-term vertical synchronizing period Tfrl2, an output signal F_L Readout3 of the long-term exposure frame is output. Next, during the fourth short-term vertical synchronizing period Tfrs4 included in the second long-term vertical synchronizing period Tfrl2, an output signal Fr_S Readout4 of the short-term exposure frame is output.

Thus, in this embodiment, the output signals F_L Readout of the long-term exposure frame and the output signals Fr_S Readout of the short-term exposure frame are alternately output. For this reason, processing loads imposed on read operations of output signals from the image sensor are averaged compared to the conventional operation for reading out all lines at the same time after completion of long-term exposure.

Exposure control using an electronic shutter will be described below.

During the first long-term vertical synchronizing period Tfrl1, electronic shutter operations of a long-term exposure frame and short-term exposure frame when an exposure time of the long-term exposure frame is controlled beyond the short-term vertical synchronizing period Tfrs is performed.

In a short-term exposure frame Fr_S during the first long-term vertical synchronizing period Tfrl1, pixels of line 03 are reset in synchronism with the horizontal synchronizing signal HD at timing t21, thus starting an exposure operation of line 03. The reset operation at this time is indicated by a broken line 410. Subsequently, every time 1HD elapses, pixels of lines 04, 07, 08, 11, 12, 15, and 16 are respectively reset, thus starting the line-sequential rolling shutter operation of the short-term exposure frame Fr_S. The reset operations at this time are also respectively indicated by broken lines.

Next, at timing t23 after an elapse of an exposure time Tfrs_expl since timing t21, a read operation of line 03 is performed in synchronism with VDS. At this time, the exposure time Tfrs_expl amounts to 7HD. Subsequently, every time 1HD elapses, lines 04, 07, 08, 11, 12, 15, and 16 are respectively read out, thus ending the line-sequential rolling shutter operations of the short-term exposure frame Fr_S.

In this way, in the short-term exposure frame Fr_S, all lines output signals having the exposure time Tfrs_expl. An output signal of the short-term exposure frame Fr_S at this time corresponds to Fr_S Readout2 during the second short-term vertical synchronizing period Tfrs2.

At this time, in a long-term exposure frame F_L during the first long-term vertical synchronizing period Tfrl1, pixels of line 01 are reset in synchronism with the horizontal synchronizing signal HD at timing t22, thus starting an exposure operation of line 01. The reset operation at this time is indicated by a broken line 420. Subsequently, every time 1HD elapses, lines 02, 05, 06, 09, 10, 13, and 14 are respectively reset, thus starting the line-sequential rolling shutter operation of the long-term exposure frame F_L. The reset operations at this time are also respectively indicated by broken lines.

At timing t24 after an elapse of an exposure time Tfrl_expl since timing t22, a read operation of line 01 is performed in synchronism with VDL. In continuous shooting operations, after timing t24, control operations are returned to timing t20 and are repeated. However, in this case, a description will be continuously given until the end of the operation of the long-term exposure frame F_L. At this time, the exposure time Tfrl_expl amounts to 14HD. Subsequently, every time 1HD elapses, lines 02, 05, 06, 09, 10, 13, and 14 are respectively read out, thus ending the line-sequential rolling shutter operation of the long-term exposure frame F_L.

In this manner, in the long-term exposure frame F_L, all lines output signals having the exposure time Tfrl_expl. An output signal of the long-term exposure frame F_L at this time corresponds to F_L Readout3 during the third short-term vertical synchronizing period Tfrs3.

The exposure control operations using the electronic shutter, which are performed during the first long-term vertical synchronizing period Tfrl1, have been described. In this case, a ratio between the exposure time Tfrs_expl of the short-term exposure frame and the exposure time Tfrl_expl of the long-term exposure frame is 7HD:14HD=1:2.

Exposure control operations using the electronic shutter performed during the second long-term vertical synchronizing period Tfrl2 will be described below. During the second long-term vertical synchronizing period Tfrl2, electronic shutter operations of a long-term exposure frame, an exposure time of which is controlled to fall within the short-term vertical synchronizing period Tfrs, and a short-term exposure frame are performed. Furthermore, a case will be assumed wherein an exposure condition is changed with respect to the first long-term vertical synchronizing period Tfrl1 of the aforementioned preceding frame.

In a short-term exposure frame Fr_S during the second long-term vertical synchronizing period Tfrl2, pixels of line 03 are reset in synchronism with the horizontal synchronizing signal HD at timing t25, thus starting an exposure operation of line 03. The reset operation at this time is indicated by a broken line 430. Subsequently, every time 1HD elapses, lines 04, 07, 08, 11, 12, 15, and 16 are respectively reset, thus starting a line-sequential rolling shutter operation of the short-term exposure frame Fr_S. The reset operations at this time are also respectively indicated by broken lines.

Next, at timing t26 after an elapse of an exposure time Tfrs_exps since timing t25, a read operation of line 03 is performed in synchronism with VDS. At this time, the exposure time Tfrs_exps amounts to 2HD. Subsequently, every time 1HD elapses, lines 04, 07, 08, 11, 12, 15, and 16 are respectively read out, thus ending the line-sequential rolling shutter operation of the short-term exposure frame Fr_S.

Thus, in the short-term exposure frame Fr_S, all lines output signals having the exposure time Tfrs_exps. An output signal of the short-term exposure frame Fr_S at this time corresponds to Fr_S Readout4 during the fourth short-term vertical synchronizing period Tfrs4.

At this time, in a long-term exposure frame F_L during the second long-term vertical synchronizing period Tfrl2, pixels of line 01 are reset in synchronism with the horizontal synchronizing signal HD at timing t27, thus starting an exposure operation of line 01. The reset operation at this time is indicated by a broken line 440. Subsequently, every time 1HD elapses, lines 02, 05, 06, 09, 10, 13, and 14 are respectively reset, thus starting a line-sequential rolling shutter operation of the long-term exposure frame F_L. The reset operations at this time are also respectively indicated by broken lines.

Next, at timing t28 after an elapse of an exposure time Tfrl_exps since timing t27, a read operation of line 01 is performed in synchronism with VDL. At this time, the exposure time Tfrl_exps amounts to 4HD. Subsequently, every time 1HD elapses, lines 02, 05, 06, 09, 10, 13, and 14 are respectively read out, thus ending the line-sequential rolling shutter operation of the long-term exposure frame F_L.

Thus, in the long-term exposure frame F_L, all lines output signals having the exposure time Tfrl_exps. An output signal of the long-term exposure frame F_L at this time corresponds to Readout after timing t28.

The exposure control operations using the electronic shutter, which are performed during the second long-term vertical synchronizing period Tfrl2, have been explained. In this case, a ratio between the exposure time Tfrs_exps of the short-term exposure frame and the exposure time Tfrl_exps of the long-term exposure frame is 2HD:4HD=1:2.

These electronic shutter operations control the ratio between exposure times in the short-term exposure and long-term exposure to be constant (1:2) in respective frames. For this reason, a gain value used to compensate for a sensitivity ratio is set to be twice of a signal of a short-term exposure pixel. Then, HDR processing can be executed by composing signals of long-term exposure pixels and those of short-term exposure pixels.

Next, a shooting operation and HDR processing of this embodiment will be described below. The HDR processing composes first image data obtained by the long-term exposure and second image data obtained by the short-term exposure to create third image data, a dynamic range of which is expanded with respect to the first and second image data. The HDR processing is performed by the signal processing unit 13 shown in FIG. 1.

The signal processing unit 13 performs pixel signal correction processing, positional deviation correction processing, HDR processing, and image signal processing for pixel signals output from the image sensor 12, thereby generating an image, a dynamic range of which is expanded. A case will be described below wherein the output signal Fr_S Readout2 of the short-term exposure frame Fr_S and the output signal F_L Readout3 of the long-term exposure frame are used.

Initially, the pixel signal correction processing is applied to the output signal Fr_S Readout2 of the short-term exposure frame, which is output in synchronism with the short-term vertical synchronizing signal VDS. As the pixel signal correction signal, for example, correction processing including scratch correction, fixed pattern correction, shading correction, and the like is executed. Next, since the positions of long-term exposure lines and short-term exposure lines are deviated at 2-line intervals, the positional deviation correction processing is executed to fit the output signal F_L Readout3 of the long-term exposure frame which is to be output later. Although the pixel region 200 shown in FIG. 2 includes only 16 lines, it actually includes about 960 lines or 2048 lines. Therefore, even when the pixel region 200 is divided into a short-term exposure frame and long-term exposure frame, positional deviation correction can be performed while maintaining a sufficiently high resolution. The positional deviation correction processing calculates pixel signals at the time of short-term exposure at positions of lines 01, 02, 05, 06, 09, 10, 13, and 14 using lines 03, 04, 07, 08, 11, 12, 15, and 16 of the short-term exposure frame. For example, a method of calculating lines 05 and 06 at the time of short-term exposure by interpolation using lines 03, 04, 07, and 08 of the short-term exposure frame is available. Furthermore, as a part of the HDR processing, in order to compensate for the exposure time ratio=1:2 of the short-term exposure frame and long-term exposure frame, a 2× gain value is multiplied.

Pixel signals of lines 01, 02, 05, 06, 09, 10, 13, and 14 corresponding to the short-term exposure frame calculated in this way are stored in a memory (not shown) included in the signal processing unit 13. Then, the same pixel signal correction processing is applied to the output signal F_L Readout3 of the long-term exposure frame, which is output in synchronism with the next long-term vertical synchronizing signal VDL.

Next, the HDR processing is performed between stored pixel signals of lines 01, 02, 05, 06, 09, 10, 13, and 14 corresponding to the short-term exposure frame and those of lines 01, 02, 05, 06, 09, 10, 13, and 14 of the long-term exposure frame. Since pixel signals of the short-term exposure frame have already been multiplied by gain values used to compensate for the exposure time, signals of long-term exposure pixels and those of short-term exposure pixels are composed using weighting coefficients according to brightness levels in the HDR processing to be executed in this case. As a composition method according to brightness level, for example, the following method can be used. Initially, assume that a sum of a weighting coefficient of a signal of a long-term exposure pixel and that of a signal of a short-term exposure pixel is set to be a constant value (=1). When an image is bright, the weighting coefficient of the signal of the short-term exposure pixel is set to be larger. On the other hand, when an image is dark, the weighting coefficient of the signal of the long-term exposure pixel is set to be larger. Since the signal processes for each pixel are executed so far, the image signal processing is performed lastly, thereby generating an image, a dynamic range of which is expanded. As the image signal processing, signal processing including white balance adjustment processing, color correction processing, gamma correction processing, and the like is executed.

In this way, upon outputting the signals of the short-term exposure frame, the pixel signal correction processing, positional deviation correction processing, and gain correction required to compensate for the exposure time are performed only for the short-term exposure frame. On the other hand, upon outputting of the signals of the long-term exposure frame, the pixel signal correction processing, HDR processing, and image signal processing for only the long-term exposure frame are performed. In this manner, the processing loads can be distributed.

Furthermore, in a moving image shooting operation, an image of the second short-term vertical synchronizing period Tfrs2 is created using the output signal F_L Readout1 of the long-term exposure frame and the output signal Fr_S Readout2 of the short-term exposure frame. Also, an image of the next third short-term vertical synchronizing period Tfrs3 is created using the output signal Fr_S Readout2 of the short-term exposure frame and the output signal F_L Readout3 of the long-term exposure frame. In this manner, since the HDR processing is performed using newly output image signals, the resolution of a moving image in the moving image shooting operation may be improved.

When a still image is to be created from output signals of two successive exposure frames, output signals, which are output in an order of a short-term exposure frame and long-term exposure frame having larger overlaps of exposure times, may be used. For example, the output signals Fr_S Readout2 and F_L Readout3 or the output signals Fr_S Readout4 and F_L Readout5 (not shown) may be used. Thus, a still image, which is less blurred, and a dynamic range of which is expanded, can be created.

In the aforementioned first embodiment, short-term exposure lines and long-term exposure lines are read out in independent frames in synchronism with frame cycles at the time of short-term exposure. Also, within a frame period at the time of long-term exposure, short-term exposure lines are read out in synchronism with frame cycles at the time of short-term exposure. Thus, the read control system can be simplified, and processing loads at the time of read operations and signal processing can be reduced and averaged.

Exposure operations of pixel signals of this embodiment are performed in synchronism with the long-term vertical synchronizing signal or short-term vertical synchronizing signal. Therefore, the need for complicated processing required to match the center of short-term exposure with that of long-term exposure can be obviated, and read timing control of pixel signals can be simplified. Furthermore, an interference problem between the short-term exposure line read end timing and long-term exposure line read start timing, which problem may be posed when the centers of exposure times of long-term exposure and short-term exposure are matched, can be avoided.

In the aforementioned embodiment, the long-term vertical synchronizing period is twice the short-term vertical synchronizing period in correspondence with the exposure time ratio=1:2 of the short-term exposure frame and long-term exposure frame. For this reason, the exposure times of the long- and short-term exposure frames can be effectively used, and exposure time control can be avoided from being complicated.

Furthermore, since short-term exposure lines are read out in synchronism with frame cycles at the time of short-term exposure within the frame period at the time of long-term exposure, the long-term exposure and short-term exposure can be executed to overlap each other. For this reason, even when a uniform frame rate is used, the long-term exposure which exceeds one frame at the time of short-term exposure can be realized. In addition, generation of a wasteful time which does not contribute to exposure in the multi-exposure method can also be avoided.

Then, since short-term exposure lines and long-term exposure lines are read out in independent frames, generation of a rolling distortion can be halved.

A modification of this embodiment will be described below. In the aforementioned positional deviation correction processing, pixel signals at the time of short-term exposure of positions of long-term exposure lines are calculated using short-term exposure lines. However, all lines, that is, lines 01 to 16 may be used instead as a short-term exposure frame. At this time, pixel signals of lines 03, 04, 07, 08, 11, 12, 15, and 16 corresponding to a long-term exposure frame are calculated using lines 01, 02, 05, 06, 09, 10, 13, and 14 of the long-term exposure frame. Then, all lines, that is, lines 01 to 16 are used as the long-term exposure frame. In this manner, an image, a dynamic range of which is expanded, can be generated using all 16×16 pixels.

Another modification of this embodiment will be described below. In the image signal processing of this embodiment, the signal processing including the white balance adjustment processing, color correction processing, gamma correction processing, and the like is executed after the HDR processing. However, the image signal processing may be distributed. At this time, the white balance adjustment processing and color correction processing are applied to output signals of a short-term exposure frame after gain values used to compensate for the exposure time are multiplied, and the processed output signals are stored in the memory. Then, the white balance adjustment processing and color correction processing are applied to output signals of a long-term exposure frame, which have undergone the pixel signal correction processing. After that, the HDR processing is applied, and the gamma correction processing is performed as the image signal processing lastly. In this manner, an image, a dynamic range of which is expanded, is generated.

Figure 9A:
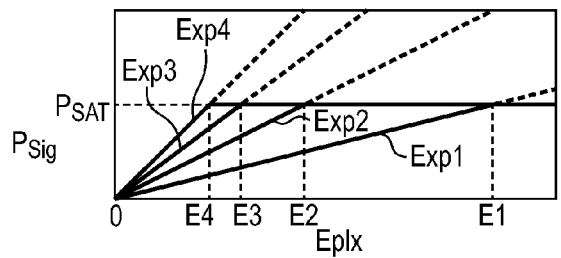
FIGS. 9A to 9E are graphs showing pixel characteristics and image signal characteristics according to modifications of the first to third embodiments.

Still another modification of this embodiment will be described below with reference to FIGS. 9A to 9C. FIG. 9A is a pixel characteristic graph showing the relations between an image capturing plane illuminance Eplx and pixel output signal Psig of the pixel region 200. Pixel characteristics Exp1, Exp2, Exp3, and Exp4 represent the relations between the image capturing plane illuminance Eplx and pixel output signal Psig. These characteristics represent those when exposure frame periods are respectively Tfrs, 2Tfrs, 3Tfrs, and 4Tfrs, and an exposure time ratio by the electronic shutter is controlled to be 1:2:3:4. Thus, with reference to the pixel characteristic Exp1, gradients of the pixel characteristics Exp2, Exp3, and Exp4 are respectively twice, three times, and four times of that of the characteristic Exp1. PSAT represents a saturated signal amount of a pixel. Since the pixel characteristics Exp1, Exp2, Exp3, and Exp4 reach the saturated signal amount PSAT respectively at image capturing plane illuminance levels E1, E2, E3, and E4, output signals are no longer increased at these illuminance levels or higher. Broken curves indicate characteristics under the assumption that the pixel characteristics Exp1, Exp2, Exp3, and Exp4 are never saturated.

Figure 9B:
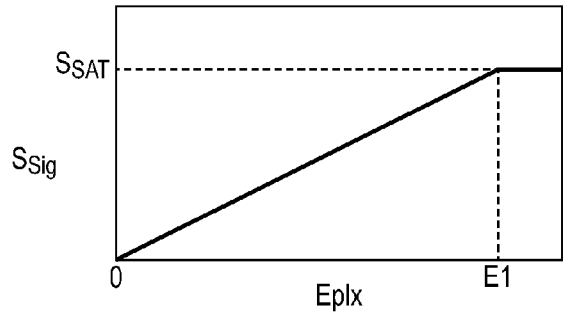

FIG. 9B is an image signal characteristic graph showing the relation between the image capturing plane illuminance Eplx of the pixel characteristic Exp1 and an image signal Ssig used in the image signal processing. In FIG. 9A, since a pixel is saturated at the image capturing plane illuminance level E1, the image signal also has a characteristic, which is saturated at SSAT. Then, as can be seen from FIG. 9B, an image signal is output to have tones from 0 to SSAT in correspondence with image capturing plane illuminance levels 0 to E1. This pixel characteristic is obtained when the HDR processing is not performed.

Figure 9C:
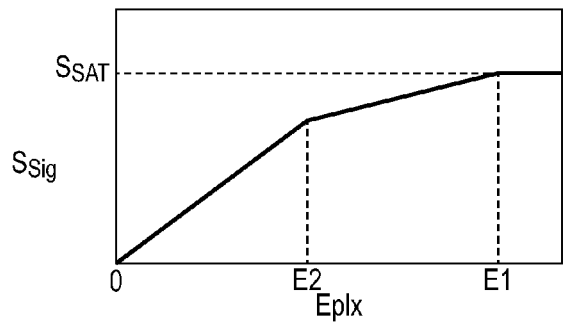

FIG. 9C is an image signal characteristic graph showing the relation between the image capturing plane illuminance Eplx and the image signal Ssig used in the image signal processing when the HDR processing is performed using the pixel characteristics Exp1 and Exp2. In this embodiment, the pixel characteristics Exp1 and Exp2 respectively correspond to an output signal of a short-term exposure frame and that of a long-term exposure frame. The HDR processing method is implemented by adding the pixel characteristics Exp1 and Exp2 and normalizing the sum characteristic so that a maximum saturation signal matches SSAT. In an image capturing plane illuminance range from 0 to E2, the pixel characteristics Exp1 and Exp2 shown in FIG. 9A are added to obtain a pixel characteristic corresponding to a sensitivity three times that of Exp1. In an image capturing plane illuminance range from E2 to E1, since the pixel characteristic Exp2 is saturated in FIG. 9A, PSAT and the pixel characteristic Exp1 are added. At the image capturing plane illuminance level E1 or higher, since both the pixel characteristics Exp1 and Exp2 are saturated in FIG. 9A, 2PSAT as a maximum saturated signal amount is used.

By normalizing the pixel characteristic added in this way so that the maximum saturated signal amount 2PSAT matches SSAT, the HDR processing shown in FIG. 9C is implemented. Then, the image capturing apparatus can be controlled to operate the image sensor 12, as shown in FIG. 4, and to control the signal processing unit 13 to perform the HDR processing so as to attain the characteristic shown in FIG. 9C.

In this manner, as can be seen from FIG. 9C, the image signal is output to have tones from 0 to SSAT in correspondence with the image capturing plane illuminance range from 0 to E1. Furthermore, upon comparison of the gradient of the image signal characteristic within the image capturing plane illuminance range from 0 to E2 with that of the pixel characteristic Exp1 in FIG. 9B, since (3× sensitivity or equivalent)/(2× maximum saturated signal amount)=1.5×, the dynamic range is expanded to 1.5×.

When the saturation signal SSAT of the image signal characteristic can be used up to 2SSAT, the dynamic range can be expanded up to 3×. FIG. 9C shows an input/output characteristic known as a gamma characteristic, thereby expanding the dynamic range.

Second Embodiment

In the first embodiment, two frames, that is, a long-term exposure frame and short-term exposure frame are set to have different exposure times at 2-line intervals. In the second embodiment, by further adding a frame having a different exposure time, an image with a broader dynamic range is generated. A case will be described below wherein a middle-term exposure frame is set in addition to a long-term exposure frame and short-term exposure frame as frames having different exposure times at 2-line intervals. Note that in this embodiment, the basic arrangement and operation of an image capturing apparatus and those of an image sensor are the same as those in the first embodiment. Therefore, in this embodiment, FIGS. 1 and 2 will also be quoted, and the same reference numerals in FIGS. 5 and 6 to be described below denote the same elements as in FIGS. 3 and 4.

Figure 5:
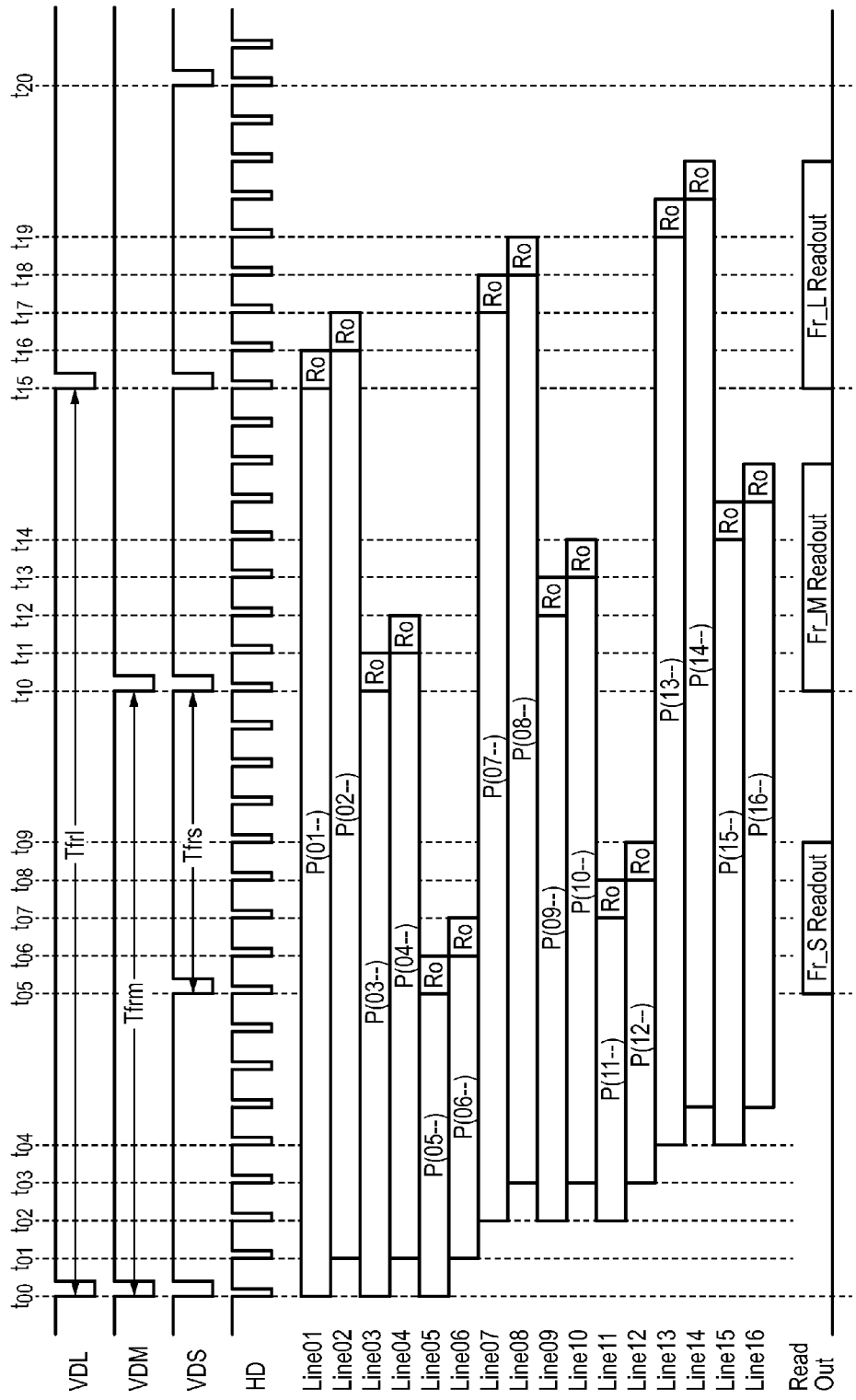
FIG. 5 is a timing chart showing control timings of an image sensor according to the second embodiment.

FIG. 5 is a timing chart showing control timings of an image sensor 12 according to this embodiment. In this embodiment, for HDR processing, lines for middle-term exposure (to be referred to as "middle-term exposure lines" hereinafter) are set in addition to long-term exposure lines and short-term exposure lines at 2-line intervals in the pixel region 200. An exposure time of the middle-term exposure is set to have a middle time duration between an exposure time of the long-term exposure and that of the short-term exposure.

Referring to FIG. 5, VDM represents a vertical synchronizing signal (middle-term vertical synchronizing signal) for a middle-term exposure frame, and a middle-term vertical synchronizing period corresponding to one cycle of this signal is indicated by Tfrm. The middle-term vertical synchronizing period Tfrm is equal to N cycles (=N·Tfrs; where N is a natural number not less than 2) of a short-term vertical synchronizing signal. In the example of FIG. 5, N=2. A long-term vertical synchronizing period Tfrl is equal to M cycles (=M·Tfrs; M is a natural number larger than N) of the short-term vertical synchronizing signal. In the example of FIG. 5, M=3, that is, the period Tfrl is equal to three cycles of the short-term vertical synchronizing signal. In this embodiment, these short-term vertical synchronizing signal, long-term vertical synchronizing signal, and middle-term vertical synchronizing signal are generated by a TG 290 as a synchronizing signal generation unit.

In this case, in order to set different exposure times at 2-line intervals, assume that long-term exposure lines are lines 01, 02, 07, 08, 09, 13, and 14, middle-term exposure lines are lines 03, 04, 09, 10, 15, and 16, and short-term exposure lines are lines 05, 06, 11, and 12. As a period required to read out signals of pixels of each line to column signal processing units 250, and to output signals of pixels for one line from an output unit 280, a corresponding 1HD period is indicated by RO. In this case, since a period required to read out signals of pixels of each line to the column signal processing units 250 is sufficiently shorter than a period required to output signals of pixels for one line from the output unit 280, the next exposure frame starts from the RO period. In order to facilitate HDR processing from signals having different exposure times at 2-line intervals, each pixel includes color filters of 2×2 arrays like a Bayer matrix. ReadOut indicates output timings of readout pixel signals from the output unit 280. The following three types of Readout are used.

(1) An output signal F_L Readout of a long-term exposure frame read out from pixels.

(2) An output signal Fr_M Readout of a middle-term exposure frame.

(3) An output signal Fr_S Readout of a short-term exposure frame.

At timing t00, read operations of lines 01, 03, and 05 are performed in synchronism with VDL, VDM, and VDS to reset pixels, thus starting exposure operations of lines 01, 03, and 05.

At timing t01, read operations of lines 02, 04, and 06 are performed to reset pixels, thus starting exposure operations of lines 02, 04, and 06.

At timing t02, read operations of lines 07, 09, and 11 are performed to reset pixels, thus starting exposure operations of lines 07, 09, and 11.

At timing t03, read operations of lines 08, 10, and 12 are performed to reset pixels, thus starting exposure operations of lines 08, 10, and 12.

By the same method, lines 13 to 16 are reset to start exposure from lines 13 to 16.

In this way, pixels are reset every time 1HD elapses, thus starting a line-sequential rolling shutter operation.

Next, at timing t05 after an elapse of Tfrs since timing t00, signals of pixels of line 05 are output in synchronism with VDS during the period RO. At this time, the exposure operations of lines 01 and 03 are continued.

At timing t06, signals of pixels of line 06 are output during the period RO. At this time, the exposure operations of lines 02 and 04 are continued.

At timing t07, signals of pixels of line 11 are output during the period RO. At this time, the exposure operations of lines 07 and 09 are continued.

At timing t08, signals of pixels of line 12 are output during the period RO. At this time, the exposure operations of lines 08 and 10 are continued.

Likewise, the exposure operations of lines 13, 14, 15, and 16 are continued.

In this manner, every time 1HD elapses, lines 05, 06, 11, and 12 as short-term exposure lines are read out, thus ending the line-sequential rolling shutter operation of the short-term exposure frame. An output of the short-term exposure frame at this time is indicated by Fr_S Readout. Note that in this short-term exposure frame, since pixels are reset by performing pixel read operations, a longest exposure time is Tfrs as the short-term vertical synchronizing period.

Next, at timing t10 after an elapse of Tfrm since timing t00, signals of pixels of line 03 are output in synchronism with VDM during the period RO. At this time, the exposure operation of line 01 is continued.

At timing t11, signals of pixels of line 04 are output during the period RO. At this time, the exposure operation of line 02 is continued.

At timing t12, signals of pixels of line 09 are output during the period RO. At this time, the exposure operation of line 07 is continued.

At timing t13, signals of pixels of line 10 are output during the period RO. At this time, the exposure operation of line 08 is continued.

By the same method, read operations of lines 15 and 16 are performed. At this time, the exposure operations of lines 13 and 14 are continued.

In this manner, every time 1HD elapses, lines 03, 04, 09, 10, 15, and 16 as middle-term exposure lines are read out, thus ending the line-sequential rolling shutter operation of the middle-term exposure frame. An output of the middle-term exposure frame at this time is indicated by Fr_M Readout. Note that in this middle-term exposure frame, since pixels are reset by performing pixel read operations, a longest exposure time is the middle-term vertical synchronizing period Tfrm.

Furthermore, the middle-term vertical synchronizing period Tfrm is a period twice of the short-term vertical synchronizing period Tfrs including the output signal Fr_S Readout of the short-term exposure frame.

Next, at timing t15 after an elapse of Tfrl since timing t00, signals of pixels of line 01 are output in synchronism with VDL during the period RO.

At timing t16, signals of pixels of line 02 are output during the period RO.

At timing t17, signals of pixels of line 07 are output during the period RO.

At timing t18, signals of pixels of line 08 are output during the period RO.

By the same method, read operations of lines 13 and 14 are performed.

In this manner, every time 1HD elapses, lines 01, 02, 07, 08, 13, and 14 as long-term exposure lines are read out, thus ending the line-sequential rolling shutter operation of the long-term exposure frame. An output of the long-term exposure frame at this time is indicated by F_L Readout. Note that in this long-term exposure frame, since pixels are reset by performing pixel read operations, a longest exposure time is the long-term vertical synchronizing period Tfrl.

Furthermore, the long-term vertical synchronizing period Tfrl is a period three times of the short term vertical synchronizing period Tfrs including the output signal Fr_S Readout of the short-term exposure frame. Also, since the short-term exposure lines, middle-term exposure lines, and long-term exposure lines are separately read out at 2-line intervals, a read-out time of each frame is about ⅓ compared to an operation for reading out all lines at the same time.

Figure 6:
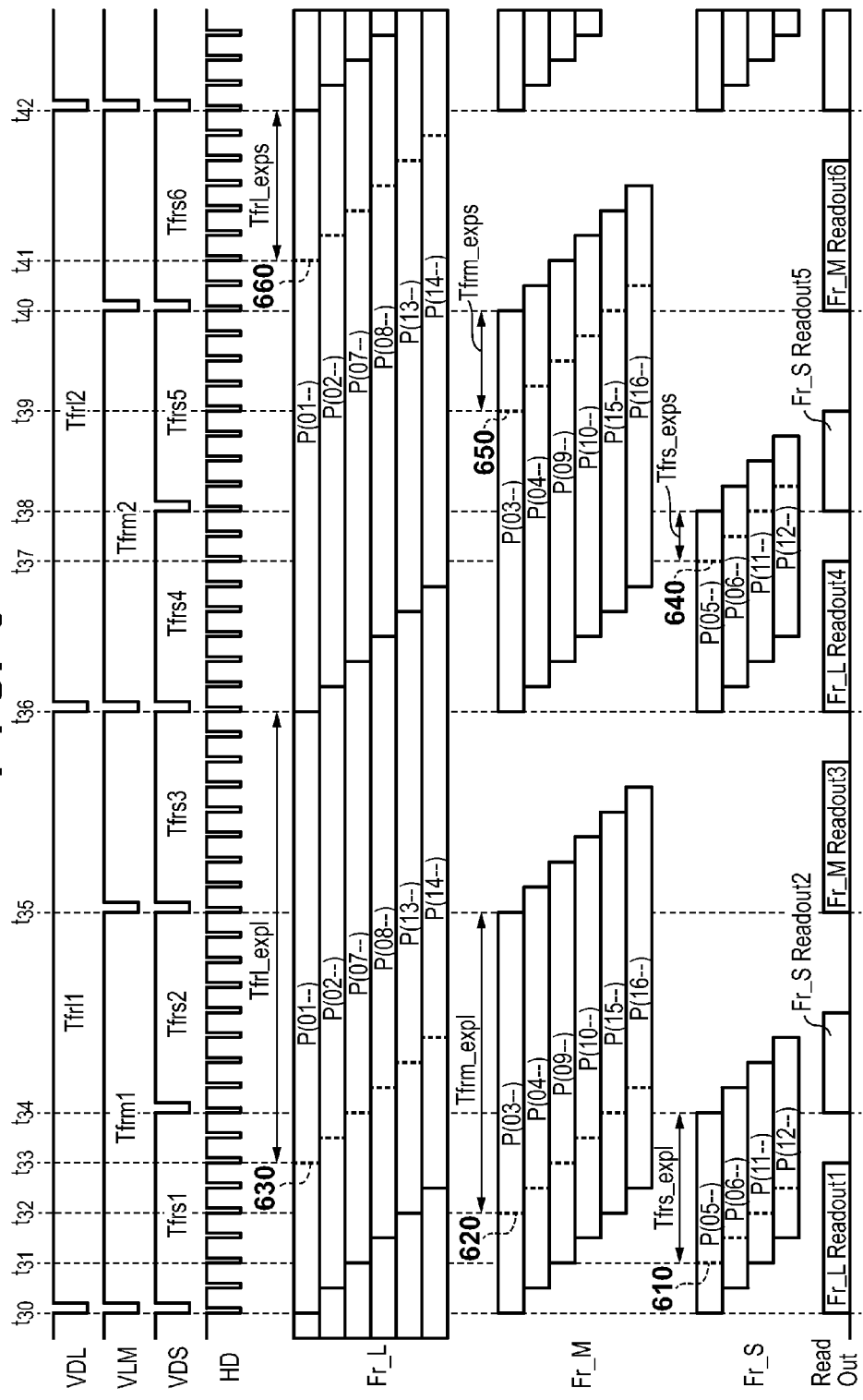
FIG. 6 is a timing chart showing control timings of the image sensor according to the second embodiment.

FIG. 6 is a timing chart showing control timings of the long-term exposure frame, middle-term exposure frame, and short-term exposure frame according to this embodiment. FIG. 6 shows the operations for respective lines in FIG. 5 as those for respective frames, and shows control timings that allow continuous shooting operations upon application to moving image shooting. Thus, in order to allow continuous shooting operations, control timings after timing t36 are returned to timing t30 and are repeated. Note that the same reference numerals in FIG. 6 denote the same operations and components as in FIG. 5.

A period between timings t30 to t36 corresponds to a first long-term vertical synchronizing period Tfrl1. Also, a period between timings t36 to t42 corresponds to a second long-term vertical synchronizing period Tfrl2.

A period between timings t30 to t35 corresponds to a first middle-term vertical synchronizing period Tfrm1. Also, a period between timings t36 to t40 corresponds to a second middle-term vertical synchronizing period Tfrm2.

A period between timings t30 to t34 corresponds to a first short-term vertical synchronizing period Tfrs1.

A period between timings t34 to t35 corresponds to a second short-term vertical synchronizing period Tfrs2.

A period between timings t35 to t36 corresponds to a third short-term vertical synchronizing period Tfrs3.

A period between timings t36 to t38 corresponds to a fourth short-term vertical synchronizing period Tfrs4.

A period between timings t38 to t40 corresponds to a fifth short-term vertical synchronizing period Tfrs5.

A period between timings t40 to t42 corresponds to a sixth short-term vertical synchronizing period Tfrs6.

F_L represents states of operations of lines 01, 02, 07, 08, 13, and 14 which form the long-term exposure frame. Fr_M represents states of operations of lines 03, 04, 09, 10, 15, and 16 which form the middle-term exposure frame. Fr_S represents states of operations of lines 05, 06, 11, and 12, which forms the short-term exposure frame.

In the long-term exposure frame F_L, rolling shutter operations are successively performed for the long-term exposure lines during respective long-term vertical synchronizing periods Tfrl in synchronism with long-term vertical synchronizing signals VDL.

In the middle-term exposure frame Fr_M, rolling shutter operations are started for the middle-term exposure lines during the first and second middle-term vertical synchronizing periods Tfrm1 and Tfrm2 in synchronism with long-term vertical synchronizing signals VDL. After that, pixel signal read operations are started for the middle-term exposure lines in synchronism with next middle-term vertical synchronizing signals VDM. Such operations can also be explained as follows. That is, for middle-term exposure lines, read operations of pixel signals are started in synchronism with the middle-term vertical synchronizing signals VDM which do not overlap any read period of pixel signals of long-term exposure lines.

Furthermore, in the short-term exposure frame Fr_S, exposure operations of rolling shutter operations are started for the short-term exposure lines in synchronism with long-term vertical synchronizing signals VDL. After that, pixel signal read operations are started for the short-term exposure lines in synchronism with next short-term vertical synchronizing signals VDS. In this case, for short-term exposure lines, read operations of pixel signals are started in synchronism with the short-term vertical synchronizing signals VDS which do not overlap any read period of pixel signals of long-term exposure lines and do not overlap any read periods of pixel signals of middle-term exposure lines.

More specifically, during the first short-term vertical synchronizing period Tfrs1 included in the first long-term vertical synchronizing period Tfrl1, an output signal F_L Readout1 of the long-term exposure frame, the exposure operation of which was started at the timing one cycle before, is output. Next, during the second short-term vertical synchronizing period Tfrs2 included in the first long-term vertical synchronizing period Tfrl1, an output signal Fr_S Readout2 of the short-term exposure frame is output. Next, during the third short-term vertical synchronizing period Tfrs3 included in the first long-term vertical synchronizing period Tfrl1, an output signal Fr_M Readout3 of the middle-term exposure frame is output.

Likewise, during the fourth short-term vertical synchronizing period Tfrs4 included in the second long-term vertical synchronizing period Tfrl2, an output signal F_L Readout4 of the long-term exposure frame is output. Next, during the fifth short-term vertical synchronizing period Tfrs5 included in the second long-term vertical synchronizing period Tfrl2, an output signal Fr_S Readout5 of the short-term exposure frame is output. Next, during the sixth short-term vertical synchronizing period Tfrs6 included in the second long-term vertical synchronizing period Tfrl2, an output signal Fr_M Readout6 of the middle-term exposure frame is output.

Thus, in this embodiment, the output signals F_L Readout, Fr_S Readout, and Fr_M Readout are repetitively output in turn in synchronism with VDS. For this reason, read operations of output signals from the image sensor are averaged compared to the conventional operation for reading out all lines at the same time after completion of long-term exposure.

Exposure control using an electronic shutter will be described below.

During the first long-term vertical synchronizing period Tfrl1, electronic shutter operations of a long-term exposure frame, middle-term exposure frame, and short-term exposure frame when an exposure time of the long-term exposure frame is controlled beyond the short-term vertical synchronizing Tfrs is performed.

In a short-term exposure frame Fr_S during the first long-term vertical synchronizing period Tfrl1, pixels of line 05 are reset in synchronism with the horizontal synchronizing signal HD at timing t31, thus starting an exposure operation of line 05. The reset operation at this time is indicated by a broken line 610. Subsequently, every time 1HD elapses, pixels of lines 06, 11, and 12 are respectively reset, thus starting the line-sequential rolling shutter operation of the short-term exposure frame Fr_S. The reset operations at this time are also respectively indicated by broken lines.

Next, at timing t34 after an elapse of an exposure time Tfrs_expl since timing t31, a read operation of line 05 is performed in synchronism with VDS. At this time, the exposure time Tfrs_expl amounts to 6HD. Subsequently, every time 1HD elapses, lines 06, 11, and 12 are respectively read out, thus ending the line-sequential rolling shutter operations of the short-term exposure frame Fr_S. In this way, in the short-term exposure frame Fr_S, all lines output signals having the exposure time Tfrs_expl. An output signal of the short-term exposure frame Fr_S at this time corresponds to Fr_S Readout2 during the second short-term vertical synchronizing period Tfrs2.

At this time, in a middle-term exposure frame Fr_M during the first long-term vertical synchronizing period Tfrl1, pixels of line 03 are reset in synchronism with the horizontal synchronizing signal HD at timing t32, thus starting an exposure operation of line 03. The reset operation at this time is indicated by a broken line 620. Subsequently, every time 1HD elapses, lines 04, 09, 10, 15, and 16 are respectively reset, thus starting the line-sequential rolling shutter operation of the middle-term exposure frame Fr_M. The reset operations at this time are also respectively indicated by broken lines.

Next, at timing t35 after an elapse of an exposure time Tfrm_expl since timing t32, a read operation of line 03 is performed in synchronism with VDM. At this time, the exposure time Tfrm_expl amounts to 12HD. Subsequently, every time 1HD elapses, lines 04, 09, 10, 15, and 16 are respectively read out, thus ending the line-sequential rolling shutter operation of the middle-term exposure frame Fr_M. In this way, in the middle-term exposure frame Fr_M, all lines output signals having the exposure time Tfrm_expl. An output signal of the middle-term exposure frame Fr_M at this time corresponds to Fr_M Readout3 during the third vertical synchronizing period Tfrs3 of the short-term exposure frame.

At this time, in a long-term exposure frame F_L during the first long-term vertical synchronizing period Tfrl1, pixels of line 01 are reset in synchronism with the horizontal synchronizing signal HD at timing t33, thus starting an exposure operation of line 01. The reset operation at this time is indicated by a broken line 630. Subsequently, every time 1HD elapses, lines 02, 07, 08, 13, and 14 are respectively reset, thus starting the line-sequential rolling shutter operation of the long-term exposure frame F_L. The reset operations at this time are also respectively indicated by broken lines.

Next, at timing t36 after an elapse of an exposure time Tfrm_expl since timing t33, a read operation of line 01 is performed in synchronism with VDL. In continuous shooting operations, after timing t36, control operations are returned to timing t30 and are repeated. However, in this case, a description will be continuously given until the end of the operation of the long-term exposure frame F_L. At this time, the exposure time Tfrl_expl amounts to 18HD. Subsequently, every time 1HD elapses, lines 02, 07, 08, 13, and 14 are respectively read out, thus ending the line-sequential rolling shutter operation of the long-term exposure frame F_L.

In this manner, in the long-term exposure frame F_L, all lines output signals having the exposure time Tfrl_expl. An output signal of the long-term exposure frame F_L at this time corresponds to F_L Readout4 during the fourth vertical synchronizing period Tfrs4 of the short-term exposure frame.

The exposure control operations using the electronic shutter, which are performed during the first long-term vertical synchronizing period Tfrl1, have been described. In this case, a ratio of the exposure time Tfrs_expl of the short-term exposure frame, the exposure time Tfrm_expl of the middle-term exposure frame, and the exposure time Tfrl_expl of the long-term exposure frame is 6HD:12HD:18HD=1:2:3.

Exposure control operations using the electronic shutter performed during the second long-term vertical synchronizing period Tfrl2 will be described below.

During the second long-term vertical synchronizing period Tfrl2, electronic shutter operations of a long-term exposure frame, an exposure time of which is controlled to fall within the short-term vertical synchronizing period Tfrs, a middle-term exposure frame, and a short-term exposure frame are performed. Furthermore, a case will be assumed wherein an exposure condition is changed with respect to the first long-term vertical synchronizing period Tfrl1 of the aforementioned preceding frame.

In a short-term exposure frame Fr_S during the second long-term vertical synchronizing period Tfrl2, pixels of line 05 are reset in synchronism with the horizontal synchronizing signal HD at timing t37, thus starting an exposure operation of line 05. The reset operation at this time is indicated by a broken line 640. Subsequently, every time 1HD elapses, lines 06, 11, and 12 are respectively reset, thus starting a line-sequential rolling shutter operation of the short-term exposure frame Fr_S. The reset operations at this time are also respectively indicated by broken lines.

Next, at timing t38 after an elapse of an exposure time Tfrs_exps since timing t37, a read operation of line 05 is performed in synchronism with VDS. At this time, the exposure time Tfrs_exps amounts to 2HD. Subsequently, every time 1HD elapses, lines 06, 11, and 12 are respectively read out, thus ending the line-sequential rolling shutter operation of the short-term exposure frame Fr_S.

Thus, in the short-term exposure frame Fr_S, all lines output signals having the exposure time Tfrs_exps. An output signal of the short-term exposure frame Fr_S at this time corresponds to Fr_S Readout5 during the fifth short-term vertical synchronizing period Tfrs5.

At this time, in a middle-term exposure frame Fr_M during the second long-term vertical synchronizing period Tfrl2, pixels of line 03 are reset in synchronism with the horizontal synchronizing signal HD at timing t39, thus starting an exposure operation of line 03. The reset operation at this time is indicated by a broken line 650. Subsequently, every time 1HD elapses, lines 04, 09, 10, 15, and 16 are respectively reset, thus starting a line-sequential rolling shutter operation of the middle-term exposure frame Fr_M. The reset operations at this time are also respectively indicated by broken lines.

Next, at timing t40 after an elapse of an exposure time Tfrm_exps since timing t39, a read operation of line 03 is performed in synchronism with VDS. At this time, the exposure time Tfrm_exps amounts to 4HD. Subsequently, every time 1HD elapses, lines 04, 09, 10, 15, and 16 are respectively read out, thus ending the line-sequential rolling shutter operation of the middle-term exposure frame Fr_M.

Thus, in the middle-term exposure frame Fr_M, all lines output signals having the exposure time Tfrm_exps. An output signal of the middle-term exposure frame Fr_M at this time corresponds to Fr_M Readout6 during the sixth short-term vertical synchronizing period Tfrs6.

At this time, in a long-term exposure frame F_L during the second long-term vertical synchronizing period Tfrl2, pixels of line 01 are reset in synchronism with the horizontal synchronizing signal HD at timing t41, thus starting an exposure operation of line 01. The reset operation at this time is indicated by a broken line 660. Subsequently, every time 1HD elapses, lines 02, 07, 08, 13, and 14 are respectively reset, thus starting a line-sequential rolling shutter operation of the long-term exposure frame F_L. The reset operations at this time are also respectively indicated by broken lines.

Next, at timing t42 after an elapse of an exposure time Tfrl_exps since timing t41, a read operation of line 01 is performed in synchronism with VDL. At this time, the exposure time Tfrl_exps amounts to 6HD. Subsequently, every time 1HD elapses, lines 02, 07, 08, 13, and 14 are respectively read out, thus ending the line-sequential rolling shutter operation of the long-term exposure frame F_L.

Thus, in the long-term exposure frame F_L, all lines output signals having the exposure time Tfrl_exps. An output signal of the long-term exposure frame F_L at this time corresponds to Readout after timing t42.

The exposure control operations using the electronic shutter, which are performed during the second long-term vertical synchronizing period Tfrl2, have been explained. In this case, a ratio of the exposure time Tfrs_exps of the short-term exposure frame, the exposure time Tfrm_exps of the middle-term exposure frame, and the exposure time Tfrl_exps of the long-term exposure frame is 2HD:4HD:6HD=1:2:3.

These electronic shutter operations control the ratio of exposure times of the short-term exposure, middle-term exposure, and long-term exposure to be constant (1:2:3) in respective frames. For this reason, a gain value used to compensate for a sensitivity ratio is set to be three times of a signal of a short-term exposure pixel and to be 1.5 times for a signal of a middle-term exposure pixel. Then, dynamic range expansion processing can be executed by composing signals of long-term exposure pixels, those of middle-term exposure pixels, and those of short-term exposure pixels.

Next, a shooting operation and HDR processing of this embodiment will be described below. The HDR processing composes first image data obtained by the long-term exposure, second image data obtained by the middle-term exposure, and third image data obtained by the short-term exposure. Thus, fourth image data, a dynamic range of which is expanded with respect to the first, second, and third image data, is created. The HDR processing is performed by a signal processing unit 13 shown in FIG. 1.

The signal processing unit 13 performs pixel signal correction processing, positional deviation correction processing, HDR processing, and image signal processing for pixel signals output from the image sensor 12, thereby generating an image, a dynamic range of which is expanded. A case will be described below wherein the output signal Fr_S Readout2 of the short-term exposure frame Fr_S, the output signal Fr_M Readout3 of the middle-term exposure frame Fr_M, and the output signal F_L Readout4 of the long-term exposure frame are used.

Initially, the pixel signal correction processing is applied to the output signal Fr_S Readout2 of the short-term exposure frame, which is output in synchronism with the short-term vertical synchronizing signal VDS. As the pixel signal correction signal, for example, correction processing including scratch correction, fixed pattern correction, shading correction, and the like is executed. Next, since the positions of long-term exposure lines and short-term exposure lines are deviated at 2-line intervals, the positional deviation correction processing is executed to fit the output signal F_L Readout4 of the long-term exposure frame to be output later. Although the pixel region 200 shown in FIG. 2 includes only 16 lines, it actually includes about 1440 lines or 3072 lines. Therefore, even when the pixel region 200 is divided into a short-term exposure frame, middle-term exposure frame, and long-term exposure frame, positional deviation correction can be performed while maintaining a sufficiently high resolution. The positional deviation correction processing calculates pixel signals at the time of short-term exposure at positions of lines 01, 02, 07, 08, 13, and 14 using lines 05, 06, 11, and 12 of the short-term exposure frame. For example, a method of calculating lines 07 and 08 at the time of short-term exposure by interpolation using lines 05, 06, 11, and 12 of the short-term exposure frame is available. Furthermore, as a part of the HDR processing, in order to compensate for the exposure time ratio=1:3 of the short-term exposure frame and long-term exposure frame, a 3× gain value is multiplied.

Pixel signals of lines 01, 02, 07, 08, 13, and 14 corresponding to the short-term exposure frame calculated in this way are stored in a memory (not shown) included in the signal processing unit 13. Then, the same pixel signal correction processing is applied to the output signal Fr_M Readout3 of the middle-term exposure frame, which is output in synchronism with the next middle-term vertical synchronizing signal VDM.

Next, since the positions of the long-term exposure lines and middle-term exposure lines are deviated at 2-line intervals, the positional deviation correction processing is applied to fit the output signal F_L Readout4 of the long-term exposure frame to be output later. The positional deviation correction processing calculates pixel signals at the time of middle-term exposure at the positions of lines 01, 02, 07, 08, 13, and 14 using lines 03, 04, 09, 10, 15, and 16 of the middle-term exposure frame. For example, a method of calculating lines 07 and 08 at the time of middle-term exposure by interpolation using lines 03, 04, 09, and 10 of the middle-term exposure frame is available. Furthermore, as a part of the HDR processing, in order to compensate for the exposure time ratio=2:3 of the middle-term exposure frame and long-term exposure frame, a 1.5× gain value is multiplied.

Pixel signals of lines 03, 04, 09, 10, 15, and 16 corresponding to the middle-term exposure frame calculated in this way are stored in the memory (not shown) included in the signal processing unit 13. Then, the same pixel signal correction processing is applied to the output signal F_L Readout4 of the long-term exposure frame, which is output in synchronism with the next long-term vertical synchronizing signal VDL.

After that, the HDR processing is performed between pixel signals of (1) to (3) below:

(1) the stored pixel signals of lines 01, 02, 07, 08, 13, and 14 corresponding to the short-term exposure frame;

(2) the stored pixel signals of lines 01, 02, 07, 08, 13, and 14 corresponding to the middle-term exposure frame; and (3) pixel signals of lines 01, 02, 07, 08, 13, and 14 of the long-term exposure frame.

Pixel signals of the short-term exposure frame and those of the middle-term exposure frame have already been multiplied by gain values used to compensate for the exposure times. Therefore, signals of long-term exposure pixels, those of middle-term exposure pixels, those of short-term exposure pixels are composed using weighting coefficients according to brightness levels in the HDR processing to be executed in this case. As a composition method according to brightness level, for example, the following method can be used. Initially, assume that a sum of a weighting coefficient of a signal of a long-term exposure pixel, that of a signal of a middle-term exposure pixel, and that of a signal of a short-term exposure pixel is set to be a constant value (=1). When an image is bright, the weighting coefficient of the signal of the short-term exposure pixel is set to be larger. On the other hand, when an image is dark, the weighting coefficient of the signal of the long-term exposure pixel is set to be larger. Since the signal processes for each pixel are executed so far, the image signal processing is performed lastly, thereby generating an image, a dynamic range of which is expanded. As the image signal processing, signal processing including white balance adjustment processing, color correction processing, gamma correction processing, and the like is executed.

In this way, upon outputting the signals of the short-term exposure frame, the pixel signal correction processing, positional deviation correction processing, and gain correction required to compensate for the exposure time are performed only for the short-term exposure frame. Upon outputting of the signals of the middle-term exposure frame, the pixel signal correction processing, positional deviation correction processing, and gain correction required to compensate for the exposure time are also performed for only the middle-term exposure frame. Then, upon outputting of the signals of the long-term exposure frame, the pixel signal correction processing, HDR processing, and image signal processing for only the long-term exposure frame are performed. In this manner, the processing loads can be distributed.

Furthermore, in a moving image shooting operation, an image of a period Tfrs3 is created using the output signals F_L Readout1, Fr_S Readout2, and Fr_M Readout3. Also, an image of the next period Tfrs4 is created using the output signals Fr_S Readout2, Fr_M Readout3, and F_L Readout4. In this manner, since the HDR processing is performed using newly output image signals, the resolution of a moving image in the moving image shooting operation may be improved.

When a still image is to be created from output signals of three successive exposure frames, output signals, which are output in an order of a middle-term exposure frame, long-term exposure frame, and short-term exposure frame having larger overlaps of exposure times, may be used. For example, output signals Fr_M Readout3, F_L Readout4, and Fr_S Readout5 are used. Alternatively, output signals Fr_M Readout 6, F_L Readout7, and Fr_S Readout8 may be used. Thus, a still image, which is less blurred, and a dynamic range of which is expanded, can be created.

Also, as for the positional deviation correction processing, an image, a dynamic range of which is expanded, can be generated using all 16×16 pixels as in the modification of the first embodiment. Furthermore, as for the image signal processing, the processes can be distributed as in another modification of the first embodiment.

As described above, in this embodiment, short-term exposure lines, middle-term exposure lines, long-term exposure lines are read out in independent frames in synchronism with frame cycles at the time of short-term exposure. Also, within a frame period at the time of long-term exposure, short-term exposure lines and middle-term exposure lines are read out in independent frames in synchronism with frame cycles at the time of short-term exposure. Thus, the read control system can be simplified, and processing loads at the time of read operations and signal processing can be reduced and averaged.

Also, the long-term and middle-term vertical synchronizing periods are set to be three times and twice of the short-term vertical synchronizing period in correspondence with the exposure time ratio=1:2:3 of the short-term exposure frame, middle-term exposure frame, and long-term exposure frame. For this reason, the exposure times of the long-term, middle-term, and short-term exposure frames can be effectively used, and exposure time control can be avoided from being complicated.

Furthermore, since short-term and middle-term exposure lines are read out in synchronism with frame cycles at the time of short-term exposure within the frame period at the time of long-term exposure, the long-term exposure, middle-term exposure, and short-term exposure can be executed to overlap each other. For this reason, even when a uniform frame rate is used, the middle-term and long-term exposure operations which exceed one frame at the time of short-term exposure can be realized. In addition, generation of a wasteful time which does not contribute to exposure in the multi-exposure method can also be avoided.

Then, since short-term exposure lines, middle-term exposure lines, and long-term exposure lines are read out in independent frames, generation of a rolling distortion can be reduced to about ⅓.

A modification of this embodiment will be described below with reference to FIGS. 9A to 9D. Since the basic operation of the HDR processing is the same as that in still another modification of the first embodiment, the figures and reference numerals will be quoted.

Figure 9D:
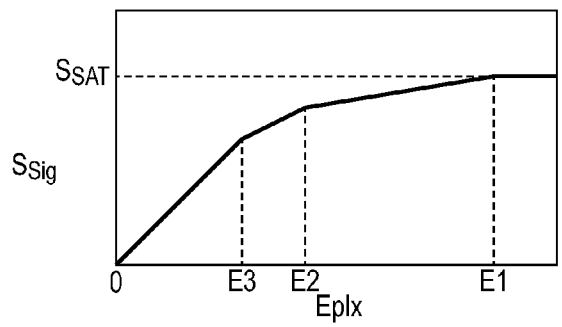

FIG. 9D is an image signal characteristic graph showing the relation between an image capturing plane illuminance Eplx and an image signal Ssig used in the image signal processing when the HDR processing is performed using pixel characteristics Exp1, Exp2, and Exp3. In this embodiment, the pixel characteristics Exp1, Exp2, and Exp3 respectively correspond to an output signal of a short-term exposure frame, that of a middle-term exposure frame, and that of a long-term exposure frame. The HDR processing method is implemented by adding the pixel characteristics Exp1, Exp2, and Exp3, and normalizing the sum characteristic so that a maximum saturation signal matches SSAT. In an image capturing plane illuminance range from 0 to E3, the pixel characteristics Exp1, Exp2, and Exp3 shown in FIG. 9A are added to obtain a pixel characteristic corresponding to a sensitivity six times that of Exp1. In an image capturing plane illuminance range from E3 to E2, since the pixel characteristic Exp3 is saturated in FIG. 9A, PSAT and the pixel characteristics Exp1 and Exp2 are added. In an image capturing plane illuminance range from E2 to E1, since both the pixel characteristics Exp2 and Exp3 are saturated in FIG. 9A, 2PSAT and the pixel characteristic Exp1 are added. At the image capturing plane illuminance level E1 or higher, since all of the pixel characteristics Exp1, Exp2, Exp3 are saturated in FIG. 9A, 3PSAT as a maximum saturated signal amount is used.

By normalizing the pixel characteristic added in this way so that the maximum saturated signal amount 3PSAT matches SSAT, the HDR processing shown in FIG. 9D is implemented. Then, the image capturing apparatus can be controlled to operate the image sensor 12, as shown in FIG. 6, and to control the signal processing unit 13 to perform the HDR processing so as to attain the characteristic shown in FIG. 9D.

In this manner, as can be seen from FIG. 9D, the image signal is output to have tones from 0 to SSAT in correspondence with the image capturing plane illuminance range from 0 to E1. Furthermore, upon comparison of the gradient of the image signal characteristic within the image capturing plane illuminance range from 0 to E3 with that of the pixel characteristic Exp1 in FIG. 9B, since (6× sensitivity or equivalent)/(3× maximum saturated signal amount)=2×, the dynamic range is expanded to 2×.

When the saturation signal SSAT of the image signal characteristic can be used up to 3SSAT, the dynamic range can be expanded up to 6×. FIG. 9D shows an input/output characteristic known as a gamma characteristic, thereby expanding the dynamic range.

Third Embodiment

The third embodiment of the present invention will be described below with reference to FIGS. 1, 2, and 7 to 9. Note that in this embodiment, the basic arrangement and operation of an image capturing apparatus and those of an image sensor are the same as those in the first embodiment, and the following description will be given by quoting the figures and reference numerals.

In the first embodiment, two frames, that is, a long-term exposure frame and short-term exposure frame are set to have different exposure times at 2-line intervals to generate an image with a broad dynamic range. In this embodiment, a case will be described wherein a plurality of short-term exposure frames are set in a long-term exposure frame.

FIG. 7 is a timing chart showing control timings of long-term exposure lines and short-term exposure lines according to this embodiment. Referring to FIG. 7, VDL represents a vertical synchronizing signal (long-term vertical synchronizing signal) for a long-term exposure frame, and a long-term vertical synchronizing period corresponding to one cycle of this signal is indicated by Tfrl. VDS represents a vertical synchronizing signal (short-term vertical synchronizing signal) for a short-term exposure frame, and a short-term vertical synchronizing period corresponding to one cycle of this signal is indicated by Tfrs.

The vertical synchronizing period Tfrl (first image capturing period) corresponding to one cycle of the long-term vertical synchronizing signal is equal to N cycles (=N·Tfrs; N is a natural number not less than 3) of the short-term vertical synchronizing period (second image capturing period). In the example of FIG. 7, N=3, that is, the period Tfrl is equal to three cycles of the short-term vertical synchronizing period. In this embodiment, these short-term vertical synchronizing signal and long-term vertical synchronizing signal are generated by a TG 290 as a synchronizing signal generation unit.

HD represents a horizontal synchronizing signal, which defines a period in which reset operations and read operations of pixels are performed for a row unit.

Line01 to Line16 represent states of operations of pixel rows P(01--) to P(16--) of a pixel region 200. In order to express pixel rows by row numbers, column numbers are expressed by "--". In order to set different exposure times at 2-line intervals, assume that long-term exposure lines are lines 01, 02, 05, 06, 09, 10, 13, and 14, and short-term exposure lines are lines 03, 04, 07, 08, 11, 12, 15, and 16.

In this embodiment, assume that short-term exposure is performed twice during the long-term vertical synchronizing period Tfrl in which long-term exposure is performed. Then, as a period required to read out signals of pixels of each line to column signal processing units 250, and to output signals of pixels for one line from an output unit 280, a corresponding 1HD period is indicated by RO. In this case, since a period required to read out signals of pixels of each line to the column signal processing units 250 is sufficiently shorter than a period required to output signals of pixels for one line from the output unit 280, the next exposure frame starts from the RO period. In order to facilitate HDR processing from signals having different exposure times at 2-line intervals, each pixel includes color filters of 2×2 arrays like a Bayer matrix.

ReadOut indicates output timings of an output signal Fr_S Readout of a short-term exposure frame and an output signal F_L Readout of a long-term exposure frame, which are read out from pixels, from the output unit 280.

At timing t00, read operations of lines 01 and 03 are performed in synchronism with VDL and VDS to reset pixels, thus starting exposure operations of lines 01 and 03.

At timing t01, read operations of lines 02 and 04 are performed to reset pixels, thus starting exposure operations of lines 02 and 04.

At timing t02, read operations of lines 05 and 07 are performed to reset pixels, thus starting exposure operations of lines 05 and 07.

At timing t03, read operations of lines 06 and 08 are performed to reset pixels, thus starting exposure operations of lines 06 and 08.

At timing t04 and subsequent timings, lines 09 to 16 are reset to start exposure operations of lines 09 to 16 by the same method.

In this way, pixels are reset for each line every time 1HD elapses, thus starting a line-sequential rolling shutter operation of a long-term exposure frame and a first line-sequential rolling shutter operation of a short-term exposure frame.

Next, at timing t05 after an elapse of Tfrs since timing t00, signals of pixels of line 03 are output in synchronism with VDS during the period RO. Thus, pixels are reset to start a second short-term exposure operation of line 03. Subsequently, at timing t06, signals of pixels of line 04 are output during the period RO. Thus, pixels are reset to start a second short-term exposure operation of line 04. At timing t07 and subsequent timings, the respective signals of pixels of lines 07, 08, 11, 12, 15, and 16 are output during the period RO by the same method. Thus, pixels are respectively reset to start second short-term exposure operations of lines 07, 08, 11, 12, 15, and 16.

In this manner, every time 1HD elapses, lines 03, 04, 07, 08, 11, 12, 15, and 16 as first short-term exposure lines are read out, thus ending the line-sequential rolling shutter operation of the first short-term exposure frame, and starting line-sequential rolling shutter operation for performing the second short-term exposure operations for the short-term exposure lines.

At this time, the exposure operations of lines 01, 02, 05, 06, 09, 10, 13, and 14 as the long-term exposure lines are continued. An output signal of the short-term exposure frame at this time is a first signal Fr_S Readout.

Note that in this short-term exposure frame, since pixels are reset by performing pixel read operations, a longest exposure time is Tfrs as the short-term vertical synchronizing period. Then, at timing t10 after an elapse of 2Tfrs since timing t00, a line-sequential read operation of the second short-term exposure frame is performed in synchronism with VDS, thus ending the line-sequential rolling shutter operation. Since the read operation of the second short-term exposure frame is the same as the line-sequential read operation of the first short-term exposure frame, a description thereof will not be repeated. At this time as well, exposure operations of lines 01, 02, 05, 06, 09, 10, 13, and 14 as the long-term exposure lines are continued. An output signal of the short-term exposure frame at this time is a second signal Fr_S Readout. Also, in this short-term exposure frame, since pixels are reset by performing pixel read operations, a longest exposure time is Tfrs as the short-term vertical synchronizing period.

Next, at timing t15 after an elapse of 3Tfrs=Tfrl since timing t00, signals of pixels of line 01 are output during the period RO in synchronism with VDS. Subsequently, at timing t16, signals of pixels of line 02 are output during the period RO. At timing t17 and subsequent timings, the respective signals of pixels of lines 05, 06, 09, 10, 13, and 14 are output during the period RO by the same method.

In this manner, every time 1HD elapses, signals of pixels of lines 01, 02, 05, 06, 09, 10, 13, and 14 as long-term exposure lines are read out, thus ending the line-sequential rolling shutter operation of the long-term exposure frame. An output signal of the long-term exposure frame at this time is indicated by F_L Readout. Note that in this long-term exposure frame, since pixels are reset by performing pixel read operations, a longest exposure time is the long-term vertical synchronizing period Tfrl.

In the operations shown in FIG. 7, the longest exposure time Tfrl of the long-term exposure frame has a period three times of the longest exposure time Tfrs of the short-term exposure frame. Also, as can be seen from FIG. 7, the two short-term exposure operations of the short-term exposure frames are controlled to be performed to overlap the long-term exposure frame. Furthermore, since the short-term exposure lines and long-term exposure lines are separately read out at 2-line intervals, a read-out time of each frame is nearly halved compared to an operation for reading out all lines at the same time.

Figure 8:
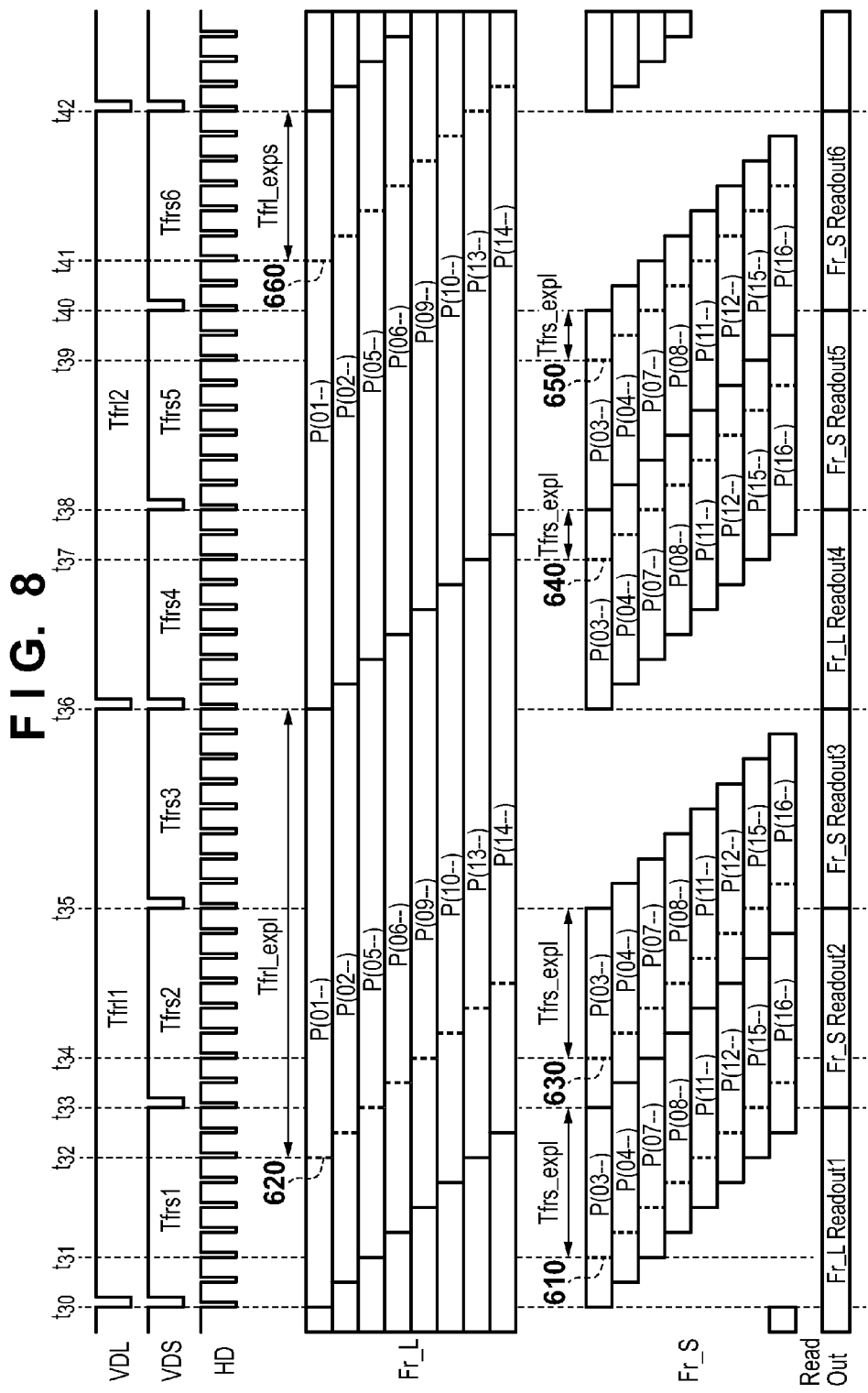
FIG. 8 is a timing chart showing control timings of the image sensor according to the third embodiment.

FIG. 8 is a timing chart showing control timings of the long-term exposure frame and short-term exposure frames according to this embodiment. FIG. 8 shows the operations for respective lines in FIG. 7 as those for respective frames, and shows control timings that allow continuous shooting operations upon application to moving image shooting. Thus, in order to allow continuous shooting operations, control timings after timing t36 are returned to timing t30 and are repeated. Also, the same reference numerals in FIG. 8 denote the same operations and components as in FIG. 7. A period between timings t30 to t36 and that between timings t36 to t42 respectively correspond to a first long-term vertical synchronizing period Tfrl1 and a second long-term vertical synchronizing period Tfrl2.

A period between timings t30 to t33 corresponds to a first short-term vertical synchronizing period Tfrs1.

A period between timings t33 to t35 corresponds to a second short-term vertical synchronizing period Tfrs2.

A period between timings t35 to t36 corresponds to a third short-term vertical synchronizing period Tfrs3.

A period between timings t36 to t38 corresponds to a fourth short-term vertical synchronizing period Tfrs4.

A period between timings t38 to t40 corresponds to a fifth short-term vertical synchronizing period Tfrs5.

A period between timings t40 to t42 corresponds to a sixth short-term vertical synchronizing period Tfrs6.

F_L represents states of operations of lines 01, 02, 05, 06, 09, 10, 13, and 14 which form the long-term exposure frame.

Fr_S represents states of operations of lines 03, 04, 07, 08, 11, 12, 15, and 16 which form the short-term exposure frame.

In this case, in the long-term exposure frame F_L, rolling shutter operations are successively performed for respective long-term vertical synchronizing periods Tfrl in synchronism with long-term vertical synchronizing signals VDL. In the short-term exposure frame Fr_S, exposure operations of first rolling shutter operations are started in synchronism with long-term vertical synchronizing signals VDL. Read operations of the first rolling shutter operations are started and exposure operations of the second rolling shutter operations are started in synchronism with the short-term vertical synchronizing signals VDS after Tfrs. Furthermore, read operations of the second rolling shutter operations are started in synchronism with the short-term vertical synchronizing signals VDS after Tfrs. In this case, as for short-term exposure lines, short-term exposure operations and read operation of pixel signals are executed a plurality of times in synchronism with VDS which does not overlap any read periods of pixel signals of the long-term exposure lines. Then, this operation is repetitively performed in synchronism with the long-term vertical synchronizing signal VDL.

More specifically, during the first short-term vertical synchronizing period Tfrs1 included in the first long-term vertical synchronizing period Tfrl1, an output signal F_L Readout1 of the long-term exposure frame, the exposure operation of which was started at the timing one cycle before, is output. Next, during the second short-term vertical synchronizing period Tfrs2, an output signal Fr_S Readout2 of the first short-term exposure frame is output. Next, during the third short-term vertical synchronizing period Tfrs3, an output signal Fr_S Readout3 of the second short-term exposure frame is output.

Likewise, during the fourth short-term vertical synchronizing period Tfrs4 included in the second long-term vertical synchronizing period Tfrl2, an output signal F_L Readout4 of the long-term exposure frame is output. Next, during the fifth short-term vertical synchronizing period Tfrs5, an output signal Fr_S Readout5 of the first short-term exposure frame is output. Next, during the sixth short-term vertical synchronizing period Tfrs6, an output signal Fr_S Readout6 of the second short-term exposure frame is output.

Thus, the output signals F_L Readout, Fr_S Readout, and Fr_S Readout are repetitively output in synchronism with the short-term vertical synchronizing signals VDS. For this reason, read operations of output signals from an image sensor are averaged compared to the conventional operation for reading out all lines at the same time after completion of long-term exposure.

Exposure control using an electronic shutter will be described below.

During the first long-term vertical synchronizing period Tfrl1, electronic shutter operations of a long-term exposure frame and short-term exposure frames when an exposure time of the long-term exposure frame is controlled beyond the short-term vertical synchronizing period Tfrs are performed.

In Fr_S during Tfrl1, pixels of line 03 are reset in synchronism with the horizontal synchronizing signal HD at timing t31, thus starting an exposure operation of line 03. The reset operation at this time is indicated by a broken line 610. Subsequently, every time 1HD elapses, pixels of lines 04, 07, 08, 11, 12, 15, and 16 are respectively reset, thus starting the line-sequential rolling shutter operation of the first short-term exposure frame Fr_S. The reset operations at this time are also respectively indicated by broken lines.

Next, at timing t33 after an elapse of Tfrs_expl since timing t31, a read operation of line 03 is performed in synchronism with VDS. At this time, Tfrs_expl as an exposure time amounts to 6HD. Subsequently, every time 1HD elapses, lines 04, 07, 08, 11, 12, 15, and 16 are respectively read out, thus ending the line-sequential rolling shutter operations of the first short-term exposure frame Fr_S.

In this way, in the short-term exposure frame Fr_S, all lines output signals having the exposure time Tfrs_expl. An output signal of the first short-term exposure frame Fr_S at this time corresponds to Fr_S Readout2 during the second short-term vertical synchronizing period Tfrs2.

Next, in a short-term exposure frame Fr_S during the first long-term vertical synchronizing period Tfrl1, pixels of line 03 are reset in synchronism with the horizontal synchronizing signal HD at timing t34, thus starting an exposure operation of line 03. The reset operation at this time is indicated by a broken line 630. Subsequently, every time 1HD elapses, pixels of lines 04, 07, 08, 11, 12, 15, and 16 are respectively reset, thus starting the line-sequential rolling shutter operation of the second short-term exposure frame Fr_S. The reset operations at this time are also respectively indicated by broken lines.

Next, at timing t35 after an elapse of Tfrs_expl since timing t34, a read operation of line 03 is performed in synchronism with VDS. At this time, Tfrs_expl as an exposure time amounts to 6HD. Subsequently, every time 1HD elapses, lines 04, 07, 08, 11, 12, 15, and 16 are respectively read out, thus ending the line-sequential rolling shutter operations of the second short-term exposure frame Fr_S.

In this way, in the short-term exposure frame Fr_S, all lines output signals having the exposure time Tfrs_expl. An output signal of the second short-term exposure frame Fr_S at this time corresponds to Fr_S Readout3 during the third short-term vertical synchronizing period Tfrs3.

Then, in a long-term exposure frame F_L during the first long-term vertical synchronizing period Tfrl1, pixels of line 01 are reset in synchronism with the horizontal synchronizing signal HD at timing t32, thus starting an exposure operation of line 01. The reset operation at this time is indicated by a broken line 620. Subsequently, every time 1HD elapses, lines 02, 05, 06, 09, 10, 13, and 14 are respectively reset, thus starting the line-sequential rolling shutter operation of the long-term exposure frame F_L. The reset operations at this time are also respectively indicated by broken lines.

At timing t36 after an elapse of Tfrl_expl since timing t32, a read operation of line 01 is performed in synchronism with VDS. In continuous shooting operations, after timing t36, control operations are returned to timing t30 and are repeated. However, in this case, a description will be continuously given until the end of the operation of the long-term exposure frame F_L. At this time, Tfrl_expl as an exposure time amounts to 18HD. Subsequently, every time 1HD elapses, lines 02, 05, 06, 09, 10, 13, and 14 are respectively read out, thus ending the line-sequential rolling shutter operation of the long-term exposure frame F_L.

In this manner, in the long-term exposure frame F_L, all lines output signals having the exposure time Tfrl_expl. An output signal of the long-term exposure frame F_L at this time corresponds to F_L Readout4 during the fourth short-term vertical synchronizing period Tfrs4.

The exposure control operations using the electronic shutter, which are performed during the first long-term vertical synchronizing period Tfrl1, have been described. In this case, a ratio between the exposure time Tfrs_expl of the short-term exposure frame and the exposure time Tfrl_expl of the long-term exposure frame is 6HD:18HD=1:3.

Exposure control operations using the electronic shutter performed during the second long-term vertical synchronizing period Tfrl2 will be described below.

During the second long-term vertical synchronizing period Tfrl2, electronic shutter operations of a long-term exposure frame and short-term exposure frames when an exposure time is controlled to fall within the short-term vertical synchronizing period Tfrs are performed. Furthermore, a case will be assumed wherein an exposure condition is changed with respect to the first long-term vertical synchronizing period Tfrl1 of the aforementioned preceding frame.

In a short-term exposure frame Fr_S during the second long-term vertical synchronizing period Tfrl2, pixels of line 03 are reset in synchronism with the horizontal synchronizing signal HD at timing t37, thus starting an exposure operation of line 03. The reset operation at this time is indicated by a broken line 640. Subsequently, every time 1HD elapses, lines 04, 07, 08, 11, 12, 15, and 16 are respectively reset, thus starting a line-sequential rolling shutter operation of the first short-term exposure frame Fr_S. The reset operations at this time are also respectively indicated by broken lines.

Next, at timing t38 after an elapse of Tfrs_exps since timing t37, a read operation of line 03 is performed in synchronism with VDS. At this time, Tfrs_exps as an exposure time amounts to 2HD. Subsequently, every time 1HD elapses, lines 04, 07, 08, 11, 12, 15, and 16 are respectively read out, thus ending the line-sequential rolling shutter operation of the first short-term exposure frame Fr_S.

Thus, in the short-term exposure frame Fr_S, all lines output signals having the exposure time Tfrs_exps. An output signal of the first short-term exposure frame Fr_S at this time corresponds to Fr_S Readout5 during the fifth short-term vertical synchronizing period Tfrs5.

Next, in a short-term exposure frame Fr_S during the second long-term vertical synchronizing period Tfrl2, pixels of line 03 are reset in synchronism with the horizontal synchronizing signal HD at timing t39, thus starting an exposure operation of line 03. The reset operation at this time is indicated by a broken line 650. Subsequently, every time 1HD elapses, lines 04, 07, 08, 11, 12, 15, and 16 are respectively reset, thus starting a line-sequential rolling shutter operation of the second short-term exposure frame Fr_S. The reset operations at this time are also respectively indicated by broken lines.

Next, at timing t40 after an elapse of Tfrs_exps since timing t39, a read operation of line 03 is performed in synchronism with VDS. At this time, Tfrs_exps as an exposure time amounts to 2HD. Subsequently, every time 1HD elapses, lines 04, 07, 08, 11, 12, 15, and 16 are respectively read out, thus ending the line-sequential rolling shutter operation of the second short-term exposure frame Fr_S.

Thus, in the short-term exposure frame Fr_S, all lines output signals having the exposure time Tfrs_exps. An output signal of the second short-term exposure frame Fr_S at this time corresponds to Fr_S Readout6 during the sixth short-term vertical synchronizing period Tfrs6.

Then, in a long-term exposure frame F_L during the second long-term vertical synchronizing period Tfrl2, pixels of line 01 are reset in synchronism with the horizontal synchronizing signal HD at timing t41, thus starting an exposure operation of line 01. The reset operation at this time is indicated by a broken line 660.

Subsequently, every time 1HD elapses, lines 02, 05, 06, 09, 10, 13, and 14 are respectively reset, thus starting a line-sequential rolling shutter operation of the long-term exposure frame F_L. The reset operations at this time are also respectively indicated by broken lines.

Next, at timing t42 after an elapse of Tfrl_exps since timing t41, a read operation of line 01 is performed in synchronism with VDS. At this time, Tfrl_exps as an exposure time amounts to 6HD. Subsequently, every time 1HD elapses, lines 02, 05, 06, 09, 10, 13, and 14 are respectively read out, thus ending the line-sequential rolling shutter operation of the long-term exposure frame F_L.

Thus, in the long-term exposure frame F_L, all lines output signals having the exposure time Tfrl_exps. An output signal of the long-term exposure frame F_L at this time corresponds to ReadOut after timing t42.

The exposure control operations using the electronic shutter, which are performed during the second long-term vertical synchronizing period Tfrl2, have been explained. In this case, a ratio between the exposure time Tfrs_exps of the short-term exposure frame and the exposure time Tfrl_exps of the long-term exposure frame is 2HD:6HD=1:3.

These electronic shutter operations control the ratio between exposure times in the short-term exposure and long-term exposure to be constant (1:3) in respective frames. For this reason, a gain value used to compensate for a sensitivity ratio is set to be three times of a signal of a short-term exposure pixel. Then, HDR processing can be executed by composing signals of long-term exposure pixels and those of short-term exposure pixels.

A shooting operation and HDR processing of this embodiment can be performed in the same manner as in the first embodiment by setting a gain value used to compensate for a sensitivity ratio to be three times of a signal of a short-term exposure pixel. In this embodiment, prior to the HDR processing, calculations may be made between output signals of the first and second short-term exposure frames Fr_S. For example, output signals of the first and second short-term exposure frames Fr_S are added and averaged.

Thus, since the HDR processing can be performed using the noise-reduced output signal of the short-term exposure frame Fr_S, a satisfactory image can be obtained. Furthermore, motion vectors may be calculated from the output signals of the first and second short-term exposure frames Fr_S obtained under the same exposure condition, and camera shake correction may be performed. At this time, since a read frame rate is constant, and an exposure time ratio between Fr_S and F_L is constant, it is easy to calculate the barycentric position of the output signal of the F_L. Therefore, based on the motion vectors calculated from the output signals of Fr_S, the camera shake correction of F_L can be performed.

An object is extracted from the output signals of the first and second short-term exposure frames Fr_S or those of the short-term exposure frame Fr_S and long-term exposure frame F_L. Then, motion vectors of the extracted object are calculated from the output signals of the first and second short-term exposure frames Fr_S obtained under the same exposure condition, and object blur correction may be performed.

Furthermore, in moving image shooting, an image of Tfrs3 is created using output signals F_L Readout1, Fr_S Readout2, and Fr_S Readout3. Also, an image of next Tfrs4 is created using output signals Fr_S Readout2, Fr_S Readout3, and F_L Readout4. In this way, by performing HDR processing using newly output image signals, the resolution of a moving image in the moving image shooting operation may be improved.

When a still image is to be created from output signals of three successive exposure frames, output signals, which are output in an order of a second short-term exposure frame, long-term exposure frame, and first short-term exposure frame having larger overlaps of exposure times, may be used. For example, output signals Fr_S Readout3, F_L Readout4, and Fr_S Readout5 may be used. Alternatively, output signals Fr_S Readout6, F_L Readout7, and Fr_S Readout8 may be used. Thus, a still image, which is less blurred, and a dynamic range of which is expanded, can be created.

Furthermore, as for positional deviation correction processing, an image, a dynamic range of which is expanded, can be generated using all 16×16 pixels as in the modification of the first embodiment. Then, as for image signal processing, processes can be distributed as in another modification of the first embodiment.

In this embodiment, the long-term vertical synchronizing period is set to be three times of the short-term vertical synchronizing period (N=3), but N=4 may be set. At this time, the short-term exposure frames remain generated twice, and a short-term vertical synchronizing period without reading any signal is assured in the long-term vertical synchronizing period, thus reducing an average data rate in the long-term vertical synchronizing period. Alternatively, the short-term exposure frames may be generated three times, and output signals of the three short-term exposure frames may be added and averaged, thus further reducing noise. Likewise, N=5 or more may be set to select the number of short-term exposure frames from two to N−1 so as to reduce an average data rate and noise by addition average.

As described above, in this embodiment, short-term exposure lines and long-term exposure lines are read out in independent frames in synchronism with frame cycles at the time of short-term exposure. Also, within a frame period at the time of long-term exposure, short-term exposure lines are read out twice in synchronism with frame cycles at the time of short-term exposure. Thus, noise of an output signal of the short-term exposure frame can be reduced, the read control system can be simplified, and processing loads at the time of read operations and signal processing can be reduced and averaged.

Exposure operations of pixel signals of this embodiment are performed in synchronism with the long-term vertical synchronizing signal or short-term vertical synchronizing signal. Therefore, the need for complicated processing required to match the center of short-term exposure with that of long-term exposure can be obviated, and read timing control of pixel signals can be simplified.

Furthermore, an interference problem between the short-term exposure line read end timing and long-term exposure line read start timing, which problem may be posed when the centers of exposure times of long-term exposure and short-term exposure are matched, can be avoided.

In the aforementioned embodiment, the long-term vertical synchronizing period is three times of the short-term vertical synchronizing period in correspondence with the exposure time ratio=1:3 of the short-term exposure frame and long-term exposure frame. For this reason, the exposure times of the long- and short-term exposure frames can be effectively used, and exposure time control can be avoided from being complicated.

Furthermore, since short-term exposure lines are read out in synchronism with frame cycles at the time of short-term exposure within the frame period at the time of long-term exposure, the long-term exposure and short-term exposure can be executed to overlap each other. For this reason, even when a uniform frame rate is used, the long-term exposure which exceeds one frame at the time of short-term exposure can be realized. In addition, generation of a wasteful time which does not contribute to exposure in the multi-exposure method can also be avoided.

Then, since short-term exposure lines and long-term exposure lines are read out in independent frames, generation of a rolling distortion can be halved.

A modification of this embodiment will be described below with reference to FIGS. 9A to 9E. Since the basic operation of the HDR processing is the same as that in still another modification of the first embodiment, the figures and reference numerals will be quoted.

Figure 9E:
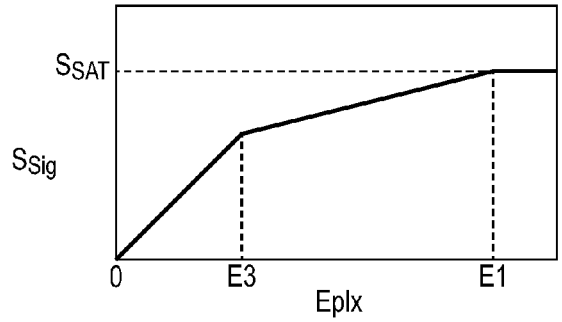

FIG. 9E is an image signal characteristic graph showing the relation between an image capturing plane illuminance Eplx and an image signal Ssig used in the image signal processing when the HDR processing is applied using pixel characteristics Exp1 and Exp3. In this embodiment, the pixel characteristics Exp1 and Exp3 respectively correspond to an output signal of a short-term exposure frame and that of a long-term exposure frame. The HDR processing method is implemented by adding the pixel characteristics Exp1 and Exp3, and normalizing the sum characteristic so that a maximum saturation signal matches SSAT. In an image capturing plane illuminance range from 0 to E3, the pixel characteristics Exp1 and Exp3 shown in FIG. 9A are added to obtain a pixel characteristic corresponding to a sensitivity four times that of Exp1. In an image capturing plane illuminance range from E3 to E1, since the pixel characteristic Exp3 is saturated in FIG. 9A, PSAT and the pixel characteristic Exp1 are added. At the image capturing plane illuminance level E1 or higher, since both the pixel characteristics Exp1 and Exp3 are saturated in FIG. 9A, 2PSAT as a maximum saturated signal amount is used.

By normalizing the pixel characteristic added in this way so that the maximum saturated signal amount 2PSAT matches SSAT, the HDR processing shown in FIG. 9E is implemented. Then, the image capturing apparatus can be controlled to operate the image sensor 12, as shown in FIG. 8, and to control the signal processing unit 13 to perform the HDR processing so as to attain the characteristic shown in FIG. 9E.

In this manner, as can be seen from FIG. 9E, the image signal is output to have tones from 0 to SSAT in correspondence with the image capturing plane illuminance range from 0 to E1. Furthermore, upon comparison of the gradient of the image signal characteristic within the image capturing plane illuminance range from 0 to E3 with that of the pixel characteristic Exp1 in FIG. 9B, since (4× sensitivity or equivalent)/(2× maximum saturated signal amount)=2×, the dynamic range is expanded to 2×.

When the saturation signal SSAT of the image signal characteristic can be used up to 2SSAT, the dynamic range can be expanded up to 4x. FIG. 9E shows an input/output characteristic known as a gamma characteristic, thereby expanding the dynamic range.

Fourth Embodiment

The fourth embodiment to be described below will explain an operation of an image sensor which is controlled to output signals of pixels having different exposure times at 2-line intervals so as to be used in HDR processing.

Figure 10:
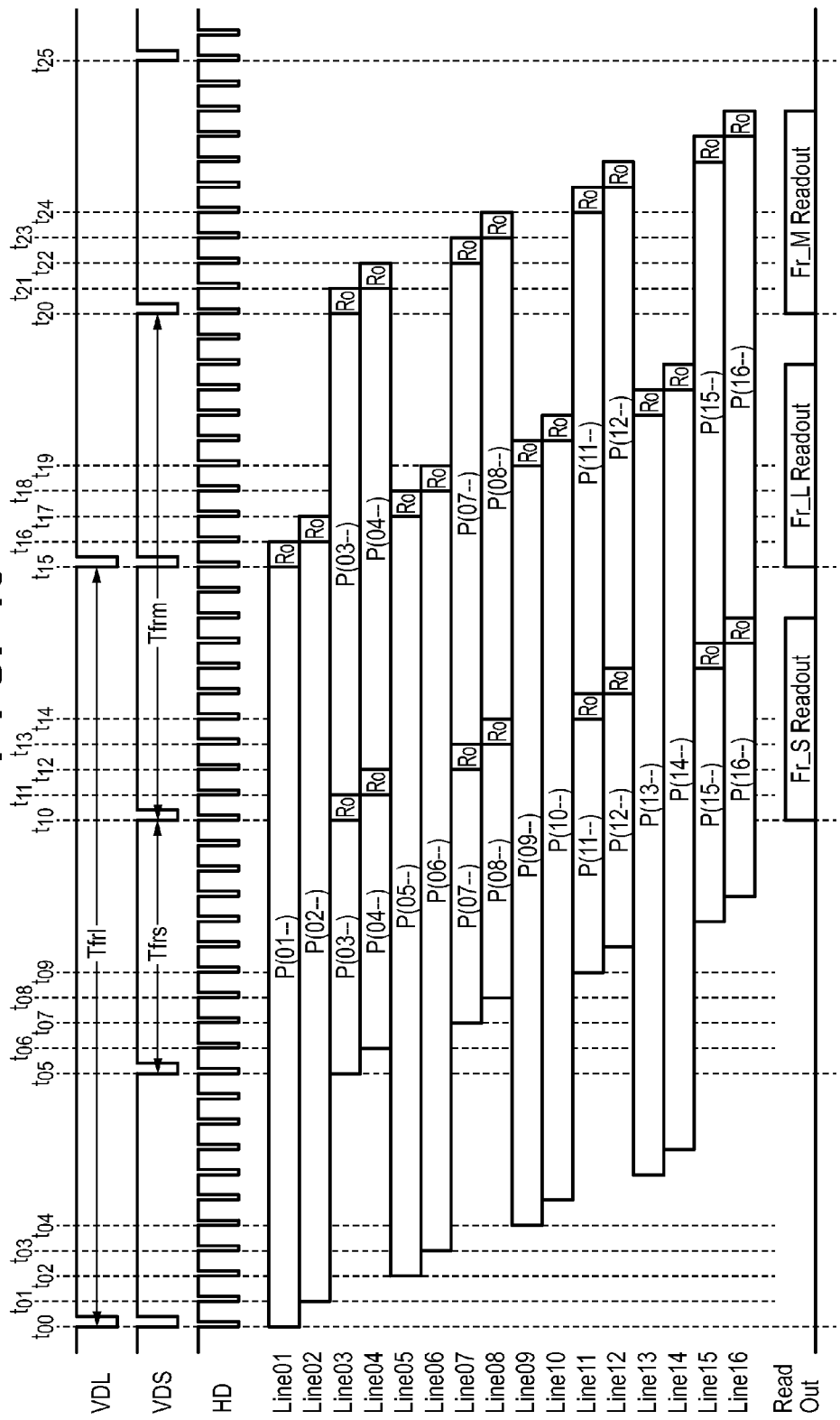
FIG. 10 is a timing chart showing control timings of an image sensor according to the fourth embodiment.

FIG. 10 is a timing chart showing control timings of an image sensor 12 according to this embodiment. In this embodiment, for the HDR processing, pixel rows of a pixel region 200 are set to include long-term exposure lines at predetermined line intervals (for example, 2-line intervals). Short-term exposure or middle-term exposure is performed for the other lines. Referring to FIG. 10, VDL represents a vertical synchronizing signal (long-term vertical synchronizing signal) for long-term exposure, and VDS represents a vertical synchronizing signal (short-term vertical synchronizing signal) for short-term exposure. A vertical synchronizing period of a long-term exposure frame is indicated by Tfrl, and that of a short-term exposure frame is indicated by Tfrs. The vertical synchronizing period Tfrl corresponding to one cycle of the long-term vertical synchronizing signal is equal to predetermined cycles, for example, N cycles (=N·Tfrs; N is a natural number not less than 2) of the short-term vertical synchronizing signal. In the example of FIG. 10, N=2, that is, the period Tfrl is equal to two cycles of the short-term vertical synchronizing signal. In this embodiment, these short-term vertical synchronizing signal and long-term vertical synchronizing signal are generated by a TG 290 as a synchronizing signal generation unit. HD represents a horizontal synchronizing signal, which defines a period in which reset operations and read operations of pixels are performed for a row unit.

Line01 to Line16 represent states of operations of pixel rows P(01--) to P(16--) of the pixel region 200. In order to express pixel rows by row numbers, column numbers are expressed by "--". In order to set different exposure times at 2-line intervals, assume that long-term exposure lines are lines 01, 02, 05, 06, 09, 10, 13, and 14, and short-term exposure lines are lines 03, 04, 07, 08, 11, 12, 15, and 16.

In this embodiment, middle-term exposure as a middle exposure time between short-term exposure and long-term exposure is set and performed for short-term exposure lines. Then, as a period required to read out signals of pixels of each line to column signal processing units 250, and to output signals of pixels for one line from an output unit 280, a corresponding 1HD period is indicated by RO. In this case, since a period required to read out signals of pixels of each line to the column signal processing units 250 is sufficiently shorter than a period required to output signals of pixels for one line from the output unit 280, the next exposure frame starts from the RO period. In order to facilitate dynamic range expansion processing from signals having different exposure times at 2-line intervals, each pixel includes color filters of 2×2 arrays like a Bayer matrix.

ReadOut indicates output timings, from the output unit 280, of an output signal F_L Readout of a readout long-term exposure frame, an output signal Fr_M Readout of a readout middle-term exposure frame, and an output signal Fr_S Readout of a readout short-term exposure frame.

At timing t00, a read operation of line 01 is performed in synchronism with a first long-term vertical synchronizing signal VDL to reset pixels, thus starting an exposure operation of line 01. Subsequently, at timing t01, a read operation of line 02 is performed to reset pixels, thus starting an exposure operation of line 02. At timing t02 and subsequent timings, lines 05, 06, 09, 10, 13, and 14 are reset by the same method, thus starting exposure operations of these lines.

In this way, every time 1HD elapses, lines 01, 02, 05, 06, 09, 10, 13, and 14 as long-term exposure lines are reset, thus starting a line-sequential rolling shutter operation of a long-term exposure frame.

Next, at timing t05 after an elapse of Tfrs since timing t00, a read operation of line 03 is performed in synchronism with a first short-term vertical synchronizing signal VDS next to VDL to reset pixels, thus starting an exposure operation of line 03. Subsequently, at timing t06, a read operation of line 04 is performed to reset pixels, thus starting an exposure operation of line 04. At timing t07 and subsequent timings, lines 07, 08, 11, 12, 15, and 16 are reset by the same method to start exposure operations of these lines.

In this way, every time 1HD elapses, lines 03, 04, 07, 08, 11, 12, 15, and 16 as short-term exposure lines are reset, thus starting a line-sequential rolling shutter operation of a short-term exposure frame. Then, at timing t10 after an elapse of 2Tfrs since timing t00, signals of pixels of line 03 are output during the period RO in synchronism with a second short-term vertical synchronizing signal VDS. With this operation, pixels are reset to start a middle-term exposure operation of line 03. Subsequently, at timing t11, signals of pixels of line 04 are output during the period RO. With this operation, pixels are reset to start a middle-term exposure operation of line 04. At timing t12 and subsequent timings, signals of pixels of lines 07, 08, 11, 12, 15, and 16 are output during the period RO. With these operations, pixels are reset to start middle-term exposure operations of lines 07, 08, 11, 12, 15, and 16.

In this manner, every time 1HD elapses, signals of pixels of lines 03, 04, 07, 08, 11, 12, 15, and 16 as short-term exposure lines are read out, thus ending the line-sequential rolling shutter operation of the short-term exposure frame. At the same time, a line-sequential rolling shutter operation of a middle-term exposure frame in which middle-term exposure operations are performed for the short-term exposure lines can be started. At this time, the exposure operations of lines 01, 02, 05, 06, 09, 10, 13, and 14 as long-term exposure lines are continued. An output signal of the short-term exposure frame at this time corresponds to Fr_S Readout. In this case, in this short-term exposure frame, since pixels are reset by performing pixel read operations, a longest exposure time is Tfrs as the vertical synchronizing period of the short-term exposure frame (short-term vertical synchronizing period).

Next, at timing t15 after an elapse of Tfrl (=3Tfrs) since timing t00, signals of pixels of line 01 are output in synchronism with a second long-term vertical synchronizing signal VDL during the period RO. Subsequently, at timing t16, signals of pixels of line 02 are output during the period RO. At timing t17 and subsequent timings, the respective signals of pixels of lines 05, 06, 09, 10, 13, and 14 are output during the period RO by the same method.

In this manner, every time 1HD elapses, signals of pixels of lines 01, 02, 05, 06, 09, 10, 13, and 14 as long-term exposure lines are read out, thus ending the line-sequential rolling shutter operation of the long-term exposure frame. At this time, the exposure operations of lines 03, 04, 07, 08, 11, 12, 15, and 16 as the short-term exposure lines for which the middle-term exposure operations are performed are continued. An output signal of the long-term exposure frame at this time is indicated by F_L Readout. Note that in this long-term exposure frame, since pixels are reset by performing pixel read operations, a longest exposure time is Tfrl as the vertical synchronizing period of the long-term exposure frame.

Furthermore, at timing t20 after an elapse of 4Tfrs since timing t00, signals of pixels of line 03 are output in synchronism with a third short-term vertical synchronizing signal VDS next to the second long-term vertical synchronizing signal VDL during the period RO. Subsequently, at timing t21, signals of pixels of line 04 are output during the period RO. At timing t22 and subsequent timings, the respective signals of pixels of lines 07, 08, 11, 12, 15, and 16 are output during the period RO by the same method.

In this manner, every time 1HD elapses, lines 03, 04, 07, 08, 11, 12, 15, and 16 as the short-term exposure lines for which the middle-term exposure operations are performed are read out, thus ending the line-sequential rolling shutter operation of a middle-term exposure frame. An output signal of the middle-term exposure frame at this time is indicated by Fr_M Readout. Note that in this middle-term exposure frame, since pixels are reset by performing pixel read operations, a longest exposure time is Tfrm as 2Tfrs of the vertical synchronizing period of the short-term exposure frame.

In the operations shown in FIG. 10, the longest exposure time Tfrl of the long-term exposure frame is a period three times of the longest exposure time Tfrs of the short-term exposure frame. Also, the longest exposure time Tfrm of the middle-term exposure frame is a period twice of the longest exposure time Tfrs of the short-term exposure frame.

As can be seen from the operations shown in FIG. 10, the middle-term exposure operations using the short-term exposure lines are controlled to be performed during idle times of the short-term exposure operations. Furthermore, since the short-term exposure lines and long-term exposure lines are separately read out at 2-line intervals, a read-out time of each frame is nearly halved compared to an operation for reading out all lines at the same time.

Figure 11:
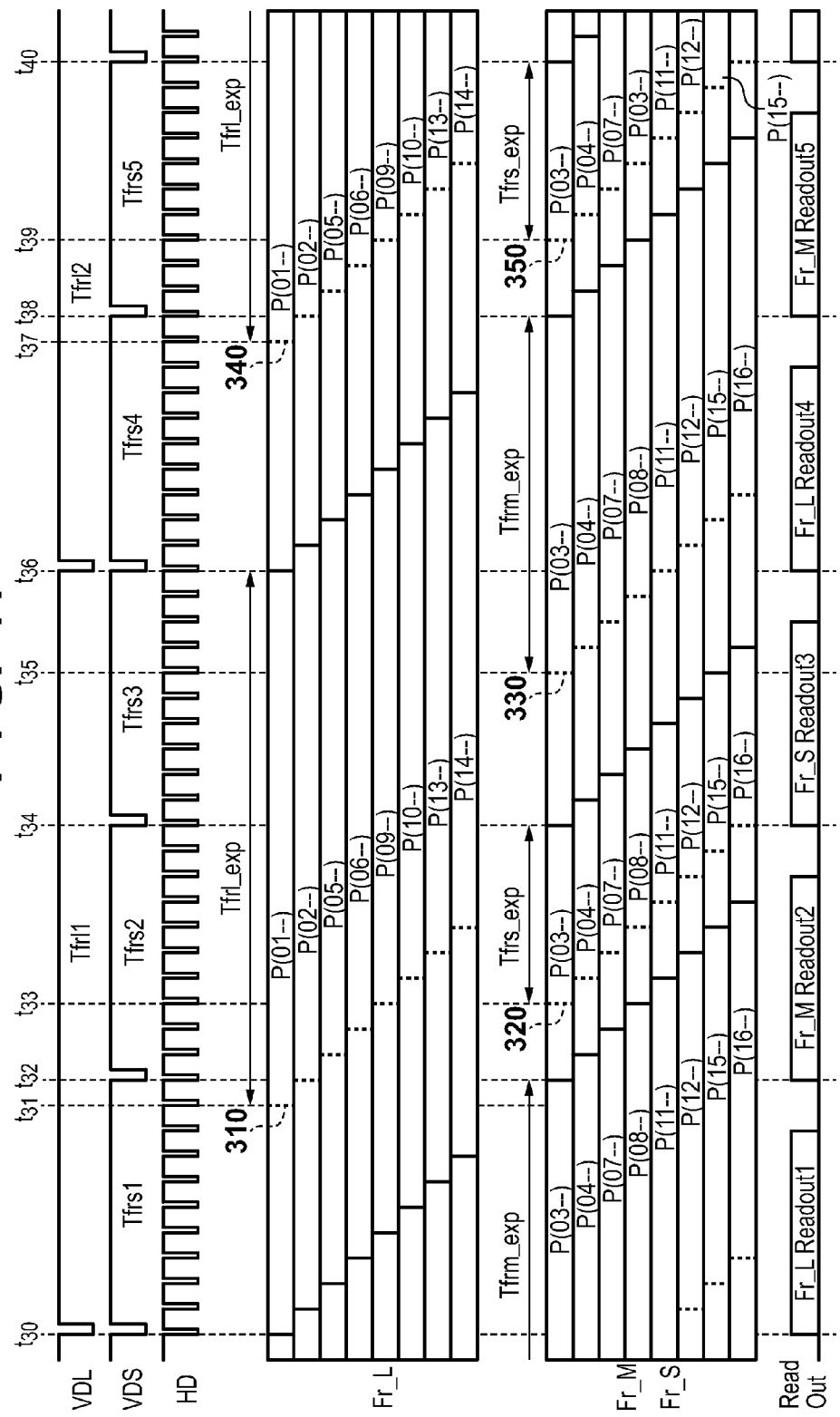
FIG. 11 is a timing chart showing control timings of the image sensor according to the fourth embodiment.

FIG. 11 is a timing chart showing control timings of the long-term exposure frame, middle-term exposure frame, and short-term exposure frame according to this embodiment. FIG. 11 shows the operations for respective lines in FIG. 10 as those for respective frames, and shows control timings that allow continuous shooting operations upon application to moving image shooting. Thus, in order to allow continuous shooting operations, control timings after timing t36 are returned to timing t30 and are repeated. Note that the same reference numerals in FIG. 11 denote the same operations and components as in FIG. 10.

A period between timings t30 to t36 and that after timing t36 respectively correspond to a first long-term vertical synchronizing period Tfrl1 and a second long-term vertical synchronizing period Tfrl2. A period between timings t30 to t32 corresponds to a first short-term vertical synchronizing period Tfrs1. A period between timings t32 to t34 corresponds to a second short-term vertical synchronizing period Tfrs2. A period between timings t34 to t36 corresponds to a third short-term vertical synchronizing period Tfrs3. A period between timings t36 to t38 corresponds to a fourth short-term vertical synchronizing period Tfrs4. Then, a period between timings t38 to t40 corresponds to a fifth short-term vertical synchronizing period Tfrs5.

F_L represents states of operations of lines 01, 02, 05, 06, 09, 10, 13, and 14 which form the long-term exposure frame. Fr_M and Fr_S represent states of operations of lines 03, 04, 07, 08, 11, 12, 15, and 16 as short-term exposure lines, which respectively form the middle-term exposure frame and the short-term exposure frame.

Note that in F_L, rolling shutter operations are performed during respective long-term vertical synchronizing periods Tfrl in synchronism with VDL.

Also, in Fr_S, exposure operations of rolling shutter operations are started in synchronism with VDS after an elapse of Tfrs since VDL, and read operations of rolling shutter operations are started in synchronism with VDS after another elapse of Tfrs.

Furthermore, in Fr_M, exposure operations of rolling shutter operations are started in synchronism with VDS after an elapse of 2Tfrs since VDL corresponding to an idle time of Fr_S, and read operations of rolling shutter operations are started in synchronism with VDS after another elapse of 2Tfrs.

Then, these operations are repetitively performed in synchronism with VDL.

That is, as for short-term exposure lines, read operations of pixel signals are started in synchronism with VDS which does not overlap any read period of pixel signals obtained by long-term exposure. Also, read operations of pixel signals obtained by middle-term exposure are started in synchronism with VDS which does not overlap any read period of pixel signals obtained by long-term exposure and any read period of pixel signals obtained by short-term exposure.

More specifically, during the first short-term vertical synchronizing period Tfrs1 included in the first long-term vertical synchronizing period Tfrl1, an output signal F_L Readout1 of the long-term exposure frame, the exposure operation of which was started at the timing one cycle before, is output. Next, during the second short-term vertical synchronizing period Tfrs2, an output signal Fr_M Readout2 of the middle-term exposure frame, the exposure operation of which was started at the timing one cycle before, is output. After that, during the third short-term vertical synchronizing period Tfrs3, an output signal Fr_S Readout3 of the short-term exposure frame is output.

Likewise, during the fourth short-term vertical synchronizing period Tfrs4 included in the second long-term vertical synchronizing period Tfrl2, an output signal F_L Readout4 of the long-term exposure frame is output. Next, during the fifth short-term vertical synchronizing period Tfrs5, an output signal Fr_M Readout5 of the middle-term exposure frame is output.

Thus, the output signals F_L Readout of the long-term exposure frame, the output signals Fr_M Readout of the middle-term exposure frame, and the output signals Fr_S Readout of the short-term exposure frame are repetitively output in synchronism with the short-term vertical synchronizing signals VDS. For this reason, read operations of output signals from the image sensor are averaged compared to the conventional operation for reading out all lines at the same time after completion of long-term exposure.

Exposure control using an electronic shutter will be described below.

In a long-term exposure frame F_L during the first long-term vertical synchronizing period Tfrl1, pixels of line 01 are reset in synchronism with the horizontal synchronizing signal HD at timing t31, thus starting an exposure operation of line 01. The reset operation at this time is indicated by a broken line 310. Subsequently, every time 1HD elapses, pixels of lines 02, 05, 06, 09, 10, 13, and 14 are respectively reset, thus starting the line-sequential rolling shutter operation of the long-term exposure frame F_L. The reset operations at this time are also respectively indicated by broken lines.

Next, at timing t36 after an elapse of Tfrl_exp since timing t31, a read operation of line 01 is performed in synchronism with VDL. In continuous shooting operations, after timing t36, control operations are returned to timing t30 and are repeated. However, in this case, a description will be continuously given until the end of the operation of the long-term exposure frame F_L. At this time, Tfrl_exp as an exposure time amounts to 21HD. Subsequently, every time 1HD elapses, lines 02, 05, 06, 09, 10, 13, and 14 are respectively read out, thus ending the line-sequential rolling shutter operation of the long-term exposure frame F_L. In this manner, in the long-term exposure frame F_L, all lines output signals having the exposure time Tfrl_exp. An output signal of the long-term exposure frame F_L at this time corresponds to F_L Readout4 during the fourth short-term vertical synchronizing period Tfrs4.

The exposure control operations using the electronic shutter, which are performed during the first long-term vertical synchronizing period Tfrl1, have been described.

Also, in a short-term exposure frame Fr_S during the first long-term vertical synchronizing period Tfrl1, pixels of line 03 are reset in synchronism with the horizontal synchronizing signal HD at timing t33, thus starting an exposure operation of line 03. The reset operation at this time is indicated by a broken line 320. Subsequently, every time 1HD elapses, lines 04, 07, 08, 11, 12, 15, and 16 are respectively reset, thus starting the line-sequential rolling shutter operation of the short-term exposure frame Fr_S. The reset operations at this time are also respectively indicated by broken lines.

Next, at timing t34 after an elapse of Tfrs_exp since timing t33, a read operation of line 03 is performed in synchronism with VDS. At this time, Tfrs_exp as an exposure time amounts to 7HD. Subsequently, every time 1HD elapses, lines 04, 07, 08, 11, 12, 15, and 16 are respectively read out, thus ending the line-sequential rolling shutter operations of the short-term exposure frame Fr_S. In this way, in the short-term exposure frame Fr_S, all lines output signals having the exposure time Tfrs_exp. An output signal of the short-term exposure frame Fr_S at this time corresponds to Fr_S Readout3 during the third short-term vertical synchronizing period Tfrs3 of the short-term exposure frame.

Then, in a middle-term exposure frame Fr_M, pixels of line 03 are reset in synchronism with the horizontal synchronizing signal HD at timing t35, thus starting an exposure operation of line 03. The reset operation at this time is indicated by a broken line 330. Subsequently, every time 1HD elapses, lines 04, 07, 08, 11, 12, 15, and 16 are respectively reset, thus starting the line-sequential rolling shutter operation of the middle-term exposure frame Fr_M. The reset operations at this time are also respectively indicated by broken lines. Next, at timing t38 after an elapse of Tfrm_exp since timing t35, a read operation of line 03 is performed in synchronism with VDS. In continuous shooting operations, after timing 36, control operations are returned to timing t30 and are repeated. However, in this case, a description will be continuously given until the end of the operation of the middle-term exposure frame Fr_M. At this time, Tfrm_exp as an exposure time amounts to 14HD. Subsequently, every time 1HD elapses, lines 04, 07, 08, 11, 12, 15, and 16 are respectively read out, thus ending the line-sequential rolling shutter operations of the middle-term exposure frame Fr_M. In this way, in the middle-term exposure frame Fr_M, all lines output signals having the exposure time Tfrm_exp. An output signal of the middle-term exposure frame Fr_M at this time corresponds to Fr_M Readout5 during the fifth short-term vertical synchronizing period Tfrs5 of the short-term exposure frame.

The exposure control operations using the electronic shutter, which are performed with the long-term exposure vertical synchronizing signal VDL, have been described.

In this case, a ratio of the exposure time Tfrs_exp of the short-term exposure frame, the exposure time Tfrm_exp of the middle-term exposure frame, and the exposure time Tfrl_exp of the long-term exposure frame is 7HD:14HD: 21HD=1:2:3. These electronic shutter operations control the ratio of the exposure times of the short-term exposure frame, middle-term exposure frame, and long-term exposure frame to be 1:2:3. For this reason, by composing signals of short-term exposure pixels, those of middle-term exposure pixels, and those of long-term exposure pixels while setting gain values used to compensate for a sensitivity ratio to be 3×, 3/2×, and 1×, the dynamic range expansion processing can be executed.

Figure 12:
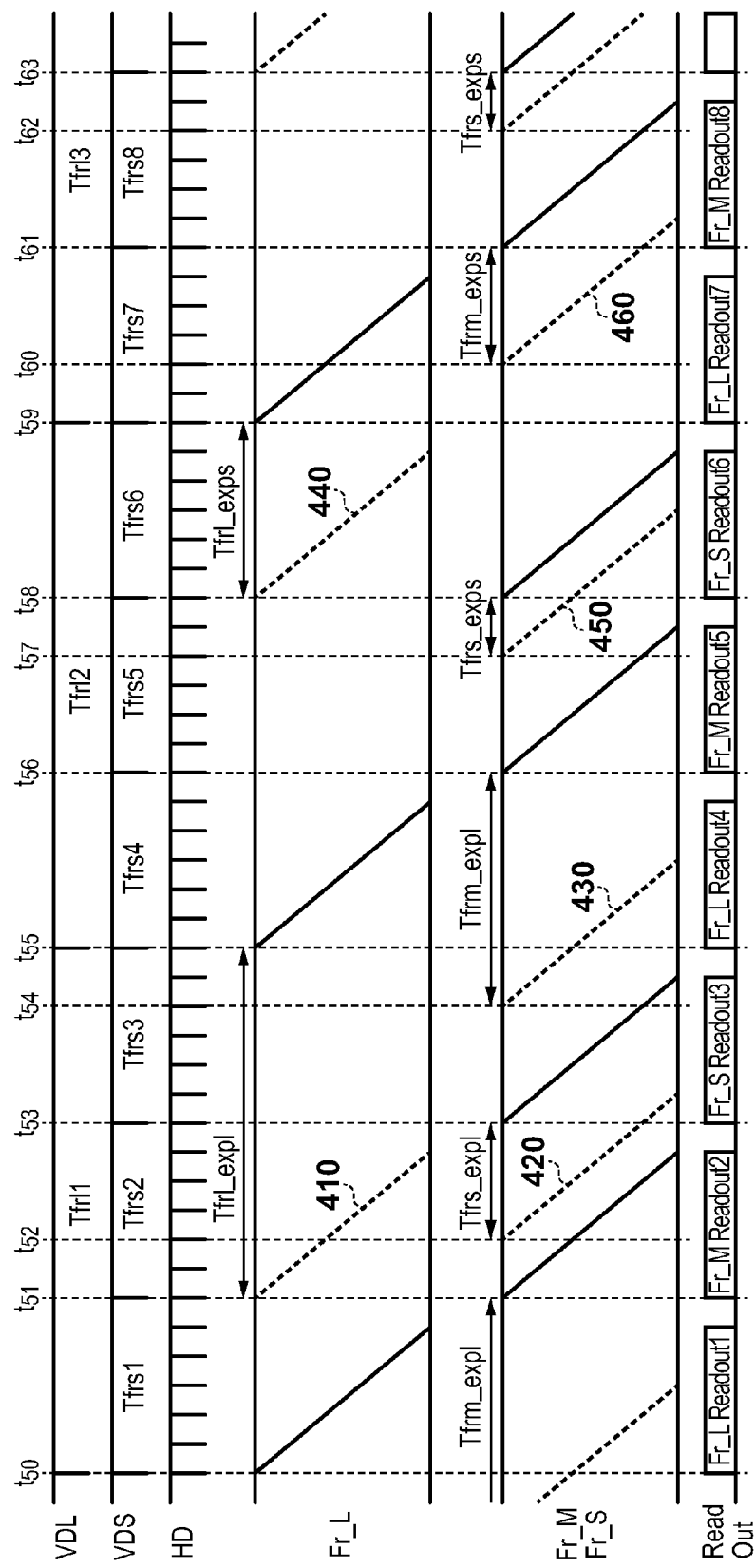
FIG. 12 is a timing chart showing control timings of the image sensor according to the fourth embodiment.

FIG. 12 is a chart showing control timings of the long-term exposure frame, middle-term exposure frame, and short-term exposure frame according to this embodiment. FIG. 12 shows the simplified operations for respective frames shown in FIG. 11. A case will be described below with reference to FIG. 12 wherein exposure times of the electronic shutter are changed. Note that the same reference numerals in FIG. 12 denote the same operations and components as in FIG. 11.

In a long-term exposure frame F_L, at timing t51, pixels are reset for respective lines in turn from line 01 to start exposure operations, thus starting a rolling shutter operation. The reset operations at that time are indicated by a broken line 410. Next, at timing t55 after an elapse of Tfrl_expl since timing t51, read operations of signals of pixels are performed for respective lines in turn from line 01, thus ending the rolling shutter operation. At this time, Tfrl_expl as an exposure time amounts to 12HD. An output signal of the long-term exposure frame F_L is indicated by F_L Readout4.

Also, in a short-term exposure frame Fr_S, pixels of line 03 are reset at timing t52, that is, pixels are reset for respective lines in turn from line 03 so as to start exposure operations, thus starting a rolling shutter operation. The reset operations at that time are indicated by a broken line 420. Next, at timing t53 after an elapse of Tfrs_expl since timing t52, read operations of signals of pixels are performed for respective lines in turn from line 03, thus ending the rolling shutter operation. At this time, Tfrs_expl as an exposure time amounts to 4HD. An output signal of the short-term exposure frame Fr_S is indicated by Fr_S Readout3.

Then, in a middle-term exposure frame Fr_M, pixels of line 03 are reset at timing t54, that is, pixels are reset for respective lines in turn from line 03 so as to start exposure operations, thus starting a rolling shutter operation. The reset operations at that time are indicated by a broken line 430. Next, at timing t56 after an elapse of Tfrm_expl since timing t54, read operations of signals of pixels are performed for respective lines in turn from line 03, thus ending the rolling shutter operation. At this time, Tfrm_expl as an exposure time amounts to 8HD. An output signal of the middle-term exposure frame Fr_M is indicated by Fr_M Readout5.

The operations before exposure times are changed have been described. In this case, a ratio of the exposure time Tfrs_expl of the short-term exposure frame, the exposure time Tfrm_expl of the middle-term exposure frame, and the exposure time Tfrl_expl of the long-term exposure frame is 4HD:8HD:12HD=1:2:3.

Subsequently, in reset operations 440 starting from timing t58, a rolling shutter operation of a long-term exposure frame F_L is started. Next, in a read operation starting from timing t59 after elapse of Tfrl_exps since timing t58, the rolling shutter operation is ended. At this time, Tfrl_exps as an exposure time amounts to 6HD, and an output signal is indicated by F_L Readout7.

Also, in reset operations 450 starting from timing t57, a rolling shutter operation of a short-term exposure frame Fr_S is started. Next, in a read operation starting from timing t58 after elapse of Tfrs_exps since timing t57, the rolling shutter operation is ended. At this time, Tfrs_exps as an exposure time amounts to 2HD, and an output signal is indicated by Fr_S Readout6.

Then, in reset operations 460 starting from timing t60, a rolling shutter operation of a middle-term exposure frame Fr_M is started. Next, in a read operation starting from timing t61 after elapse of Tfrm_exps since timing t60, the rolling shutter operation is ended. At this time, Tfrm_exps as an exposure time amounts to 4HD, and an output signal is indicated by Fr_M Readout8.

The operations after the exposure times are changed have been described. In this case, a ratio of the exposure time Tfrs_exps of the short-term exposure frame, the exposure time Tfrm_exps of the middle-term exposure frame, and the exposure time Tfrl_exps of the long-term exposure frame is 2HD:4HD:6HD=1:2:3.

Even when changes of the exposure times by means of the electronic shutter are performed, the ratio of the exposure times of the short-term exposure frame, middle-term exposure frame, and long-term exposure frame can always be controlled to be 1:2:3. Thus, by composing signals of short-term exposure pixels, those of middle-term exposure pixels, and those of long-term exposure pixels while setting gain values used to compensate for a sensitivity ratio to be 3×, 3/2×, and 1×, the dynamic range expansion processing can be executed.

Next, a shooting operation and HDR processing of this embodiment will be described below.

The HDR processing is performed by a signal processing unit 13 shown in FIG. 1. The signal processing unit 13 performs pixel signal correction processing, positional deviation correction processing, HDR processing, and image signal processing for pixel signals output from the image sensor 12, thereby generating an image, a dynamic range of which is expanded. A case will be described below wherein the output signal F_L Readout1 of the long-term exposure frame, the output signal Fr_M Readout1 of the middle-term exposure frame, and the output signal Fr_S Readout3 of the short-term exposure frame Fr_S in FIG. 12 are used.

Initially, the pixel signal correction processing is applied to the output signal F_L Readout1 of the long-term exposure frame, which is output in synchronism with VDS. As the pixel signal correction processing, for example, correction processing including scratch correction, fixed pattern correction, shading correction, and the like is executed. Next, since the positions of long-term exposure lines and short-term exposure lines are deviated at 2-line intervals, the positional deviation correction processing is executed. The positional deviation correction processing calculates pixel signals at the time of long-term exposure at positions of lines 03, 04, 07, 08, 11, 12, 15, and 16 using lines 01, 02, 05, 06, 09, 10, 13, and 14 of the long-term exposure frame. For example, a method of calculating lines 03 and 04 at the time of short-term exposure by interpolation using lines 01, 02, 05, and 06 of the long-term exposure frame may be adopted. In this embodiment, the positional deviation correction processing is executed to fit the short-term exposure lines in consideration that the short-term exposure lines are used in both short-term exposure and middle-term exposure operations, and a principal object normally exists on the short-term exposure side. Also, although only 16 lines are included in the pixel region 200 shown in FIG. 2, an actual image sensor includes 960 lines or more or 2160 lines or more according to the moving image shooting specifications. For this reason, even when the pixel region 200 is divided into a short-term exposure frame and long-term exposure frame, satisfactory positional deviation correction can be performed. Pixel signals of lines 03, 04, 07, 08, 11, 12, 15, and 16 corresponding to the long-term exposure frame calculated in this way are stored in a memory (not shown) included in the signal processing unit 13. Then, the same pixel signal correction processing is applied to the output signal Fr_M Readout2 of the middle-term exposure frame, which is output in synchronism with the next VDS. Furthermore, a gain value of 3/2× is multiplied to compensate for a ratio=2:3 of the exposure times of the middle-term exposure frame and long-term exposure frame as a part of the HDR processing. The middle-term exposure frame does not require any positional deviation correction processing since it is formed based on the short-term exposure lines. Pixel signals of lines 03, 04, 07, 08, 11, 12, 15, and 16 corresponding to the middle-term exposure frame calculated in this way are stored in the memory (not shown) included in the signal processing unit 13.

Furthermore, the same pixel signal correction processing is applied to the output signal Fr_S Readout3 of the short-term exposure frame, which is output in synchronism with the next VDS. Furthermore, a gain value of 3× is multiplied to compensate for a ratio=1:3 of the exposure times of the short-term exposure frame and long-term exposure frame as a part of the HDR processing.

Next, the HDR processing is performed using the following pixel signals:

(a) the stored pixel signals of lines 03, 04, 07, 08, 11, 12, 15, and 16 of the long-term exposure frame;

(b) the stored pixel signals of lines 03, 04, 07, 08, 11, 12, 15, and 16 corresponding to the middle-term exposure frame; and (c) the stored pixel signals of lines 03, 04, 07, 08, 11, 12, 15, and 16 corresponding to the short-term exposure frame.

Pixel signals of the short-term exposure frame and those of the middle-term exposure frame have already been multiplied by gain values used to compensate for the exposure times. Therefore, in the HDR processing to be executed in this case, signals of long-term exposure pixels, those of middle-term exposure pixels, those of short-term exposure pixels are composed using weighting coefficients according to brightness levels. As a composition method according to brightness levels, for example, the following method can be used. Assume that a sum of a weighting coefficient of a signal of a long-term exposure pixel, that of a signal of a middle-term exposure pixel, and that of a signal of a short-term exposure pixel is set to be a constant value (=1). When an image is bright, the weighting coefficient of the signal of the short-term exposure pixel is set to be larger. On the other hand, when an image is dark, the weighting coefficient of the signal of the long-term exposure pixel is set to be larger.

Since the signal processes for each pixel are executed so far, the image signal processing is performed lastly for an image, a dynamic range of which is expanded. As the image signal processing, signal processing including white balance adjustment processing, color correction processing, gamma correction processing, and the like is executed. In this way, upon outputting the signals of the long-term exposure frame, the pixel signal correction processing and positional deviation correction processing for the long-term exposure frame are performed. Upon outputting of the signals of the middle-term exposure frame, the pixel signal correction processing and gain correction required to compensate for the exposure time for the middle-term exposure frame are performed. Upon outputting of the signals of the short-term exposure frame, the pixel signal correction processing, gain correction required to compensate for the exposure time, HDR processing, and image signal processing for the short-term exposure frame are performed. In this manner, various processes can be distributed.

Furthermore, in a moving image shooting operation, an image of the third short-term vertical synchronizing period Tfrs3 is created using F_L Readout1, Fr_M Readout2, and Fr_S Readout3. Also, an image of the next fourth short-term vertical synchronizing period Tfrs4 is created using Fr_M Readout2, Fr_S Readout3, and F_L Readout4 in place of F_L Readout1. In this manner, since the HDR processing is performed using newly output image signals, the resolution of a moving image in the moving image shooting operation may be improved.

When a still image is to be created from output signals of three successive exposure frames, output signals, which are output in an order of a short-term exposure frame, long-term exposure frame, and middle-term exposure frame having larger overlaps of exposure times, may be used. For example, output signals Fr_S Readout3, F_L Readout4, and Fr_M Readout5 or output signals Fr_S Readout 6, F_L Readout7, and Fr_M Readout8 may be used. Thus, a still image, which is less blurred, and a dynamic range of which is expanded, can be created.

As described above, according to this embodiment, an image capturing apparatus, which executes HDR processing using signals of pixels having different exposure times for every two neighboring lines, is provided. Short-term exposure lines, middle-term exposure lines, and long-term exposure lines are read out in independent frames in synchronism with frame cycles at the time of short-term exposure. At the same time, within a frame period at the time of long-time exposure, short-term exposure lines and middle-term exposure lines are read out in independent frames in synchronism with frame cycles at the time of short-term exposure. Thus, a read control system can be simplified, and a data rate at the time of read operations and signal processing can be reduced and averaged.

Also, the vertical synchronizing period of the long-term exposure frame is set to be three times of that of the short-term exposure frame in correspondence with a ratio=1:2:3 of the exposure times of the short-term exposure frame, middle-term exposure frame, and long-term exposure frame. In addition, middle-term exposure operations are performed for short-term exposure lines during the short-term exposure frame. Thus, the exposure time of the short-term exposure frame and that of the middle-term exposure frame can be effectively used for that of the long-term exposure frame, and exposure time control can be avoided from being complicated.

Furthermore, by reading out short-term exposure lines in synchronism with frame cycles at the time of short-term exposure within a frame period at the time of long-term exposure, the long-term exposure and short-term exposure can be executed to overlap each other. For this reason, even when a uniform frame rate is used, the long-term exposure which exceeds one frame at the time of short-term exposure can be realized. In addition, generation of a wasteful time which does not contribute to exposure in the multi-exposure method can also be avoided.

Then, since short-term exposure lines and long-term exposure lines are read out in independent frames, generation of a rolling distortion can be halved.

Also, the long-term exposure and short-term exposure can be executed to overlap each other. For this reason, complicated reset and read timing control operations, which are required to match the centers of the exposure times of the long-term exposure and short-term exposure in the related art, can be avoided.

Moreover, short-term exposure lines and long-term exposure lines can be read out in independent frames. For this reason, an interference problem between the short-term exposure line read end timing and long-term exposure line read start timing, which problem may be posed when the centers of exposure times of long-term exposure and short-term exposure are matched, can be avoided.

A modification of this embodiment will be described below.

In the aforementioned positional deviation correction processing, pixel signals of lines 03, 04, 07, 08, 11, 12, 15, and 16 equivalent to short-term exposure lines are calculated using lines 01, 02, 05, 06, 09, 10, 13, and 14 as long-term exposure lines. Instead, all lines 01 to 16 may be used as a long-term exposure frame. At this time, pixel signals of lines 03, 04, 07, 08, 11, 12, 15, and 16 equivalent to a long-term exposure frame are calculated using lines 01, 02, 05, 06, 09, 10, 13, and 14 of the long-term exposure frame. Thus, all lines 01 to 16 are used as the long-term exposure frame.

Likewise, pixel signals of lines 01, 02, 05, 06, 09, 10, 13, and 14 equivalent to short-term exposure lines for middle-term exposure and short-term exposure are calculated using lines 03, 04, 07, 08, 11, 12, 15, and 16 as short-term exposure lines for middle-term exposure and short-term exposure. Then, as a middle-term exposure frame and short-term exposure frame, all lines 01 to 16 are used.

Then, an image, a dynamic range of which is expanded, can be generated using all 16×16 pixels. This method is suited to create a still image from output signals of three successive exposure frames.

Another modification of this embodiment will be described below.

In the aforementioned image signal processing, signal processing including white balance adjustment processing, color correction processing, gamma correction processing, and the like is executed after HDR processing. However, these image signal processes may be distributed. At this time, white balance adjustment processing and color correction processing are applied to an output signal (first image data) of a long-term exposure frame after positional deviation correction processing is performed, and the processed signal is stored in the memory. Likewise, white balance adjustment processing and color correction processing are applied to an output signal (second image data) of a middle-term exposure frame after gain values used to compensate for exposure times are multiplied, and the processed signal is stored in the memory. Then, white balance adjustment processing and color correction processing are applied to an output signal (third image data) of a short-term exposure frame after pixel signal correction processing is performed. After that, HDR processing is performed, and gamma correction processing is applied to an output signal (fourth image data) of the HDR processing.

Still another modification of this embodiment will be described below with reference to FIGS. 15A to 15D.

FIG. 15A is a pixel characteristic graph showing the relations between an image capturing plane illuminance Eplx and pixel output signal Psig of the pixel region 200. Pixel characteristics Exp1, Exp2, Exp3, and Exp4 represent the relations of those when exposure frame periods are respectively Tfrs, 2Tfrs, 3Tfrs, and 4Tfrs, and an exposure time ratio by the electronic shutter is controlled to be 1:2:3:4. FIG. 15A represents the relations between the image capturing plane illuminance Eplx and pixel output signal Psig in this case. Thus, with reference to the pixel characteristic Exp1, gradients of the pixel characteristics Exp2, Exp3, and Exp4 are respectively twice, three times, and four times of that of the characteristic Exp1. PSAT represents a saturated signal amount of a pixel.

Since the pixel characteristics Exp1, Exp2, Exp3, and Exp4 reach the saturated signal amount PSAT respectively at image capturing plane illuminance levels E1, E2, E3, and E4, output signals are no longer increased at these illuminance levels or higher. Broken lines indicate characteristics under the assumption that the pixel characteristics Exp1, Exp2, Exp3, and Exp4 are never saturated.

In this embodiment, the pixel characteristics Exp1, Exp2, and Exp3 respectively correspond to an output signal of a short-term exposure frame, that of a middle-term exposure frame, and that of a long-term exposure frame.

FIG. 15B is an image signal characteristic graph showing the relation between the image capturing plane illuminance Eplx of the pixel characteristic Exp1 and an image signal Ssig used in the image signal processing. In FIG. 15A, since a pixel is saturated at the image capturing plane illuminance level E1, the image signal also has a characteristic, which is saturated at SSAT. Then, as can be seen from FIG. 15B, an image signal is output to have tones from 0 to SSAT in correspondence with image capturing plane illuminance levels 0 to E1. This pixel characteristic is obtained when the HDR processing is not performed.

FIG. 15C is an image signal characteristic graph showing the relation between the image capturing plane illuminance Eplx and the image signal Ssig used in the image signal processing when the HDR processing is performed using the pixel characteristics Exp1 and Exp2. The HDR processing method is implemented by adding the pixel characteristics Exp1 and Exp2 and normalizing the sum characteristic so that a maximum saturation signal matches Ssig. In an image capturing plane illuminance range from 0 to E2, the pixel characteristics Exp1 and Exp2 shown in FIG. 15A are added. In an image capturing plane illuminance range from E2 to E1, since the pixel characteristic Exp2 is saturated in FIG. 15A, PSAT and the pixel characteristic Exp1 are added. At the image capturing plane illuminance level E1 or higher, since both the pixel characteristics Exp1 and Exp2 are saturated in FIG. 15A, a maximum saturated signal amount 2PSAT is used. By normalizing the pixel characteristic added in this way so that the maximum saturated signal amount 2PSAT matches SSAT, the HDR processing shown in FIG. 15C is implemented. As can be seen from FIG. 15C, an image signal is output to have tones from 0 to SSAT in correspondence with image capturing plane illuminance levels 0 to E1. Furthermore, as can be seen from FIG. 15C, since the sum characteristic is normalized so that the maximum saturated signal amount 2PSAT matches SSAT, a dynamic range is expanded to 2×.

FIG. 15D is an image signal characteristic graph showing the relation between the image capturing plane illuminance Eplx and image signal Ssig used in the image signal processing when the HDR processing is performed using pixel characteristics Exp1, Exp2, and Exp3. The HDR processing method is implemented by adding the pixel characteristics Exp1, Exp2, and Exp3, and normalizing the sum characteristic so that a maximum saturation signal matches Ssig. In an image capturing plane illuminance range from 0 to E3, the pixel characteristics Exp1, Exp2, and Exp3 shown in FIG. 15A are added. In an image capturing plane illuminance range from E3 to E2, since the pixel characteristic Exp3 is saturated in FIG. 15A, PSAT and the pixel characteristics Exp1 and Exp2 are added. In an image capturing plane illuminance range from E2 to E1, since both the pixel characteristics Exp2 and Exp3 are saturated in FIG. 15A, 2PSAT and the pixel characteristic Exp1 are added. At the image capturing plane illuminance level E1 or higher, since all of the pixel characteristics Exp1, Exp2, and Exp3 are saturated in FIG. 15A, 3PSAT as a maximum saturated signal amount is used. By normalizing the pixel characteristic added in this way so that the maximum saturated signal amount 3PSAT matches SSAT, the HDR processing shown in FIG. 15D is implemented. Then, the image capturing apparatus can be controlled to operate the image sensor 12, as shown in FIG. 11, and to control the signal processing unit 13 to perform the HDR processing so as to attain the characteristic shown in FIG. 15D. In this manner, as can be seen from FIG. 15D, the image signal is output to have tones from 0 to SSAT in correspondence with the image capturing plane illuminance range from 0 to E1. Furthermore, as can be seen from FIG. 15D, since the sum characteristic is normalized so that the maximum saturated signal amount 3PSAT matches SSAT, a dynamic range is expanded to 3×. FIG. 15D shows an input/output characteristic known as a gamma characteristic, thereby expanding the dynamic range.

Fifth Embodiment

The fifth embodiment will be described below with reference to FIGS. 1, 2, and 13 to 15F. Note that in this embodiment, the basic arrangement and operation of an image capturing apparatus and those of an image sensor are the same as those in the fourth embodiment. Hence, the following description will be given while quoting the figures and reference numerals. In the fourth embodiment, an image with a broad dynamic range is generated by setting two frames of long-term exposure lines and short-term exposure lines having different exposure times at 2-line intervals, and a middle-term exposure frame for the short-term exposure lines. This embodiment will explain a method of changing input/output characteristics of HDR processing by changing frame periods of a long-term exposure frame and middle-term exposure frame.

FIG. 13 is a chart showing control timings of a long-term exposure frame, middle-term exposure frame, and short-term exposure frame according to this embodiment. In FIG. 13, since a long-term vertical synchronizing period Tfrl has a period four times of a short-term vertical synchronizing period Tfrs, input/output characteristics of HDR processing different from the fourth embodiment can be provided. FIG. 13 shows control timings that allow continuous shooting operations to allow an application to a moving image shooting operation. In order to allow continuous shooting operations, assume that control timings after timing t77 or those after timing t84 are returned to timing t70 and are repeated.

In FIG. 13, VDL represents a vertical synchronizing signal (long-term vertical synchronizing signal) for a long-term exposure frame, and VDS represents a vertical synchronizing signal (short-term vertical synchronizing signal) for a short-term exposure frame. HD represents a horizontal synchronizing signal, which defines a period in which reset operations and read operations of pixels are performed for a row unit.

A period between timings t70 to t77 and that between timings t77 to t84 respectively correspond to a first long-term vertical synchronizing period Tfrl1 and a second long-term vertical synchronizing period Tfrl2.

A period between timings t70 to t71 corresponds to a first short-term vertical synchronizing period Tfrs1.

A period between timings t71 to t73 corresponds to a second short-term vertical synchronizing period Tfrs2.

A period between timings t73 to t75 corresponds to a third short-term vertical synchronizing period Tfrs3.

A period between timings t75 to t77 corresponds to a fourth short-term vertical synchronizing period Tfrs4.

A period between timings t77 to t78 corresponds to a fifth short-term vertical synchronizing period Tfrs5.

A period between timings t78 to t80 corresponds to a sixth short-term vertical synchronizing period Tfrs6.

A period between timings t80 to t82 corresponds to a seventh short-term vertical synchronizing period Tfrs7.

A period between timings t82 to t84 corresponds to an eighth short-term vertical synchronizing period Tfrs8.

F_L represents states of operations of lines 01, 02, 05, 06, 09, 10, 13, and 14 which form a long-term exposure frame. Fr_M and Fr_S represent states of operations of lines 03, 04, 07, 08, 11, 12, 15, and 16 as short-term exposure lines, which form a middle-term exposure frame and short-term exposure frame. Thus, as in FIG. 10, long-term exposure lines and short-term exposure lines can be controlled to have different exposure times at 2-line intervals.

In this case, in the long-term exposure frame F_L, rolling shutter operations are successively performed for respective long-term vertical synchronizing periods Tfrl in synchronism with VDL. In the short-term exposure frame Fr_S, exposure operations of rolling shutter operations are started in synchronism with VDS after an elapse of 2Tfrs since VDL, and read operations of the rolling shutter operations are started in synchronism with VDS after an elapse of Tfrs. Furthermore, in Fr_M, exposure operations of rolling shutter operations are started in synchronism with VDS of the short-term exposure frame after an elapse of 3Tfrs since VDL corresponding to an idle time of Fr_S, and read operations of the rolling shutter operations are started in synchronism with VDS after an elapse of 2Tfrs. Then, these operations are repetitively performed in synchronism with VDL.

More specifically, during Tfrs1 included Tfrl1, an output signal F_L Readout1 of a long-term exposure frame, the exposure operation of which was started one cycle before, is output. Next, during Tfrs2, an output signal Fr_M Readout2 of a middle-term exposure frame, the exposure operation of which was started one cycle before, is output. In this embodiment, since Tfrl is set to be four times of Tfrs, no signal is output during Tfrs3.

Next, during Tfrs4, an output signal Fr_S Readout4 of a short-term exposure frame is output. Likewise, during Tfrs5 included in Tfrl2, an output signal F_L Readout5 of a long-term exposure frame is output. Next, during Tfrs6, an output signal Fr_M Readout6 of a middle-term exposure frame is output.

Then, during Tfrs7, no signal is output, and during next Tfrs8, an output signal Fr_S Readout8 of a short-term exposure frame is output. Thus, F_L Readout, Fr_M Readout, and Fr_S Readout are repetitively output in synchronism with VDS. For this reason, read operations of output signals from the image sensor are averaged compared to an operation for reading out all lines at the same time after completion of the long-term exposure.

Exposure control using an electronic shutter will be described below.

Initially, in a long-term exposure frame F_L during Tfrl1, pixels of line 01 are reset in synchronism with the horizontal synchronizing signal HD at timing t72, thus starting an exposure operation of line 01. The reset operation at this time is indicated by a broken line 510. Subsequently, every time 1HD elapses, lines 02, 05, 06, 09, 10, 13, and 14 are respectively reset, thus starting the line-sequential rolling shutter operation of the long-term exposure frame F_L. The reset operations at this time are also respectively indicated by broken lines.

Next, at timing t77 after an elapse of Tfrl_exp since timing t72, a read operation of line 01 is performed in synchronism with VDL. In continuous shooting operations, after timing t77, control operations are returned to timing t70 and are repeated. However, FIG. 13 continuously shows control timings until the end of the operation of the long-term exposure frame F_L. At this time, Tfrl_exp as an exposure time amounts to 16HD. Subsequently, every time 1HD elapses, lines 02, 05, 06, 09, 10, 13, and 14 are respectively read out, thus ending the line-sequential rolling shutter operation of the long-term exposure frame F_L. In this manner, in the long-term exposure frame F_L, all lines output signals having the exposure time Tfrl_exp. An output signal of the long-term exposure frame F_L at this time corresponds to F_L Readout5 during Tfrs5 of a short-term exposure frame. The exposure control operations using the electronic shutter, which are performed during Tfrl1 of the long-term exposure frame, have been described.

In a short-term exposure frame Fr_S during Tfrl1, pixels of line 03 are reset in synchronism with the horizontal synchronizing signal HD at timing t74, thus starting an exposure operation of line 03. The reset operation at this time is indicated by a broken line 520. Subsequently, every time 1HD elapses, pixels of lines 04, 07, 08, 11, 12, 15, and 16 are respectively reset, thus starting the line-sequential rolling shutter operation of the short-term exposure frame Fr_S. The reset operations at this time are also respectively indicated by broken lines. Next, at timing t75 after an elapse of Tfrs_exp since timing t74, a read operation of line 03 is performed in synchronism with VDS. At this time, Tfrs_exp as an exposure time amounts to 4HD. Subsequently, every time 1HD elapses, lines 04, 07, 08, 11, 12, 15, and 16 are respectively read out, thus ending the line-sequential rolling shutter operations of the short-term exposure frame Fr_S. In this way, in the short-term exposure frame Fr_S, all lines output signals having the exposure time Tfrs_exp. An output signal of the short-term exposure frame Fr_S at this time corresponds to Fr_S Readout4 during Tfrs4 of the short-term exposure frame.

Then, in a middle-term exposure frame Fr_M, pixels of line 03 are reset in synchronism with the horizontal synchronizing signal HD at timing t76, thus starting an exposure operation of line 03. The reset operation at this time is indicated by a broken line 530. Subsequently, every time 1HD elapses, pixels of lines 04, 07, 08, 11, 12, 15, and 16 are respectively reset, thus starting the line-sequential rolling shutter operation of the middle-term exposure frame Fr_M. The reset operations at this time are also respectively indicated by broken lines. Next, at timing t78 after an elapse of Tfrm_exp since timing t76, a read operation of line 03 is performed in synchronism with VDS. In continuous shooting operations, after timing t77, control operations are returned to timing t70 and are repeated. However, FIG. 13 continuously shows control timings until the end of the operation of the middle-term exposure frame Fr_M. At this time, Tfrm_exp as an exposure time amounts to 8HD. Subsequently, every time 1HD elapses, lines 04, 07, 08, 11, 12, 15, and 16 are respectively read out, thus ending the line-sequential rolling shutter operations of the middle-term exposure frame Fr_M. In this way, in the middle-term exposure frame Fr_M, all lines output signals having the exposure time Tfrm_exp. An output signal of the middle-term exposure frame Fr_M at this time corresponds to Fr_M Readout6 during Tfrs6 of the short-term exposure frame.

The exposure control operations using the electronic shutter, which are performed in synchronism with the long-term vertical synchronizing signal VDL, have been described. In this case, a ratio of the exposure time Tfrs_exp of the short-term exposure frame, the exposure time Tfrm_exp of the middle-term exposure frame, and the exposure time Tfrl_exp of the long-term exposure frame is 4HD:8HD:16HD=1:2:4. These electronic shutter operations control the ratio of the exposure times of the short-term exposure frame, middle-term exposure frame, and long-term exposure frame to be 1:2:4. For this reason, by composing signals of short-term exposure pixels, those of middle-term exposure pixels, and those of long-term exposure pixels while setting gain values used to compensate for a sensitivity ratio to be 4×, 2×, and 1×, the dynamic range expansion processing can be executed. Thus, input/output characteristics of HDR processing different from the fourth embodiment can be provided. Since a shooting operation and HDR processing in this embodiment can be performed in the same manner as in the fourth embodiment while respectively setting gain values used to compensate for a sensitivity ratio of the short-term exposure frame, middle-term exposure frame, and long-term exposure frame to be 4×, 2×, and 1×, a description thereof will not be given.

As for positional deviation correction processing, an image, a dynamic range of which is expanded, can be generated using all 16×16 pixels as in the modification of the fourth embodiment. Furthermore, as for image signal processing, the processes can be distributed as in another modification of the fourth embodiment.

As described above, in this embodiment, short-term exposure lines, middle-term exposure lines, long-term exposure lines are read out in independent frames in synchronism with frame cycles at the time of short-term exposure. Thus, a read control system can be simplified, and data rates at the time of read operations and signal processing can be reduced and averaged. In addition, the same other effects as in the fourth embodiment can be obtained.

A modification of this embodiment will be described below.

Figure 14:
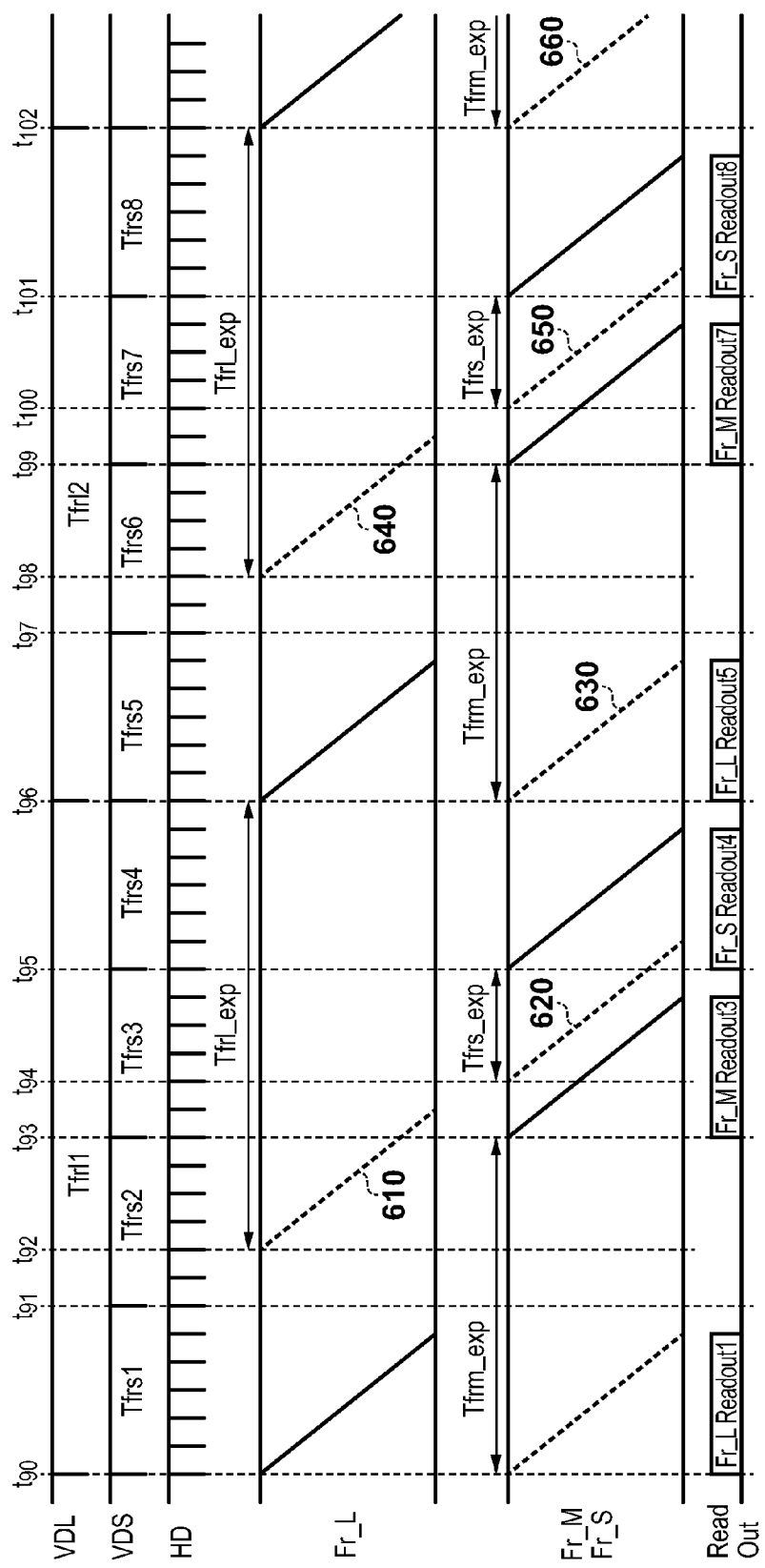
FIG. 14 is a timing chart showing control timings of the image sensor according to the fifth embodiment.

FIG. 14 is a chart showing a modification of control timings of a long-term exposure frame, middle-term exposure frame, and short-term exposure frame. In FIG. 14, a long-term vertical synchronizing period Tfrl has a period four times of a short-term vertical synchronizing period Tfrs. Also, a middle-term vertical synchronizing period Tfrm has a period three times of the short-term vertical synchronizing period Tfrs. For this reason, input/output characteristics of HDR processing different from the above example can be provided. FIG. 14 shows control timings that allow continuous shooting operations to allow an application to a moving image shooting operation. In order to allow continuous shooting operations, assume that control timings after timing t96 or those after timing t102 are returned to timing t90 and are repeated. The same reference numerals denote the same operations and components as those in FIG. 13.

In FIG. 14, a period between timings t90 to t96 and that between timings t96 to t102 respectively correspond to a first long-term vertical synchronizing period Tfrl1 and a second long-term vertical synchronizing period Tfrl2.

A period between timings t90 to t91 corresponds to a first short-term vertical synchronizing period Tfrs1.

A period between timings t91 to t93 corresponds to a second short-term vertical synchronizing period Tfrs2.

A period between timings t93 to t95 corresponds to a third short-term vertical synchronizing period Tfrs3.

A period between timings t95 to t96 corresponds to a fourth short-term vertical synchronizing period Tfrs4.

A period between timings t96 to t97 corresponds to a fifth short-term vertical synchronizing period Tfrs5.

A period between timings t97 to t99 corresponds to a sixth short-term vertical synchronizing period Tfrs6.

A period between timings t99 to t101 corresponds to a seventh short-term vertical synchronizing period Tfrs7.

A period between timings t101 to t102 corresponds to an eighth short-term vertical synchronizing period Tfrs8.

Assume that for a long-term exposure frame F_L and short-term exposure frame Fr_S, the same rolling shutter operations as in FIG. 13 are performed. In a middle-term exposure frame Fr_M, exposure operations of rolling shutter operations are started in synchronism with VDS after an elapse of 3Tfrs since VDL corresponding to an idle time of a short-term exposure frame Fr_S, and read operations of the rolling shutter operations are started in synchronism with VDS after an elapse of 3Tfrs. Then, these operations are repetitively performed in synchronism with VDL.

More specifically, during Tfrs1 included Tfrl1, an output signal F_L Readout1 of a long-term exposure frame, the exposure operation of which was started one cycle before, is output. In this modification, since Tfrl is set to be four times of Tfrs, and Tfrm is set to be three times of Tfrs, no signal is output during Tfrs2. Then, during Tfrs3, an output signal Fr_M Readout3 of a middle-term exposure frame, the exposure operation of which was started one cycle before, is output. Next, during Tfrs4, an output signal Fr_S Readout4 of a short-term exposure frame is output.

Likewise, during Tfrs5 included in Tfrl2, an output signal F_L Readout5 of a long-term exposure frame is output. Then, during Tfrs6, no signal is output, and during Tfrs7, an output signal Fr_M Readout7 of a middle-term exposure frame is output. Next, during Tfrs8, an output signal Fr_S Readout8 of a short-term exposure frame is output. Then, these operations are repetitively performed in synchronism with VDL. Thus, an output signal F_L Readout of a long-term exposure frame, an output signal Fr_M Readout of a middle-term exposure frame, and an output signal Fr_S Readout are repetitively output in synchronism with VDS. For this reason, read operations of output signals from the image sensor are averaged compared to an operation for reading out all lines at the same time after completion of the long-term exposure.

In this modification, since Tfrl is set to be four times of Tfrs, an idle time of a short-term exposure frame Fr_S is three times of Tfrs. Thus, in this modification, since Tfrm is set to be three times of Tfrs, a wasteful time of short-term exposure lines, which do not contribute to exposure, can be removed.

Exposure control using the electronic shutter will be described below.

Initially, in a long-term exposure frame F_L during Tfrl1, pixels of long-term exposure lines are line-sequentially reset in synchronism with the horizontal synchronizing signal HD at timing t92, thus starting exposure operations. Thus, the line-sequential rolling shutter operation of the long-term exposure frame F_L is started. The reset operation at this time is indicated by a broken line 610.

Next, in synchronism with VDL at timing t96 after an elapse of Tfrl_exp since timing t92, pixels of the long-term exposure lines are line-sequentially read out. Thus, the line-sequential rolling shutter operation of the long-term exposure frame is ended. At this time, Tfrl_exp as an exposure time amounts to 16HD. Then, an output signal of the long-term exposure frame F_L corresponds to F_L Readout5 during Tfrs5.

Next, in a short-term exposure frame Fr_S during Tfrl1, pixels of short-term exposure lines are line-sequentially reset in synchronism with the horizontal synchronizing signal HD at timing t94, thus starting exposure operations. Thus, the line-sequential rolling shutter operation of the short-term exposure frame Fr_S is started. The reset operation at this time is indicated by a broken line 620. Next, in synchronism with VDS at timing t95 after an elapse of Tfrs_exp since timing t94, pixels of the short-term exposure lines are line-sequentially read out. Thus, the line-sequential rolling shutter operation of the short-term exposure frame Fr_S is ended. At this time, Tfrs_exp as an exposure time amounts to 4HD. Then, an output signal of the short-term exposure frame Fr_S corresponds to Fr_S Readout4 during Tfrs4.

Next, in a middle-term exposure frame Fr_M, pixels of middle-term exposure lines are line-sequentially reset in synchronism with the horizontal synchronizing signal HD at timing t96, thus starting exposure operations. Thus, the line-sequential rolling shutter operation of the middle-term exposure frame Fr_M is started. The reset operation at this time is indicated by a broken line 630. Next, in synchronism with VDS at timing t99 after an elapse of Tfrm_exp since timing t96, pixels of the middle-term exposure lines are line-sequentially read out. Thus, the line-sequential rolling shutter operation of the middle-term exposure frame Fr_M is ended. At this time, Tfrm_exp as an exposure time amounts to 12HD. Then, an output signal of the middle-term exposure frame Fr_M corresponds to Fr_M Readout7 during Tfrs7 of the short-term exposure frame.

The exposure control operations using the electronic shutter, which are performed in synchronism with the long-term vertical synchronizing signal VDL, have been described. In this case, a ratio of the exposure time Tfrs_exp of the short-term exposure frame, the exposure time Tfrm_exp of the middle-term exposure frame, and the exposure time Tfrl_exp of the long-term exposure frame is 4HD:12HD:16HD=1:3:4. These electronic shutter operations control the ratio of the exposure times of the short-term exposure frame, middle-term exposure frame, and long-term exposure frame to be 1:3:4. For this reason, by composing signals of short-term exposure pixels, those of middle-term exposure pixels, and those of long-term exposure pixels while setting gain values used to compensate for a sensitivity ratio to be 4×, 4/3×, and 1×, the dynamic range expansion processing can be executed. Thus, input/output characteristics of HDR processing different from the fourth embodiment and this embodiment can be provided.

Another modification of this embodiment will be described below. Since the basic operation of the HDR processing is the same as still another modification of the fourth embodiment, which has been described using FIGS. 15A to 15D, the figures and reference numerals will be quoted.

FIG. 15A is a pixel characteristic graph showing the relations between an image capturing plane illuminance Eplx and pixel output signal Psig of a pixel region 200. In this embodiment, the pixel characteristics Exp1, Exp2, and Exp4 respectively correspond to an output signal of a short-term exposure frame, that of a middle-term exposure frame, and that of a long-term exposure frame.

FIG. 15E is an image signal characteristic graph showing the relation between the image capturing plane illuminance Eplx and image signal Ssig used in the image signal processing when the HDR processing is performed using pixel characteristics Exp1, Exp2, and Exp4. The HDR processing method is implemented by adding the pixel characteristics Exp1, Exp2, and Exp4, and normalizing the sum characteristic so that a maximum saturation signal matches Ssig.

In an image capturing plane illuminance range from 0 to E4, the pixel characteristics Exp1, Exp2, and Exp4 shown in FIG. 15A are added.

In an image capturing plane illuminance range from E4 to E2, since the pixel characteristic Exp4 is saturated in FIG. 15A, PSAT and the pixel characteristics Exp1 and Exp2 are added.

In an image capturing plane illuminance range from E2 to E1, since both the pixel characteristics Exp2 and Exp4 are saturated in FIG. 15A, 2PSAT and the pixel characteristic Exp1 are added.

At the image capturing plane illuminance level E1 or higher, since all of the pixel characteristics Exp1, Exp2, and Exp4 are saturated in FIG. 15A, 3PSAT as a maximum saturated signal amount is used.

By normalizing the pixel characteristic added in this way so that the maximum saturated signal amount 3PSAT matches SSAT, the HDR processing shown in FIG. 15E is implemented. Then, the image capturing apparatus can be controlled to operate the image sensor 12, as shown in FIG. 13, and to control the signal processing unit 13 to perform the HDR processing so as to attain the characteristic shown in FIG. 15E. In this manner, as can be seen from FIG. 15E, the image signal is output to have tones from 0 to SSAT in correspondence with the image capturing plane illuminance range from 0 to E1. Furthermore, as can be seen from FIG. 15E, since the sum characteristic is normalized so that the maximum saturated signal amount 3PSAT matches SSAT, a dynamic range is expanded to 3×.

FIG. 15F is an image signal characteristic graph showing the relation between the image capturing plane illuminance Eplx and image signal Ssig used in the image signal processing when the HDR processing is performed using pixel characteristics Exp1, Exp3, and Exp4. The HDR processing method is implemented by adding the pixel characteristics Exp1, Exp3, and Exp4, and normalizing the sum characteristic so that a maximum saturation signal matches Ssig.

In an image capturing plane illuminance range from 0 to E4, the pixel characteristics Exp1, Exp3, and Exp4 shown in FIG. 15A are added.

In an image capturing plane illuminance range from E4 to E3, since the pixel characteristic Exp4 is saturated in FIG. 15A, PSAT and the pixel characteristics Exp1 and Exp3 are added.

In an image capturing plane illuminance range from E3 to E1, since both the pixel characteristics Exp3 and Exp4 are saturated in FIG. 15A, 2PSAT and the pixel characteristic Exp1 are added.

At the image capturing plane illuminance level E1 or higher, since all of the pixel characteristics Exp1, Exp3, and Exp4 are saturated in FIG. 15A, 3PSAT as a maximum saturated signal amount is used.

By normalizing the pixel characteristic added in this way so that the maximum saturated signal amount 3PSAT matches SSAT, the HDR processing shown in FIG. 15F is implemented. Then, the image capturing apparatus can be controlled to operate the image sensor 12, as shown in FIG. 14, and to control the signal processing unit 13 to perform the HDR processing so as to attain the characteristic shown in FIG. 15F. In this manner, as can be seen from FIG. 15F, the image signal is output to have tones from 0 to SSAT in correspondence with the image capturing plane illuminance range from 0 to E1. Furthermore, as can be seen from FIG. 15F, since the sum characteristic is normalized so that the maximum saturated signal amount 3PSAT matches SSAT, a dynamic range is expanded to 3×.

FIGS. 15E and 15F show input/output characteristics known as gamma characteristics, thereby expanding the dynamic range and providing different input/output characteristics of the HDR processing.

Still another modification of this embodiment will be described below.

A case will be explained with reference to FIGS. 15E and 15F wherein input/output characteristics of the HDR processing are switched according to an object. Initially, before shooting of a still image or during shooting of a moving image, a luminance distribution of an object or photometry region is calculated from a digital image signal input to a signal processing unit 13. When it is judged that the calculated luminance distribution is broader than a predetermined threshold range, the image sensor 12 is operated, as shown in FIG. 13, and an aperture and electronic shutter are set so that a principal luminance distribution of an object falls within a range from 0 to E2 after the luminance distribution is converted into an image capturing plane illuminance range. Then, the image capturing apparatus is controlled so that the signal processing unit 13 performs the HDR processing, as shown in FIG. 15E. Thus, since many tones can be assigned to a broad image capturing plane illuminance range from 0 to E2, a satisfactory image which assures a sufficient dynamic range for the object can be shot.

Next, when it is judged that the calculated luminance distribution is narrower than a predetermined threshold range, the image sensor 12 is operated, as shown in FIG. 14, and the aperture and electronic shutter are set so that a principal luminance distribution of an object falls within a range from 0 to E4 after the luminance distribution is converted into an image capturing plane illuminance range. Then, the image capturing apparatus is controlled so that the signal processing unit 13 performs the HDR processing, as shown in FIG. 15F. Thus, since the gradient of the image capturing plane illuminance range from 0 to E4 becomes large, and many tones can be assigned to this range, a satisfactory image, a dynamic range of which is expanded, and in which the shading stands out, can be shot.

In this manner, by shooting a still image or moving image after the HDR processing according to an object is performed, a satisfactory image can be obtained.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-021801, filed Feb. 6, 2013, No. 2013-217863, filed Oct. 18, 2013, and No. 2013-232579, filed Nov. 8, 2013, which are hereby incorporated by reference herein in their entirety.

What is claimed is:

1. An image capturing apparatus comprising:
an image sensor in which a plurality of pixels each having a photoelectric conversion element are arranged in a matrix;
a synchronizing signal generation unit configured to generate a short-term vertical synchronizing signal as a vertical synchronizing signal for short-term exposure, and a long-term vertical synchronizing signal for long-term exposure, one cycle of the long-term vertical synchronizing signal being equal to N cycles of the short-term vertical synchronizing signal; and
an exposure control unit configured to repeat performing the short-term exposure for the predetermined number of short-term exposure lines of said image sensor according to the generated short-term vertical synchronizing signal and performing the long-term exposure for the predetermined number of long-term exposure lines of said image sensor according to the generated long-term vertical synchronizing signal,
wherein said exposure control unit starts a first read operation of pixel signals for the long-term exposure lines in synchronism with the long-term vertical synchronizing signal, and
said exposure control unit starts a second read operation of pixel signals for the short-term exposure lines in synchronism with the short-term vertical synchronizing signal, which does not overlap a period of the first read operation.

2. The apparatus according to claim 1, wherein the long-term vertical synchronizing signal is equal to two cycles of the short-term vertical synchronizing signal,
said exposure control unit starts a first rolling shutter operation for the long-term exposure lines and a second rolling shutter operation for the short-term exposure lines in synchronism with a first long-term vertical synchronizing signal,
said exposure control unit starts the second read operation of pixel signal for the short-term exposure lines in synchronism with a short-term vertical synchronizing signal next to the first long-term vertical synchronizing signal, and
said exposure control unit starts the first read operation of pixel signals for the long-term exposure lines in synchronism with a second long-term vertical synchronizing signal next to the first long-term vertical synchronizing signal.

3. The apparatus according to claim 1, wherein said exposure control unit sets a ratio of exposure times in the long-term exposure and the short-term exposure to be constant in respective frames.

4. The apparatus according to claim 1, further comprising a signal processing unit configured to compose first image data obtained by the long-term exposure and second image data obtained by the short-term exposure to create third image data, a dynamic range of which is expanded with respect to the first image data and the second image data.

5. The apparatus according to claim 1, wherein said synchronizing signal generation unit generates the short-term vertical synchronizing signal, the long-term vertical synchronizing signal, one cycle of which is equal to three cycles of the short-term vertical synchronizing signal, and a middle-term vertical synchronizing signal for middle-term exposure, one cycle of which is equal to two cycles of the short-term vertical synchronizing signal,
said exposure control unit is configured to repeat performing the short-term exposure for the predetermined number of the short-term exposure lines of said image sensor according to the generated short-term vertical synchronizing signal, performing the middle-term exposure for the predetermined number of middle-term exposure lines of said image sensor according to the generated middle-term vertical synchronizing signal, and the long-term exposure for the predetermined number of the long-term exposure lines of said image sensor according to the generated long-term vertical synchronizing signal, said exposure control unit starts the first read operation of pixel signals for the long-term exposure lines in synchronism with the long-term vertical synchronizing signal, said exposure control unit starts a third read operation of pixel signals for the middle-term exposure lines in synchronism with the middle-term vertical synchronizing signal, which does not overlap a period of the first read operation, and said exposure control unit starts the second read operation of pixel signals for the short-term exposure lines in synchronism with the short-term vertical synchronizing signal, which does not overlap a period of the first and third read operations.

6. The apparatus according to claim 5, wherein said exposure control unit starts a first rolling shutter operation for the long-term exposure lines, a second rolling shutter operation for the short-term exposure lines, and a third rolling shutter operation for the middle-term exposure lines in synchronism with the first long-term vertical synchronizing signal, said exposure control unit starts the second read operation of pixel signals for the short-term exposure line in synchronism with a short-term vertical synchronizing signal next to the first long-term vertical synchronizing signal, said exposure control unit starts a third read operation of pixel signals for the middle-term exposure line in synchronism with a middle-term vertical synchronizing signal next to the first long-term vertical synchronizing signal, and said exposure control unit starts the first read operation of pixel signals for the long-term exposure line in synchronism with a second long-term vertical synchronizing signal next to the first long-term vertical synchronizing signal.

7. The apparatus according to claim 5, wherein said exposure control unit sets a ratio of exposure times in the long-term exposure, the middle-term exposure, and the short-term exposure to be constant in respective frames.

8. The apparatus according to claim 5, further comprising a signal processing unit configured to compose first image data obtained by the long-term exposure, second image data obtained by the middle-term exposure, and third image data obtained by the short-term exposure to create fourth image data, a dynamic range of which is expanded with respect to the first image data, the second image data, and the third image data.

9. A control method of an image capturing apparatus, which comprises an image sensor in which a plurality of pixels each having a photoelectric conversion element are arranged in a matrix, and a synchronizing signal generation unit configured to generate a short-term vertical synchronizing signal as a vertical synchronizing signal for short-term exposure, and a long-term vertical synchronizing signal for long-term exposure, one cycle of the long-term vertical synchronizing signal being equal to N cycles of the short-term vertical synchronizing signal, the method comprising:

an exposure control step of repeat performing the short-term exposure for the predetermined number of short-term exposure lines of said image sensor according to the generated short-term vertical synchronizing signal, and performing the long-term exposure for the predetermined number of long-exposure lines of the image sensor according to the generated long-term vertical synchronizing signal, wherein in the exposure control step, a first read operation of pixel signals for the long-term exposure lines is started in synchronism with the long-term vertical synchronizing signal, and a second read operation of pixel signals for the short-term exposure lines is started in synchronism with the short-term vertical synchronizing signal, which does not overlap a period of the first read operation.

10. A non-transitory computer-readable medium comprising one or more sequences of instruction, which, when executed by one or more processors of an image capturing apparatus comprising an image sensor in which a plurality of pixels each having a photoelectric conversion element are arranged in a matrix, and a synchronizing signal generation unit configured to generate a short-term vertical synchronizing signal as a vertical synchronizing signal for short-term exposure, and a long-term vertical synchronizing signal for long-term exposure, one cycle of the long-term vertical synchronizing signal being equal to N cycles of the short-term vertical synchronizing signal, cause the image capturing apparatus to execute exposure control for repeat performing the short-term exposure for the predetermined number of short-term exposure lines of said image sensor according to the generated short-term vertical synchronizing signal, and performing the long-term exposure for the predetermined number of long-term exposure lines of the image sensor according to the generated long-term vertical synchronizing signal, wherein in the exposure control, a first read operation of pixel signals for the long-term exposure lines is started in synchronism with the long-term vertical synchronizing signal, and a second read operation of pixel signals for the short-term exposure lines is started in synchronism with the short-term vertical synchronizing signal, which does not overlap a period of the first read operation.

* * * * *